United States Patent [19]

Kawaguchi et al.

[11] Patent Number: 5,140,644
[45] Date of Patent: Aug. 18, 1992

[54] CHARACTER STRING RETRIEVING SYSTEM AND METHOD

[75] Inventors: Hisamitsu Kawaguchi, Hachioji; Kanji Kato, Tokorozawa; Atsushi Hatakeyama, Kokubunji; Hiromichi Fujisawa, Tokorozawa; Masaaki Fujinawa, Tokyo; Masaharu Murakami, Odawara; Hidefumi Masuzaki, Hadano, all of Japan

[73] Assignee: Hitachi, Ltd., Tokyo, Japan

[21] Appl. No.: 733,982

[22] Filed: Jul. 22, 1991

Related U.S. Application Data

[63] Continuation-in-part of Ser. No. 555,483, Aug. 9, 1990.

[30] Foreign Application Priority Data

Jul. 23, 1990 [JP] Japan .................... 2-193014

[51] Int. Cl.⁵ ........................................ G06K 9/00
[52] U.S. Cl. ........................................ 382/10; 382/37
[58] Field of Search ............ 364/200; 382/54, 10-14, 382/16, 37

[56] References Cited

U.S. PATENT DOCUMENTS

| | | | |
|---|---|---|---|
| 4,320,451 | 3/1982 | Bachman et al. | 364/200 |
| 4,395,757 | 7/1983 | Bienvenu et al. | 364/200 |
| 4,418,385 | 11/1983 | Bourrez | 364/200 |
| 4,430,699 | 2/1984 | Segarra et al. | 364/200 |
| 4,539,655 | 9/1985 | Trussell et al. | 364/900 |
| 4,589,065 | 5/1986 | Auslander et al. | 364/200 |
| 4,635,189 | 1/1987 | Kendall | 364/200 |
| 4,870,704 | 9/1989 | Matelan et al. | 364/200 |

FOREIGN PATENT DOCUMENTS

| | | |
|---|---|---|
| 60-105039 | 6/1985 | Japan . |
| 60-105040 | 6/1985 | Japan . |
| 60-117326 | 6/1985 | Japan . |
| 62-011932 | 1/1987 | Japan . |
| 62-141026 | 10/1987 | Japan . |
| 63-311530 | 12/1988 | Japan . |

OTHER PUBLICATIONS

"Hardware Systems for Text Information Retrieval", ACM SIGIR 6th Conference, 1983, L. A. Hollaar.
"Efficient String Matching", CACM, vol. 18, No. 6, 1975, Aho et al.
Haskin & Hollaar: "Operational Characteristics of a Hardware-Based Pattern Matcher", ACM Trans. on Database Systems, vol. 8, #1, 1983.
Aho & Corasick: "Efficient String Matching", CACM, vol. 18, #6, 1975.

Primary Examiner—Stephen Brinich
Attorney, Agent, or Firm—Fay, Sharpe, Beall, Fagan, Minnich & McKee

[57] ABSTRACT

A compact character string retrieving system capable of producing correctly the result of matching without omission even upon occurrence of multiple matching in which a plurality of search terms are matched for one character string by a finite automation. A destination state for transition brought about by a trailing character of the search term is newly created instead of an initial state. A transition table storage stores the destination state. On the basis of the source state number and a specified pattern character code, the destination state number is read out from the state transition table storage. When the state number read out represents the destination state of the transition brought about by the trailing character of the specified pattern character string, an identifier thereof is outputted. The identifiers of the search terms matched are each represented by one bit information, and a group of corresponding flags is stored in one slot. Multiple matching can be performed without omission. The character string retrieving system is implemented in a reduced size.

12 Claims, 37 Drawing Sheets

FIG.5
PRIOR ART

CHARACTER CODE

| STATE NUMBER \ CHARACTER | 0 | 1 | ... | A 41 | ... | C 43 | D 44 | ... | 47 | G 48 | H ... | 4F | O ... | T 54 | ... | FE | FF |
|---|---|---|---|---|---|---|---|---|---|---|---|---|---|---|---|---|---|
| 0 | 0 | 0 | 0 | 0 | 0 | 3 | 1 | 0 | 0 | 0 | 0 | 0 | 0 | 0 | 0 | 0 | 0 |
| 1 | 0 | 0 | 0 | 0 | 0 | 3 | 1 | 0 | 0 | 0 | 0 | 2 | 0 | 0 | 0 | 0 | 0 |
| 2 | 0 | 0 | 0 | 0 | 0 | 3 | 1 | 0 | 0 | 0 | 0 | 0 | 0 | 0 | 0 | 0 | 0 |
| 3 | 0 | 0 | 0 | 4 | 0 | 3 | 1 | 0 | 0 | 0 | 0 | 0 | 0 | 0 | 0 | 0 | 0 |
| 4 | 0 | 0 | 0 | 0 | 0 | 3 | 1 | 0 | 0 | 0 | 0 | 0 | 0 | 0 | 0 | 0 | 0 |
| 5 | 0 | 0 | 0 | 0 | 0 | 0 | 0 | 0 | 0 | 0 | 0 | 0 | 0 | 0 | 0 | 0 | 0 |
| ⋮ | 0 | 0 | 0 | 0 | 0 | 0 | 0 | 0 | 0 | 0 | 0 | 0 | 0 | 0 | 0 | 0 | 0 |
| FE | 0 | 0 | 0 | 0 | 0 | 0 | 0 | 0 | 0 | 0 | 0 | 0 | 0 | 0 | 0 | 0 | 0 |
| FF | 0 | 0 | 0 | 0 | 0 | 0 | 0 | 0 | 0 | 0 | 0 | 0 | 0 | 0 | 0 | 0 | 0 |

CHARACTER CODE

260

| CHARACTER<br>STATE NUMBER | | | A | | C | D | | G | H | | O | T | | | |
|---|---|---|---|---|---|---|---|---|---|---|---|---|---|---|---|
| | 0 | 1 | ...41 | ...43 | 44 | ...47 | 48 | ...4F | ...54 | ...FE | FF |
| 0 | 0 | 0 | 0 | 0 | 0 | 0 | 0 | 0 | 0 | 0 | 0 | 0 | 0 | 0 | 0 |
| 1 | 0 | 0 | 0 | 0 | 0 | 0 | 0 | 0 | 0 | 0 | 0 | 0 | 0 | 0 | 0 |
| 2 | 0 | 0 | 0 | 0 | 0 | 0 | 0 | 1 | 0 | 0 | 0 | 0 | 0 | 0 | 0 |
| 3 | 0 | 0 | 0 | 0 | 0 | 0 | 0 | 0 | 0 | 0 | 0 | 0 | 0 | 0 | 0 |
| 4 | 0 | 0 | 0 | 0 | 0 | 0 | 0 | 0 | 0 | 0 | 0 | 2 | 0 | 0 | 0 |
| 5 | 0 | 0 | 0 | 0 | 0 | 0 | 0 | 0 | 0 | 0 | 0 | 0 | 0 | 0 | 0 |
| ⋮ | 0 | 0 | 0 | 0 | 0 | 0 | 0 | 0 | 0 | 0 | 0 | 0 | 0 | 0 | 0 |
| FE | 0 | 0 | 0 | 0 | 0 | 0 | 0 | 0 | 0 | 0 | 0 | 0 | 0 | 0 | 0 |
| FF | 0 | 0 | 0 | 0 | 0 | 0 | 0 | 0 | 0 | 0 | 0 | 0 | 0 | 0 | 0 |

FIG. 8
PRIOR ART

CHARACTER CODE

220

| | | | | D | | G | H | | O | | T | | | |
|---|---|---|---|---|---|---|---|---|---|---|---|---|---|---|
| STATE NUMBER | 0 | 1 | ... | 44 | ... | 47 | 48 | ... | 4F | ... | 54 | ... | FE | FF |
| 0 | 0 | 0 | 0 | 1 | 0 | 0 | 3 | 0 | 0 | 0 | 0 | 0 | 0 | 0 |
| 1 | 0 | 0 | 0 | 1 | 0 | 0 | 3 | 0 | 2 | 0 | 0 | 0 | 0 | 0 |
| 2 | 0 | 0 | 0 | 1 | 0 | 1 | 3 | 0 | 0 | 0 | 0 | 0 | 0 | 0 |
| 3 | 0 | 0 | 0 | 1 | 0 | 0 | 3 | 0 | 4 | 0 | 0 | 0 | 0 | 0 |
| 4 | 0 | 0 | 0 | 1 | 0 | 0 | 3 | 0 | 0 | 0 | 5 | 0 | 0 | 0 |
| 5 | 0 | 0 | 0 | 6 | 0 | 0 | 3 | 0 | 0 | 0 | 0 | 0 | 0 | 0 |
| 6 | 0 | 0 | 0 | 1 | 0 | 0 | 3 | 0 | 7 | 0 | 0 | 0 | 0 | 0 |
| 7 | 0 | 0 | 0 | 1 | 0 | 0 | 3 | 0 | 0 | 0 | 0 | 0 | 0 | 0 |
| 8 | 0 | 0 | 0 | 0 | 0 | 0 | 0 | 0 | 0 | 0 | 0 | 0 | 0 | 0 |
| ⋮ | 0 | 0 | 0 | 0 | 0 | 0 | 0 | 0 | 0 | 0 | 0 | 0 | 0 | 0 |
| FE | 0 | 0 | 0 | 0 | 0 | 0 | 0 | 0 | 0 | 0 | 0 | 0 | 0 | 0 |
| FF | 0 | 0 | 0 | 0 | 0 | 0 | 0 | 0 | 0 | 0 | 0 | 0 | 0 | 0 |

FIG.9
PRIOR ART

| CHARACTER CODE / STATE NUMBER | | | D | | G | H | | O | | T | | | |
|---|---|---|---|---|---|---|---|---|---|---|---|---|---|
| CHARACTER → / ↓ | 0 | 1 | ··· | 44 | ··· | 47 | 48 | ··· | 4F | ··· | 54 | ··· | FE | FF |
| 0 | 0 | 0 | 0 | 0 | 0 | 0 | 0 | 0 | 0 | 0 | 0 | 0 | 0 | 0 |
| 1 | 0 | 0 | 0 | 0 | 0 | 0 | 0 | 0 | 0 | 0 | 0 | 0 | 0 | 0 |
| 2 | 0 | 0 | 0 | 0 | 0 | 1 | 0 | 0 | 0 | 0 | 0 | 0 | 0 | 0 |
| 3 | 0 | 0 | 0 | 0 | 0 | 0 | 0 | 0 | 0 | 0 | 0 | 0 | 0 | 0 |
| 4 | 0 | 0 | 0 | 0 | 0 | 0 | 0 | 0 | 0 | 0 | 0 | 0 | 0 | 0 |
| 5 | 0 | 0 | 0 | 0 | 0 | 0 | 0 | 0 | 0 | 0 | 0 | 0 | 0 | 0 |
| 6 | 0 | 0 | 0 | 0 | 0 | 0 | 0 | 0 | 0 | 0 | 0 | 0 | 0 | 0 |
| 7 | 0 | 0 | 0 | 0 | 0 | 2 | 0 | 0 | 0 | 0 | 0 | 0 | 0 | 0 |
| 8 | 0 | 0 | 0 | 0 | 0 | 0 | 0 | 0 | 0 | 0 | 0 | 0 | 0 | 0 |
| ⋮ | 0 | 0 | 0 | 0 | 0 | 0 | 0 | 0 | 0 | 0 | 0 | 0 | 0 | 0 |
| FE | 0 | 0 | 0 | 0 | 0 | 0 | 0 | 0 | 0 | 0 | 0 | 0 | 0 | 0 |
| FF | 0 | 0 | 0 | 0 | 0 | 0 | 0 | 0 | 0 | 0 | 0 | 0 | 0 | 0 |

FIG.12

CHARACTER CODE

| STATE NUMBER \ CHARACTER | 0 | 1 | ... | A 41 | ... | C 43 | D 44 | ... | G 47 | H 48 | ... | O 4F | ... | T 54 | ... | FE | FF |
|---|---|---|---|---|---|---|---|---|---|---|---|---|---|---|---|---|---|
| 0 | 0 | 0 | 0 | 0 | 0 | 4 | 1 | 0 | 0 | 0 | 0 | 0 | 0 | 0 | 0 | 0 | 0 |
| 1 | 0 | 0 | 0 | 0 | 0 | 4 | 1 | 0 | 0 | 0 | 0 | 2 | 0 | 0 | 0 | 0 | 0 |
| 2 | 0 | 0 | 0 | 0 | 0 | 4 | 1 | 0 | 3 | 0 | 0 | 0 | 0 | 0 | 0 | 0 | 0 |
| 3 | 0 | 0 | 0 | 0 | 0 | 4 | 1 | 0 | 0 | 0 | 0 | 0 | 0 | 0 | 0 | 0 | 0 |
| 4 | 0 | 0 | 0 | 5 | 0 | 4 | 1 | 0 | 0 | 0 | 0 | 0 | 0 | 0 | 0 | 0 | 0 |
| 5 | 0 | 0 | 0 | 0 | 0 | 4 | 1 | 0 | 0 | 0 | 0 | 0 | 0 | 6 | 0 | 0 | 0 |
| 6 | 0 | 0 | 0 | 0 | 0 | 4 | 1 | 0 | 0 | 0 | 0 | 0 | 0 | 0 | 0 | 0 | 0 |
| 7 | 0 | 0 | 0 | 0 | 0 | 0 | 0 | 0 | 0 | 0 | 0 | 0 | 0 | 0 | 0 | 0 | 0 |
| ⋮ | 0 | 0 | 0 | 0 | 0 | 0 | 0 | 0 | 0 | 0 | 0 | 0 | 0 | 0 | 0 | 0 | 0 |
| FE | 0 | 0 | 0 | 0 | 0 | 0 | 0 | 0 | 0 | 0 | 0 | 0 | 0 | 0 | 0 | 0 | 0 |
| FF | 0 | 0 | 0 | 0 | 0 | 0 | 0 | 0 | 0 | 0 | 0 | 0 | 0 | 0 | 0 | 0 | 0 |

FIG. 13

| STATE NUMBER | MATCHING TERM IDENTIFIER |
|---|---|
| 0 | 0 |
| 1 | 0 |
| 2 | 0 |
| 3 | 1 |
| 4 | 0 |
| 5 | 0 |
| 6 | 2 |
| 7 | 0 |
| ... | 0 |
| FE | 0 |
| FF | 0 |

FIG. 15

CHARACTER CODE

| CHARACTER<br>STATE NUMBER | 0 | 1 | ... | 44 (D) | ... | 47 (G) | 48 (H) | ... | 4F (O) | ... | 54 (T) | ... | FE | FF |
|---|---|---|---|---|---|---|---|---|---|---|---|---|---|---|
| 0 | 0 | 0 | 0 | 0 | 0 | 0 | 0 | 0 | 0 | 0 | 0 | 0 | 0 | 0 |
| 1 | 0 | 0 | 0 | 0 | 0 | 0 | 0 | 0 | 0 | 0 | 0 | 0 | 0 | 0 |
| 2 | 0 | 0 | 0 | 0 | 0 | 1 | 0 | 0 | 0 | 0 | 0 | 0 | 0 | 0 |
| 3 | 0 | 0 | 0 | 0 | 0 | 0 | 0 | 0 | 0 | 0 | 0 | 0 | 0 | 0 |
| 4 | 0 | 0 | 0 | 0 | 0 | 0 | 0 | 0 | 0 | 0 | 0 | 0 | 0 | 0 |
| 5 | 0 | 0 | 0 | 0 | 0 | 0 | 0 | 0 | 0 | 0 | 0 | 0 | 0 | 0 |
| 6 | 0 | 0 | 0 | 0 | 0 | 0 | 0 | 0 | 0 | 0 | 0 | 0 | 0 | 0 |
| 7 | 0 | 0 | 0 | 0 | 0 | 3 | 0 | 0 | 0 | 0 | 0 | 0 | 0 | 0 |
| 8 | 0 | 0 | 0 | 0 | 0 | 0 | 0 | 0 | 0 | 0 | 0 | 0 | 0 | 0 |
| ⋮ | 0 | 0 | 0 | 0 | 0 | 0 | 0 | 0 | 0 | 0 | 0 | 0 | 0 | 0 |
| FE | 0 | 0 | 0 | 0 | 0 | 0 | 0 | 0 | 0 | 0 | 0 | 0 | 0 | 0 |
| FF | 0 | 0 | 0 | 0 | 0 | 0 | 0 | 0 | 0 | 0 | 0 | 0 | 0 | 0 |

| RETRIEVAL TERM NUMBER | 8 | 7 | 6 | 5 | 4 | 3 | 2 | 1 |
|---|---|---|---|---|---|---|---|---|
| BIT POSITION | 7 | 6 | 5 | 4 | 3 | 2 | 1 | 0 |
| MATCHING FLAG | 0 | 0 | 0 | 0 | 0 | 0 | 1 | 1 |

FIG. 18

CHARACTER CODE

| STATE NUMBER \ CHARACTER | 0 | 1 | ... | D 44 | ... | G 47 | H 48 | ... | O 4F | ... | T 54 | ... | FE | FF |
|---|---|---|---|---|---|---|---|---|---|---|---|---|---|---|
| 0 | 0 | 0 | 0 | 0 | 0 | 0 | 0 | 0 | 0 | 0 | 0 | 0 | 0 | 0 |
| 1 | 0 | 0 | 0 | 0 | 0 | 0 | 0 | 0 | 0 | 0 | 0 | 0 | 0 | 0 |
| 2 | 0 | 0 | 0 | 0 | 0 | 1 | 0 | 0 | 0 | 0 | 0 | 0 | 0 | 0 |
| 3 | 0 | 0 | 0 | 0 | 0 | 0 | 0 | 0 | 0 | 0 | 0 | 0 | 0 | 0 |
| 4 | 0 | 0 | 0 | 0 | 0 | 0 | 0 | 0 | 0 | 0 | 0 | 0 | 0 | 0 |
| 5 | 0 | 0 | 0 | 0 | 0 | 0 | 0 | 0 | 0 | 0 | 0 | 0 | 0 | 0 |
| 6 | 0 | 0 | 0 | 0 | 0 | 0 | 0 | 0 | 0 | 0 | 0 | 0 | 0 | 0 |
| 7 | 0 | 0 | 0 | 0 | 0 | 500 | 0 | 0 | 0 | 0 | 0 | 0 | 0 | 0 |
| 8 | 0 | 0 | 0 | 0 | 0 | 0 | 0 | 0 | 0 | 0 | 0 | 0 | 0 | 0 |
| ⋮ | 0 | 0 | 0 | 0 | 0 | 0 | 0 | 0 | 0 | 0 | 0 | 0 | 0 | 0 |
| FE | 0 | 0 | 0 | 0 | 0 | 0 | 0 | 0 | 0 | 0 | 0 | 0 | 0 | 0 |
| FF | 0 | 0 | 0 | 0 | 0 | 0 | 0 | 0 | 0 | 0 | 0 | 0 | 0 | 0 |

FIG. 19

| ADDRESS | MATCHED TERM IDENTIFIER | NEXT DATA ADDRESS | |
|---|---|---|---|
| 100 | 1 | 200 | --- matching Identifier of "DOG" |
| ⋮ | ⋮ | ⋮ | |
| 200 | 2 | -1 | --- matching Identifier of "HOT DOG" |
| ⋮ | ⋮ | ⋮ | |

FIG. 22

| CHARACTER CODE / STATE NUMBER | | | D | | | G | H | | O | | T | | |
|---|---|---|---|---|---|---|---|---|---|---|---|---|---|
| | 0 | 1 | ... 44 | ... | 47 | 48 | ... | 4F | ... | 54 | ... | FE | FF |
| 0 | 0 | 0 | 0 | 1 | 0 | 0 | 4 | 0 | 0 | 0 | 0 | 0 | 0 | 0 |
| 1 | 0 | 0 | 0 | 1 | 0 | 0 | 4 | 0 | 2 | 0 | 0 | 0 | 0 | 0 |
| 2 | 0 | 0 | 0 | 1 | 0 | 3 | 4 | 0 | 0 | 0 | 0 | 0 | 0 | 0 |
| 3 | 0 | 0 | 0 | 1 | 0 | 0 | 4 | 0 | 0 | 0 | 0 | 0 | 0 | 0 |
| 4 | 0 | 0 | 0 | 1 | 0 | 0 | 4 | 0 | 5 | 0 | 0 | 0 | 0 | 0 |
| 5 | 0 | 0 | 0 | 1 | 0 | 0 | 4 | 0 | 0 | 0 | 6 | 0 | 0 | 0 |
| 6 | 0 | 0 | 0 | 7 | 0 | 0 | 4 | 0 | 0 | 0 | 0 | 0 | 0 | 0 |
| 7 | 0 | 0 | 0 | 1 | 0 | 0 | 4 | 0 | 8 | 0 | 0 | 0 | 0 | 0 |
| 8 | 0 | 0 | 0 | 1 | 0 | 9 | 4 | 0 | 0 | 0 | 0 | 0 | 0 | 0 |
| 9 | 0 | 0 | 0 | 1 | 0 | 0 | 4 | 0 | 0 | 0 | 0 | 0 | 0 | 0 |
| 10 | 0 | 0 | 0 | 0 | 0 | 0 | 0 | 0 | 0 | 0 | 0 | 0 | 0 | 0 |
| ⋮ | 0 | 0 | 0 | 0 | 0 | 0 | 0 | 0 | 0 | 0 | 0 | 0 | 0 | 0 |
| FE | 0 | 0 | 0 | 0 | 0 | 0 | 0 | 0 | 0 | 0 | 0 | 0 | 0 | 0 |
| FF | 0 | 0 | 0 | 0 | 0 | 0 | 0 | 0 | 0 | 0 | 0 | 0 | 0 | 0 |

FIG. 23

| STATE NUMBER | MATCHING FLAG |
|---|---|
| 0 | 0 |
| 1 | 0 |
| 2 | 0 |
| 3 | 1 |
| 4 | 0 |
| 5 | 0 |
| 6 | 0 |
| 7 | 0 |
| 8 | 0 |
| 9 | 3 |
| 10 | 0 |
| ⋮ | 0 |
| FE | 0 |
| FF | 0 |

501

F I G. 24

| RETRIEVAL TERM NUMBER | 8 | 7 | 6 | 5 | 4 | 3 | 2 | 1 |
|---|---|---|---|---|---|---|---|---|
| BIT POSITION | 7 | 6 | 5 | 4 | 3 | 2 | 1 | 0 |
| MATCHING FLAG | 0 | 0 | 0 | 0 | 0 | 0 | 1 | 1 |

FIG. 25

| STATE NUMBER | MATCHED TERM IDENTIFIER |
|---|---|
| 0 | 0 |
| 1 | 0 |
| 2 | 0 |
| 3 | 1 |
| 4 | 0 |
| 5 | 0 |
| 6 | 0 |
| 7 | 0 |
| 8 | 0 |
| 9 | 100 |
| 10 | 0 |
| ⋮ | 0 |
| FE | 0 |
| FF | 0 |

FIG. 28

| CHARACTER CODE \ CHARACTER / STATE NUMBER | 0 | 1 | ... | D 44 | ... | G 47 | H 48 | ... | O 62 | ... | T 54 | ... | FE | FF |
|---|---|---|---|---|---|---|---|---|---|---|---|---|---|---|
| 0 | 0 | 0 | 0 | 1 | 0 | 0 | 3 | 0 | 0 | 0 | 0 | 0 | 0 | 0 |
| 1 | 0 | 0 | 0 | 1 | 0 | 0 | 3 | 0 | 2 | 0 | 0 | 0 | 0 | 0 |
| 2 | 0 | 0 | 0 | 1 | 0 | 0 | 3 | 0 | 0 | 0 | 0 | 0 | 0 | 0 |
| 3 | 0 | 0 | 0 | 1 | 0 | 0 | 3 | 0 | 4 | 0 | 0 | 0 | 0 | 0 |
| 4 | 0 | 0 | 0 | 1 | 0 | 0 | 3 | 0 | 0 | 0 | 5 | 0 | 0 | 0 |
| 5 | 0 | 0 | 0 | 6 | 0 | 0 | 3 | 0 | 0 | 0 | 0 | 0 | 0 | 0 |
| 6 | 0 | 0 | 0 | 1 | 0 | 0 | 3 | 0 | 7 | 0 | 0 | 0 | 0 | 0 |
| 7 | 0 | 0 | 0 | 1 | 0 | 8 | 3 | 0 | 0 | 0 | 0 | 0 | 0 | 0 |
| 8 | 0 | 0 | 0 | 0 | 0 | 0 | 0 | 0 | 0 | 0 | 0 | 0 | 0 | 0 |
| 9 | 0 | 0 | 0 | 0 | 0 | 0 | 0 | 0 | 0 | 0 | 0 | 0 | 0 | 0 |
| ⋮ | 0 | 0 | 0 | 0 | 0 | 0 | 0 | 0 | 0 | 0 | 0 | 0 | 0 | 0 |
| FE | 0 | 0 | 0 | 0 | 0 | 0 | 0 | 0 | 0 | 0 | 0 | 0 | 0 | 0 |
| FF | 0 | 0 | 0 | 0 | 0 | 0 | 0 | 0 | 0 | 0 | 0 | 0 | 0 | 0 |

| CHARACTER CODE / STATE NUMBER | 0 | 1 | ... | D 44 | ... | G 47 | H 48 | ... | O 62 | ... | T 54 | ... | FE | FF |
|---|---|---|---|---|---|---|---|---|---|---|---|---|---|---|
| 0 | 0 | 0 | 0 | 1 | 0 | 0 | 4 | 0 | 0 | 0 | 0 | 0 | 0 | 0 |
| 1 | 0 | 0 | 0 | 1 | 0 | 0 | 4 | 0 | 2 | 0 | 0 | 0 | 0 | 0 |
| 2 | 0 | 0 | 0 | 1 | 0 | 3 | 4 | 0 | 0 | 0 | 0 | 0 | 0 | 0 |
| 3 | 0 | 0 | 0 | 1 | 0 | 0 | 4 | 0 | 0 | 0 | 0 | 0 | 0 | 0 |
| 4 | 0 | 0 | 0 | 1 | 0 | 0 | 4 | 0 | 5 | 0 | 0 | 0 | 0 | 0 |
| 5 | 0 | 0 | 0 | 1 | 0 | 0 | 4 | 0 | 0 | 0 | 6 | 0 | 0 | 0 |
| 6 | 0 | 0 | 0 | 7 | 0 | 0 | 4 | 0 | 0 | 0 | 0 | 0 | 0 | 0 |
| 7 | 0 | 0 | 0 | 1 | 0 | 0 | 4 | 0 | 8 | 0 | 0 | 0 | 0 | 0 |
| 8 | 0 | 0 | 0 | 1 | 0 | 9 | 4 | 0 | 0 | 0 | 0 | 0 | 0 | 0 |
| 9 | 0 | 0 | 0 | 0 | 0 | A | 0 | 0 | 0 | 0 | 0 | 0 | 0 | 0 |
| A | 0 | 0 | 0 | 1 | 0 | 0 | 4 | 0 | 0 | 0 | 0 | 0 | 0 | 0 |
| B | 0 | 0 | 0 | 0 | 0 | 0 | 0 | 0 | 0 | 0 | 0 | 0 | 0 | 0 |
| ⋮ | 0 | 0 | 0 | 0 | 0 | 0 | 0 | 0 | 0 | 0 | 0 | 0 | 0 | 0 |
| FE | 0 | 0 | 0 | 0 | 0 | 0 | 0 | 0 | 0 | 0 | 0 | 0 | 0 | 0 |
| FF | 0 | 0 | 0 | 0 | 0 | 0 | 0 | 0 | 0 | 0 | 0 | 0 | 0 | 0 |

220

| STATE NUMBER | MULTIPLE MATCHING FLAG | |
|---|---|---|
| 0 | 0 | 0 |
| 1 | 0 | 0 |
| 2 | 0 | 0 |
| 3 | 0 | 1 |
| 4 | 0 | 0 |
| 5 | 0 | 0 |
| 6 | 0 | 0 |
| 7 | 0 | 0 |
| 8 | 0 | 0 |
| 9 | 1 | 2 |
| A | 0 | 1 |
| B | 0 | 0 |
| ⋮ | 0 | 0 |
| FE | 0 | 0 |
| FF | 0 | 0 |

FIG. 36

| CHARACTER CODE<br>STATE NUMBER | 0 | 1 | ... | D<br>44 | ... | G<br>47 | H<br>48 | I<br>49 | J<br>4A | ... | O<br>4F | ... | T<br>54 | ... | FE | FF |
|---|---|---|---|---|---|---|---|---|---|---|---|---|---|---|---|---|
| 0 | 1000 | 1000 | 1000 | 0001 | 1000 | 1000 | 0004 | 1000 | 1000 | 1000 | 0002 | 1000 | 1000 | 1000 | 1000 | 1000 |
| 1 | 1000 | 1000 | 1000 | 0001 | 1000 | 1000 | 0004 | 1000 | 1000 | 1000 | 0002 | 1000 | 1000 | 1000 | 1000 | 1000 |
| 2 | 1000 | 1000 | 1000 | 0001 | 1000 | 1000 | 0004 | 1003 | 1000 | 1000 | 0005 | 1000 | 1000 | 1000 | 1000 | 1000 |
| 3 | 1000 | 1000 | 1000 | 0001 | 1000 | 1000 | 0004 | 1000 | 1000 | 1000 | 0002 | 1000 | 1000 | 1000 | 1000 | 1000 |
| 4 | 1000 | 1000 | 1000 | 0001 | 1000 | 1000 | 0004 | 1000 | 1000 | 1000 | 0002 | 1000 | 1000 | 1000 | 1000 | 1000 |
| 5 | 1000 | 1000 | 1000 | 0001 | 1000 | 1000 | 0004 | 1000 | 1000 | 1000 | 0006 | 1000 | 1000 | 1000 | 1000 | 1000 |
| 6 | 1000 | 1000 | 1000 | 0007 | 1000 | 1000 | 0004 | 1000 | 1000 | 1000 | 0002 | 1000 | 1000 | 1000 | 1000 | 1000 |
| 7 | 1000 | 1000 | 1000 | 0001 | 1000 | 1112 | 0004 | 1000 | 1000 | 1000 | 0008 | 1000 | 1000 | 1000 | 1000 | 1000 |
| 8 | 1000 | 1000 | 1000 | 0001 | 1000 | 1000 | 0004 | 1000 | 1000 | 1000 | 0002 | 1000 | 1000 | 1000 | 1000 | 1000 |
| 9 | 1000 | 1000 | 1000 | 0001 | 1000 | 1112 | 0004 | 1113 | 1000 | 1000 | 0002 | 1000 | 1000 | 1000 | 1000 | 1000 |
| A | 1000 | 1000 | 1000 | 0001 | 1000 | 1000 | 0004 | 1009 | 1000 | 1000 | 0002 | 1000 | 1000 | 1000 | 1000 | 1000 |
| ... | | | | | | | | | | | | | | | | |
| FE | 1000 | 1000 | 1000 | 1000 | 1000 | 1000 | 1000 | 1000 | 1000 | 1000 | 1000 | 1000 | 1000 | 1000 | 1000 | 1000 |
| FF | 1000 | 1000 | 1000 | 1000 | 1000 | 1000 | 1000 | 1000 | 1000 | 1000 | 1000 | 1000 | 1000 | 1000 | 1000 | 1000 |

SLOT 502:
| INITIAL STATE TRANSITION FLAG | MULTIPLE MATCHING FLAG (=0) | SUCCEEDING STATE NUMBER |
|---|---|---|
| 9 | 8 | 7 — 0 |
| 1 BIT | 1 BIT | 8 BITS |

SLOT 503:
| INITIAL STATE TRNSITION FLAG | MULTIPLE MATCHING FLAG (=1) | MATCHING IDENTIFIER | OFFSET |
|---|---|---|---|
| 9 | 8 | 7 — 4 | 3 — 0 |
| 1 BIT | 1 BIT | 4 BITS | 4 BITS |

CHARACTER STRING RETRIEVING SYSTEM AND METHOD

CROSS REFERENCE TO RELATED APPLICATION

This is a continuation-in-part (CIP) application of U.S. patent application Ser. No. 555,483, filed Aug. 9, 1990 and assigned to the assignee of this application, the disclosure of which is hereby incorporated by reference.

BACKGROUND OF THE INVENTION

The present invention relates generally to an information processing system. More particularly, the invention is concerned with a search team matching (or collating) technique in an information or character string retrieving (searching) system for making decision en bloc as to whether a set of plural character strings which are specified or designated for search or retrieval is present in an text composed of characters or character strings and subjected to retrieval.

In the field of the information processing systems, it is one of the important applications of the information processing to search or retrieve all documents containing a specific character substring (also referred to as a to-be-search or to-be retrieved term or simply as serch term) desired or specified to be retrieved or searched by a searcher or user from documents containing collections of character string data (hereinafter also referred to as the input text).

There have already been proposed several schemes of character retrieving or serching systems for realizing the retrieval or serching of the type mentioned above. In this conjunction, reference may be made to L. A. Hollaar: "Hardware Systems for Text Information Retrieval", ACM SIGIR 6th Conference, (1983). For a better understanding of the background of the invention, a typical one of the character string retrieving system proposed heretofore is shown in FIG. 2 of the accompanying drawings and will be described below in some detail.

Referring to FIG. 2, a character string retrieving system denoted generally by a numeral 1 includes a search or retrieval controller 101 which is in charge of overall control of the whole retrieval (search) system as well as communications or transactions with a host computer (not shown). More specifically, the retrieval controller 101 receives a retrieval (serch) request 201 from the host computer and analyzes the request to thereby send retrieval information 202 (i.e. information for search or retrieval) to a character string matching or collating unit 200 (also referred to as the matcher) and a composite condition check unit 103. Further, the retrieval controller 101 controls a storage controller 104 for allowing the character string matching unit 200 to read out character string data 204 from a character string data storage 105.

The character string matching circuit 200 checks the input character string data 204 as to presence of a character string which coincides with a serch term or character string designated by the retrieval request 201. When the corresponding search term is detected, information 205 for identifying the character string of interest is outputted to the composite condition check circuit 103. In response to the character string identifying information 205 as inputted, the composite condition check circuit 103 check whether logical conditions including logical ANDing(s) and/or ORing(s) which are also designated by the retrieval request 201 can be satisfied or not. When the designated composite conditions are found to be satisfied, the identification information of the relevant document as well as the content or text data of the document are sent back to the host computer as the retrieval or search result 206.

As a matching scheme for the matching or collation of character strings of concern in the character string matching unit 200 which constitutes an important part of the character string retrieving system 1, there is known a method of searching a plurality of character strings through a single text scan by resorting to the use of a finite automation. As a typical one of such methods, there may be mentioned a technique proposed by A. V. Aho et al.. (Reference may be made to A. V. Aho and M. J. Corasick: "Efficient String Matching", CACM, Vol. 18, No. 6, 1975). A hardware system designed for high-speed execution of automation based on the Aho et al's proposal is disclosed in J-P-A-60-105039. A character string matching circuit described in J-P-A-60-105039 will be described below by reference to a block diagram of FIG. 3 of the accompanying drawings.

The character string matching circuit of the prior art shown in this figure is composed of a character code register 211, a state transition table 220, a state ID (identification) number register 250 and a matching ID table 260.

For a better understanding of the teachings of the present invention, the character string matching operation performed by this prior art character string matching circuit will be elucidated below.

At first, through an initialization processing, there is generated an automation for performing matching or collation of search terms (i.e. character strings specified for retrieval) in the state transition table 220. Subsequently, the state number 0 representing the initialized state of the automation is placed in the state number register 250. The state number placed in the register 250 is referred to as the current state number and denoted by a reference numeral 305.

The matching operation starts from loading of a character in the character code register 211 from an input character string (input text) 204 on a character-by-character basis. Next, access is made to the state transition table 220 by using as the addresses therefor a character code 302 outputted from the character code register 211 and the current state number 305 outputted from the state number register 250, respectively, as a result of which a succeeding state number 303 indicating the state to which state transition is next to be made is read out from the state transition table 220. This succeeding state number 303 is held as a renewed or updated current state number as indicated at 305. In parallel with the access operation to the state transition table 220, the matching ID (identification) table 260 is accessed by using as the addressed therefor the current state number 305 outputted from the state number register 250 and the input character code 302, whereby the identification number or identifier of the search term is read out as a result of the matching as indicated at 205. In this conjunction, it is noted that when the identification number or identifier for the search term as read out from the matching ID table 260 is "0" (zero), this means that no matching could not been made with the search term.

By repeating a series of operations mentioned above, the character string matching can be accomplished.

Describing in more concrete this character string matching operation, reference is made to FIG. 4 of the accompanying drawings which shows a state transition diagram of an automaton.

In FIG. 4, there is shown a state transition diagram of an automaton for matching two search terms, i.e. "DOG" and "CAT", inputted by a searcher. In the figure, circles represent the states of the automaton, respectively, while arrows represent state transitions, respectively. Further, characters affixed to the arrows represent input characters which bring about the associated state transitions, respectively. Additionally, numerals shown as enclosed by the circles indicate the state numbers, respectively. The state 0 (zero) is the initial state of the automaton under consideration. For all the input characters for which no specific entries are found in conjunction with the transition, the automaton always assumes the initial state 0. The arrows 404 and 405 each affixed with a slash mark "/" represent the state transitions indicating that matching has been accomplished for "DOG" and "CAT", respectively. More specifically, the arrow 404 representing the state transition from the state 2 indicates that the matching has been accomplished for the term "DOG". On the other hand, the arrow 405 representing the transition from the state 4 indicates that "CAT" has been matched or collated.

Now, description will be made of the character string matching operation of the circuit disclosed in J-P-A-60-105039 by reference to FIG. 4. The state transition of the automaton shown in this figure starts from the initial state 0 (zero). When the input character in the initial state 0 is "D", transition occurs to the state 1 while the input character "C" in the initial state 0 (zero) brings about the state transition to the state 3. When the input character is neither "D" nor "C", the automaton remains in the initial state 0 (zero). Similarly, in the state numbered 1, the input character of "O" brings about the state transition to the state 2, while for the input character of "C", the automaton transits to the state 3 with the input character of "D" bringing about the state transition to the state 1. For any input characters other than those mentioned above in the state 1, the automaton always resumes the initial state 0 (zero). When the input character is "G" in the state 2, transition represented by the arrow 404 takes place. This means that the result of the matching has been obtained for the search term "DOG". The above applies equally to the other state transitions as well.

FIGS. 5 and 6 of the accompanying drawings show exemplary structures of the state transition table 220 storing the automaton shown in FIG. 4 and the matching ID table 260, respectively.

At this juncture, it should be mentioned that JIS code is used as the character code. The state transition table 220 is implemented in such a structure which allows access thereto with the input character code 302 and the current state number 305 of the automaton under consideration. More specifically, when the current state number 305 has a value 0 (zero) with the input character code 302 being "D", the state number 1 (one) corresponding to 0 (zero) and "D" is outputted as the succeeding state number 303 to which the automaton should make transition in succession.

The matching ID table 260 stores the information that matching of the search terms has been accomplished as well as the information resulting from the matching as indicated by the arrows 404 and 405 in FIG. 4. In other words, the identification numbers of the search terms (hereinafter also referred to as the matching identifiers) are stored in the matching ID table 260 which can be addressed with the current state number and the trailing character code of the search term upon occurrence of the state transition in response to appearance of the trailing character thereof (e.g. the table 260 is addressed with the state 2 and the character "G" in the case of the search term "DOG" illustrated in FIG. 4). In the case of the illustrated example concerning the retrieval of "DOG", 1 (one) is stored as the matching identifier. Numerical values other than 0 (zero) represent the identification numbers or identifiers of the search term. By assigning the numerical values other than 0 (zero) to the matching identifiers while assigning 0 (zero) to those other than the objectives for matching, it is possible to discriminatively identify the output of the matching or collation as performed.

It will now be understood in what manner the retrieval processing is carried out in the case of the prior art character string retrieving system.

As a problem of the prior art system, it has to be first pointed out that the areas of the matching ID table 260 which are effectively made use of are only those which correspond to the transitions occurring upon appearance of the trailing characters of the search terms, as can be seen from FIG. 6. To say in another way, the matching ID table has undesirably to be implemented with such a capacity which corresponds to a product of the number of different types of characters and the number of the states in order to store only a small amount of search term identification information. In other words, a memory of a large capacity is required for the matching ID table inefficiently. In more concrete, in the case of the automaton illustrated in FIG. 4, there are required as many as 1024 slots for storing the search term identifiers in a number corresponding to 256 character species or types multipled with the four states even though only two slots are sufficient for the identification of the two search terms in reality.

As another example, let's assume that matching be performed on sixty-four search terms each composed of four characters. Since the number of the states of the automaton required for the matching of one search term is three, matching for the sixty-four search terms requires 192 states in total (=3 states×64 characters). Accordingly, the matching ID table has to be of a sufficiently large capacity for accommodating as many as 49,152 slots (=256 character species×192 states). However, the number of the slots which can effectively be used amounts actually to no more than 64 slots, i.e. only about one thousandth of all the slots.

As will be understood from the above, the matching ID table of the character string retrieving system disclosed in the J-P-A-60-105039 makes it necessary to use a memory of an enormously large capacity even for the matching of only a small number of the search terms, which ultimately leads to an expensive and large scale character string retrieving system, presenting a serious problem.

Another problem of the prior art character string retrieving system can be seen in that since one slot of the matching ID table can store no more than one matching identifier of the search term, it is impossible to cope with a multiple matching processing.

This problem will be discussed below in conjunction with an automaton shown in FIG. 7 of the accompanying drawings.

The automaton shown in this figure is so configured as to perform matching on two retrieval or serch terms "DOG" and "HOTDOG". In this connection, FIGS. 8 and 9 of the accompanying drawings show, respectively, the contents of the state transition table 220 and the matching ID table 260 which correspond to the automaton shown in FIG. 7.

Apparently, the term "DOG" is a substring constituting a so-called trailing character substring of "HOTDOG". Accordingly, when an input text containing "HOTDOG" is inputted, not only "HOTDOG" but also "DOG" will have to be outputted as the result of the matching. In other words, upon inputting of the trailing character "G" of "HOTDOG", the identification numbers for the two terms "HOTDOG" and "DOG" have to be outputted. In this conjunction, the scheme in which a plurality of terms are matched through the state transition process for a single input text, as mentioned above, is referred to as the multiple matching. Further, the terms susceptible or subjected to such multiple matching may be said as having "multiple matching relation". Now, turning back to the prior art character string retrieving system, it will be appreciated that the slot of the matching ID table 260 corresponding to the current state number 7 and the character code "G" can accommodate no more than one matching identifier, i.e. only the result of matching for "HOTDOG". Thus, it is impossible to output the result of matching for the term "DOG". To say in another way, the prior art character string retrieving system suffers from an additional problem that the aforementioned multiple matching processing can not be carried out, to a serious disadvantage.

SUMMARY OF THE INVENTION

It is therefore a first object of the present invention to provide a character string retrieving system of a compact structure in which the memory capacity of a matching result (ID) table for storing the results of matching performed with the search terms can significantly be reduced.

A second object of the present invention is to provide a character string retrieving system which is capable of outputting correct matching results even for the multiple matching without incurring any omission of matching for the terms having the multiple matching relation.

In view of the above and other objects which will become apparent as description proceeds, there are provided improved character string retrieving systems according to major aspects of the present invention, which will be summarized below.

In the first place, there is provided according to a first aspect of the present invention a character string retrieving system which comprises an automaton including a matching ID table containing as entries thereof the automaton state numbers which can be determined in consideration of the number of the transition states and the types or species of character codes, wherein an automaton state is newly created as a destination state for the state transition occurring upon appearance of a trailing character of a term to be retrieved instead of using the initial state as the transition destination state for the trailing character, for thereby allowing the capacity of a memory constituting the matching ID table to be reduced. The newly created state is utilized for storing the result of the matching. It is thus sufficient for the matching ID table to store the result of matching in the newly created state at the entry determined by a corresponding state number.

According to a second aspect of the invention, there is provided a character string retrieving system in which identifiers for search terms (terms to be retrieved) which are to undergo the matching processing are each represented by one bit information, wherein a group of corresponding flags is stored in one slot of the matching ID table in order to exclude omission of any search term from the matching even upon occurrence of multiple matching for which a plurality of results of matching have to be outputted simultaneously.

Further, with a view to eliminating possibility of omission from matching of a term or terms having the multiple matching relation upon execution of the multiple matching processing of which a plurality of results of the matching have to be simultaneously outputted, there is proposed according to a third aspect of the invention a character string retrieving system which comprises a matching ID table for outputting matched term identifiers each representing an identifier of the search term thereof to a multiple matching processing circuit upon matching processing thereof while outputting nothing thereto when no matching is to be performed, wherein the multiple matching processing circuit is implemented to make decision as to whether the multiple matching is to be performed on the basis of the identifiers supplied thereto from the matching ID table by reference to a multiple matching table, wherein upon decision of the multiple matching, the multiplex matching processing circuit produces as the output the matched term identifiers of the search terms which bear the multiple matching relation to one another as the result of the matching processing while outputting straightforwardly the matched term identifiers of the search terms unless the multiple matching is decided, and wherein the multiple matching table is designed to store the matched term identifiers of the search terms which are to undergo the multiplex matching in correspondence with the matched term identifiers stored in the matching ID table.

Further, according to a fourth aspect of the invention, there is provided a character string retrieving system comprising an automaton which is so configured as to reduce the memory capacity of the matching ID table by containing as entries therein the state numbers determined on the basis of the types or kinds of character codes and the number of the automaton states and in which a new state is provided to serve as a transition destination state instead of the initial state for the state transition occurring upon appearance of a trailing character constituting a trailing part of the search term to thereby allow the result of matching to be stored in the newly created state, wherein with a view to performing matching for the search terms without any omission thereof upon occurrence of the multiple matching requiring output of the matching results for a plurality of search terms simultaneously, the identifiers of the search terms to be matched are each represented by one bit information and a group of corresponding flags are stored in one slot of the matching ID table having the state numbers as the entries thereof.

According to a fifth aspect of the invention, there is provided a character string retrieving system comprising an automaton which is so configured as to reduce the memory capacity of the matching ID table by containing therein as the entries the state numbers determined on the basis of the kinds of the character codes and the number of the automaton states and in which a new state is created to serve as a destination state for the transition occurring upon appearance of a trailing character constituting a trailing part of the search term to thereby allow the result of matching to be stored in the newly created state instead of the initial state, wherein with a view to performing matching for the search terms without omission even upon occurrence of the multiple matching event requiring output of the matching results simultaneously for a plurality of search terms, the matching ID table containing the state numbers as the entries outputs to a multiple matching processing circuit the matched term identifiers represented by the identifiers of the search terms to undergo the matching while otherwise outputting nothing to the multiple matching processing circuit, wherein the multiple matching processing circuit makes decision as to whether or not the multiple matching be performed on the basis of the matched term identifiers supplied from the matching ID table by reference to a multiple matching table and outputs as the result of matching the matched term identifiers of the search terms bearing a multiple matching relation to one another in the case of the multiple matching while otherwise outputting the matched term identifiers straightforwardly as the result of matching, and wherein the multiple matching table stores therein the matched term identifiers of the search terms which are to undergo the multiple matching in correspondence to the matched term identifiers in the matching ID table, respectively.

Accordingly to a sixth aspect of the invention, there is provided a character string retrieving system which comprises an automaton generating unit for generating an automaton including a normal state in which upon matching of a character code fetched from an input text on a character-by-character basis a matching identifier of a search term is outputted when the character code as fetched is a trailing character of the search term while otherwise outputting nothing and a matching output dedicated state in which no character code is newly fetched from the input text but matching is performed on the character code fetched immediately before to thereby output the corresponding matching identifier, wherein upon occurrence of multiple matching in which n matching identifiers have to be outputted for matching of one character code, a normal state for outputting first one matching identifier is provided, which is followed by a succession of (n−1) matching output dedicated states, to thereby make state transitions occur successively through the abovementioned states for thereby outputting n matching identifiers in total, whereupon the matching processing of a succeeding character code is performed, a state transition table memory for soring a state transition table storing an automaton generated to perform the matching between a character code and a constituent character of the search term in terms of a current state number generated by the automaton generating unit and a succeeding state number corresponding to the character code, a multiple matching flag which is set to "1" when the current state number stored in the state transition table and the succeeding state corresponding to the character code represent the matching output dedicated state number, while otherwise the flag is set to "0", a matching ID table containing a matching identifier which is set to the search term identifier when the current state number and the input character code correspond to the trailing character code constituting a part of the search term while otherwise set to "0", a character code register for fetching a character code on a character-by-character basis from the input text when the multiple matching flag is "1" while holding a character code already fetched when the multiple matching flag is "0", and a state number register for holding temporarily the succeeding state number outputted from the state transition table for thereby outputting the succeeding state number as a renewed current state number to the state transition table and the matching ID table.

In a character string retrieving system according to a seventh aspect of the invention, only the matching output dedicated state is used as the state for outputting the result of matching in contrast to the character string retrieving system according to the sixth aspect of the invention in which the normal state and the matching output dedicated state are used for outputting the result of matching.

Thus, according to the seventh aspect of the invention, there is provided a character string retrieving system which comprises an automaton generating unit for generating an automaton including a matching output dedicated state in which upon matching of a character code fetched from an input text on a character-by-character basis, no character code is newly fetched from the input text when transition is brought about immediately before by a trailing character of the search term but matching is performed with the character code fetched immediately before to thereby output a corresponding matched term identifier, while upon occurrence of a multiple matching in which n matched term identifiers have to be outputted from the matching for one character, n matching output dedicated states are provided to allow state transitions to occur successively through the n matching output dedicated states for thereby outputting n matched term identifiers, which is then followed by transition to a normal state to allow matching processing to be performed for a succeeding input character code, the automaton for performing matching between a character code and a constituent character of the search term is placed in a slot corresponding to a transition origin state number generated by the automaton generating unit and the character code, an initial state transition flag provided in association with the slot and set to "1" when a transition destination state is an initial state while otherwise set to "0", a matching output dedicated state flag which is set to "1" when the transition destination state is the matching output dedicated state while otherwise set to "0", a memory for storing a state transition table composed of a transition destination state number corresponding to the character code and the transition origin state number generated by the automaton generating unit when the matching output dedicated state flag is "1", a matched term identifier which is set to the identifier of the search term in case the transition origin state number and the input character code correspond to the trailing character code constituting the search term provided that the matching output dedicated flag is "0"πwhile otherwise the matched term identifier is set to "0", and an offset of a slot address at which a state to which transition is next to be made is placed, an initial state number register for storing the initial state number of the automaton, an initial state transition flip-flop for fetching the initial state transition flag from the state transition table to output the flag to an undermentioned current state number selector, a matching output dedicated state flip-flop for storing temporarily the matching output dedicated flag outputted from the state transition table to be outputted to a state number register, a matched term identifier register, a last matching output dedicated state flip-flop, a character code selector and a character code register mentioned below, respectively, a state number register for fetching the destination state number outputted from the state transition table when the matching output dedicated state flag outputted from the matching state dedicated state flip-flop is "0", the fetched destination state being set as an updated transition source state number, wherein when the matching output dedicated state flag is "1", the destination state number is not fetched but the transition source state number already fetched is held to be outputted to the current state number selector, a last matching output dedicated state flip-flop for holding the matching output dedicated state flag already outputted from the matching output dedicated state flip-flop upon fetching of an updated matching output dedicated state flag by the matching output dedicated state flip-flop, wherein the matching output dedicated state flag as held is outputted to the current state number selector as the last matching output dedicated state flag, a current state number selector for selecting the transition source state number stored in the state number register when the initial state transition flag outputted from the initial state transition flip-flop is "0" or when the matching output dedicated state flag outputted from the last matching output dedicated state flip-flop is "1", while selecting the initial state number stored in the initial state number register as a renewed transition source state when the initial state transition flag is "1" and when the matching output dedicated state flag is "0", the selected state being then outputted to the state transition table, a matched term identifier register for fetching therein the matched term identifier and the offset outputted from the state transition table when the matching output dedicated state flag outputted from the matching state dedicated state flip-flop is "1", the matched term identifier being then outputted as the result of matching with the offset being outputted to an adder mentioned below, while the matched term identifier register fetches neither the matched term identifier nor the offset when the matching output dedicated state flag is "0", a character code register for fetching a character code on a character-by-character basis from the input text when the matching output dedicated state flag outputted from the state transition table is "0", and holding the character code without fetching newly any character code when the matching output dedicated state flag is "1", the character code being then outputted to the character code selector and an adder mentioned below, and a character code selector for selecting the character code outputted from the character code register when the matching output dedicated state flag outputted from the matching output dedicated state flip-flop is "0", while selecting a character code resulting from addition of the character code and the offset outputted from the matched term identifier register by the adder when the matching output dedicated state flag is "1", wherein the selected character code is outputted to the state transition table.

The concept of the invention underlying the character string retrieving system according to the first aspect of the invention resides in that the number of the slots required for the matching result table can be reduced from "maximum number of the states" multiplied with "the number of types of the character codes" to the maximum state number by virtue of the automaton of such arrangement that the destination state of transition brought about by the trailing character of the search term is newly created instead of using the initial state to this end, wherein the matched term identifier is stored in the newly created state. Further, the matched term identifier of the search term is stored in the slot of the matching result table which corresponds to the newly created state.

Thus, the matching ID table can be implemented in a structure which can be addressed with the state numbers, which means that the number of the slots corresponds to the maximum state number which is smaller than the memory capacity otherwise required, whereby there can be realized the character string retrieving system of a compact or reduced size.

The concept underlying the character string retrieving system according to the second aspect of the invention is seen in that the identifiers of the search terms to be matched are each represented by one bit information so that one slot of the matching ID table can store a plurality of the search term identifiers in order to avoid the omission of any term from the matching upon occurrence of the multiple matching event where simultaneous output of the matching results for a plurality of search terms is required. By way of example, by establishing correspondence between the bit n of the slot for storing the matched term identifiers and the n-th search term matching flag, there can be outputted the matched term identifiers simultaneously for a plurality of search terms. To say in another way, even upon occurrence of the multiple matching, a plurality of relevant search term identifiers can simultaneously be outputted as the bit information.

According to the concept underlying the third aspect of the invention which is concerned with avoidance of omission of any search terms from the matching in the multiple matching processing through which the matched term identifiers for a plurality of search terms are required to be outputted simultaneously, the multiple matching processing circuit makes decision as to whether the matching to be performed is the multiple matching on the basis of the matched term identifiers sent from the matching ID table while consulting the multiple matching table. In the case of the multiple matching, the multiple matching processing circuit outputs as the matching result the matched term identifiers for the search terms which bear a multiple matching relation to one another. By virtue of this feature, a plurality of matched term identifiers for the terms having the multiple matching relation can sequentially be outputted.

Parenthetically, the multiple matching table is accessed by using the matched term identifier as the address, wherein the matched term identifiers for the search terms to undergo the multiple matching are stored at that address together with a next data address with which the multiple matching table is to be accessed upon succeeding reference to that table, whereby continuous addressing scheme can be realized.

The concept underlying the character string retrieving system according to the fourth aspect of the invention is seen in that in order to decrease the slot number of the matching ID table from a number corresponding to "maximum state numbers" multiplied with "the number of types of character codes" to the maximum state number while assuring the avoidance of omission of any search terms from matching upon occurrence of the multiple matching where the matching results for a plurality of search terms have to be simultaneously outputted, automaton is generated in such configuration that the destination state for the state transition brought about by the trailing character of the search term is newly created instead of using the initial state to this end, wherein the matched term identifier is stored in the newly created state. Further, the matched term identifiers are stored in the slot of the matching ID table which corresponds to the abovementioned newly created state.

Additionally, the identifier of the search term to be matched is represented by one bit information, wherein a plurality of matched term identifiers are stored in one slot of the matching ID table. By way of example, by establishing correspondence between the bit n of the slot for storing the matched term identifier and the matched term flag for the n-th search term, it is possible to output simultaneously the matched term identifiers for a plurality of search terms. Thus, the plurality of relevant matched term identifiers can simultaneously be outputted without omission even upon occurrence of the multiple matching processing event. Besides, because the matching ID table is so configured as to be addressed with the state number, the number of slots corresponds to the maximum number of the states and can be decreased to a number considerably smaller than the memory capacity which would otherwise be required. Thus, there can be realized the character retrieving system of a compact size.

The concept underlying the character string retrieving system according to the fifth aspect of the invention is seen in that in order to decrease the slot number of the matching ID table from a number corresponding to a product of "maximum state numbers" multiplied with "the number of types of character codes" to the maximum state number while assuring the avoidance of omission of any search terms from matching upon occurrence of the multiple matching where the results of matching for a plurality of search terms have to be simultaneously outputted, automaton is generated in such configuration that the destination state for the state transition brought about by the trailing character of the search term is newly created instead of using the initial state to this end, wherein the matched term identifier is stored in the newly created state. Further, the matched term identifier is stored in the slot of the matching ID table which corresponds to the abovementioned newly created state.

The multiple matching processing circuit makes decision as to whether the matching to be performed is the multiple matching on the basis of the matched term identifiers sent from the matching ID table by consulting the multiple matching table. In case the multiple matching is to be performed, the multiple matching processing circuit outputs as the result of matching the matched term identifiers for the search terms which bear the multiple matching relation to one another.

Parenthetically, the multiple matching table is accessed by using the matched term identifier as the address, wherein the matched term identifiers for the search terms to undergo the multiple matching are stored at that address together with a next data address with which the multiple matching table is to be accessed upon making succeeding reference to that table, whereby a continuous addressing scheme is realized.

By virtue of these features, the matched term identifiers of a plurality of search terms bearing a multiple matching relation to one another can successively be outputted. Besides, since the matching ID table is so implemented as to be addressed with the state number, the number of the slots does not exceed the maximum number of the automaton states and hence the memory capacity can correspondingly be reduced, which can lead to miniaturization of the character string retrieving system;.

The principle of the matching processing incarnated in the character string retrieving system according to the sixth aspect of the present invention will be described below.

At first, through initialization, a specified matching automaton is stored in the state transition table, and the initial state number of the automaton is placed in the state number register as the current state number.

The matching operation begins, starting from the loading of an input text in the character code register on a character-by-character basis. The state transition table is accessed by using as the address the current state number stored in the state number register and a character code stored in the character code selector, whereby a succeeding state number is outputted from the state transition table. In parallel with this operation, the matching ID table is also accessed by using as the address the current state number and the character code, which results in that the matching identifier and the multiple matching flag are outputted from the matching ID table.

In this conjunction, it should be mentioned that the matching identifier of "0" (zero) indicates that no matching has been found with a search term of concern. Subsequently, the succeeding state number is stored in the state number register as the updated current state number. On the other hand, when the multiple matching flag as outputted is "0" (zero), i.e. in case the updated current state is a normal state, the operation mentioned above is repetitively performed. In the case where the multiple matching flag is "1", operation described below is carried out.

Since the multiple matching flag is "1" in this case, the character code selector continues to hold the character code already stored therein without any new character code being inputted to the character code selector. In this state, the state transition table and the matching ID table are accessed, as a result of which there are outputted the succeeding state number, the matching identifier and the multiple matching flag.

Subsequently, a succeeding state number is stored in the state number register and held as the current state number. Operation to be performed subsequently depends on whether the outputted multiple matching flag is "0" or "1".

By repeating the operations described above, the character string matching can be realized successfully.

In the case where the multiple matching for n search terms takes place for a given character code, (n−1) matching output dedicated states are established available. As a result, the multiple matching flag assumes a value of "1", whereon matching operation takes place (n−1) times to output the matching identifiers, correspondingly. Next, the multiple matching flag becomes "0", and the matching operation is effected once to output a matching identifier. In this manner, it is possible to output the matching identifiers for all n search terms which bear the multiple matching relation to one another. Thereafter, the normal matching operation can be regained.

Next, description will be made of the matching concept or principle incarnated in the character string retrieving system according to the seventh aspect of the present invention.

At an initialization processing step, the initial state number is placed in the initial state number register.

When the matching output dedicated state flip-flop has a set value of "1", this indicates that the transition destination state is the matching output dedicated state. On the other hand, when the value set at the matching output dedicated state flip-flop is "0", this means that the destination state for transition is the normal state. Since no matching can take place in the initial state, initial value of "0" is set at the matching output dedicated state flip-flop.

When the value set at the last matching output dedicated state flip-flop is "1", this indicates that the current state is the matching output dedicated state. When the value set at the last matching output dedicated state flip-flop is "0", this indicates that the current state is the normal state. Since the initial state can not be the matching output dedicated state, value of "0" is set at the last matching output dedicated state flip-flop as the initial value.

When the value set at the initial state transition flip-flop is "1", this indicates that the destination state for transition is the initial state. On the other hand, when the value set at that flip-flop is "0", this indicates that the transition destination state is other than the initial state. For starting the state transition from the initial state, the initial state transition flip-flop is set to "1" as initialization.

At first, comparison or collating operation in the normal state will be described.

The comparing operation begins, starting from the inputting of an input text to the character code register on a character-by-character basis.

The character code which is outputted from the character code register is sent to the character code selector. Since the matching output dedicated state flip-flop is set to "0", indicating that the current state is not the matching output dedicated state, the character code is sent out to the state transition table from the character code selector.

At that time, the last matching output dedicated flip-flop is set to "0" with the initial state flip-flop being set to "1". Accordingly, in this case, the state transition table is accessed by using as address the character code and the initial state number. Through this access, there are read out from the state transition table the matching output dedicated state flag, the initial state transition flag and the succeeding state number, respectively. At that time, the value "0" placed in the matching output dedicated flip-flop is sent out to the last matching output dedicated flip-flop. Thus, it is indicated that the current state is the normal state. The matching output dedicated state flag read out from the state transition table is stored in the matching output dedicated state flip-flop while the initial state transition flag as read out is stored in the initial state transition flip-flop.

When the value set at the matching output dedicated flip-flop is "0", this indicates that the destination state for transition is the normal state. In that case, the succeeding state number is stored in the state number register as the updated current state number.

When the value set at the initial state transition flip-flop is "0", the current state number stored in the state number register is selected by the current state selector to be subsequently outputted to the state transition table as the current state number. On the other hand, when the value of the initial state transition flip-flop is "1", the initial state number placed in the initial state number register is selected by the current state number selector to be outputted to the state transition table as the current state number, because the last matching output dedicated state flip-flop is set to "0".

Since the value set at the matching output dedicated state flip-flop is "0", a new character code is fetched and loaded in the character code register without interruption, whereon the comparing operation proceedes to a succeeding character code. In the normal state transition, operations described above are repeatedly performed.

When the value set at the matching output dedicated state flip-flop is "1", this indicates that the destination state of transition is the matching output dedicated state. In this case, the current state number in the state number register is not updated but the last succeeding state number remains as being held in the register. Consequently, the matched term identifier register is loaded with the matched term identifier along with an offset for reading out from the state transition table a slot which stores therein the next succeeding state number or the matched term identifier and the offset in the matching output dedicated state. The matching identifier is outputted as the result of the matching processing, while the offset is sent to the adder.

Since the value set at the initial state transition flip-flop is "0" because the transition destination state is the matching output dedicated state, the current state selector selects the last succeeding state number outputted from the state number register as the current state number which is then outputted to the state transition table as the current state number. The last matching output dedicated state flip-flop is newly loaded with "1" which is stored in the matching output dedicated state flip-flop. This indicates that the current state is the matching output dedicated state.

Since the matching output dedicated state flip-flop is set to "1", the character code register suspends the fetching of any new character code. Thus, the character code already stored is outputted to the adder and the character code selector, respectively, from the character code register. Since the value set at the matching output dedicated state flip-flop is "1", the character code selector selects the output of the adder, whereby a sum value of the offset and the character code is outputted to the state transition table as a character code.

The state transition table is accessed by using as address the current state number and the character code as outputted. Through this accessing, there are read out from the state transition table the matching output dedicated state flag, the initial stage transition flag and the succeeding state number, respectively. The value of "1" set at the matching output dedicated state flip-flop is placed in the last matching output dedicated state flip-flop. Thus, it is indicated that the current state is the matching output dedicated state. The initial state transition flag and the matching output dedicated state flag as read out are stored in the initial state transition flip-flop and the matching output dedicated state flip-flop, respectively.

When the matching output dedicated state flip-flop has a set value of "1", this indicates that the transition destination state continues to be the matching output dedicated state. In this case, the current state in the state number register is not updated but the register remains in the state in which the last succeeding state number is being held. Consequently, there are stored in the matched term identifier register the matched term identifier and the offset. The matched term identifier is outputted as the result of the matching processing, while the offset is sent to the adder.

Since the transition destination state is the matching result output dedicated state, the initial state transition flip-flop continues to hold the value of "0". The current state number selector continues to output to the state transition table the last succeeding state number stored in the state number register as the current state number. A value "1" stored in the matching output dedicated state flip-flop is transferred to the last matching output dedicated state flip-flop. It is thus indicated that the current state is the matching output dedicated state.

Because the matching output dedicated state flip-flop holds a value of "1", fetching of any new character code by the character code register is suspended, and the character code already stored in the character code register continues to be outputted to the character code selector and the adder. Since the value set at the matching output dedicated flip-flop is "1", the character code selector is selected, whereby the output of the adder is supplied to the state transition table. For the transition to the matching output dedicated state, the matched identifier and the offset stored in the state transition table are repeatedly read out by using as address the character code and the current state number remaining as being held in the character code register and the state number register, respectively, whereby the multiple matching processing is realized.

When the matching output dedicated state flag is "0", indicating that the transition destination state is the normal state, the succeeding state number is stored in the state number register as the updated succeeding state number, while the character code register fetches therein a new character code to allow the state transition from the matching output dedicated state to the normal state to be regained.

By repeating the operations described above, the character string matching processing can be realized.

In the case when n matching outputs are produced for a given character, n matching output dedicated states are allocated to the n matching outputs, respectively. As a result, the matching operation is effected n times with the matching output dedicated state flag being "1", whereby n matched term identifiers are outputted. By assigning the matching output dedicated states in this manner, the single matching can equally be realized by allocating one matching output dedicated state thereto. Thus, all the matching result outputs can be obtained in the matching output dedicated states.

As will be appreciated from the above, there is provided the character string retrieving system in which the matching identifiers for a plurality of search terms having the multiple matching relation can all be outputted by providing the matching output dedicated states.

BRIEF DESCRIPTION OF THE DRAWINGS

FIG. 5 is a view for illustrating an exemplary structure of a prior art state transition table;

FIG. 6 is a view for illustrating a prior art matching identification (ID) table;

FIG. 8 is a view for illustrating another exemplary structure of a prior art state transition table;

FIG. 9 is a view for illustrating another exemplary structure of the prior art matching identification (ID) table;

FIG. 12 is a view for illustrating a structure of a state transition table according to a teaching of the invention;

FIG. 13 is a view showing an exemplary structure of a matching ID table according to a teaching of the invention;

FIG. 15 is a view showing a structure of the matching ID table according to another embodiment of the invention;

FIG. 16 is a view for illustrating a matching flag adopted according to a teaching of the invention;

FIG. 18 is a view showing a structure of the matching ID table according to still another embodiment of the invention;

FIG. 19 shows a structure of a multiple matching table employed in a further embodiment of the invention;

FIG. 22 is a view showing a structure of the state transition table according a further embodiment of the invention;

FIG. 23 is a view showing a structure of the matching ID table according to a further embodiment of the invention;

FIG. 24 is a view for illustrating another structure of the matching flag according to the invention;

FIG. 25 is a view showing another exemplary structure of the matching ID table according to the invention;

FIG. 28 is a view for illustrating still another example of the state transition table according to the invention;

FIG. 32 is a view for illustrating a further example of the state transition table according to the invention;

FIG. 36 is a view for illustrating a still further exemplary structure of the state transition table according to the invention.

DETAILED DESCRIPTION OF THE PREFERRED EMBODIMENTS

Now, the present invention will be described in detail in conjunction with preferred or exemplary embodiments thereof by reference to the drawings.

Figure 10:
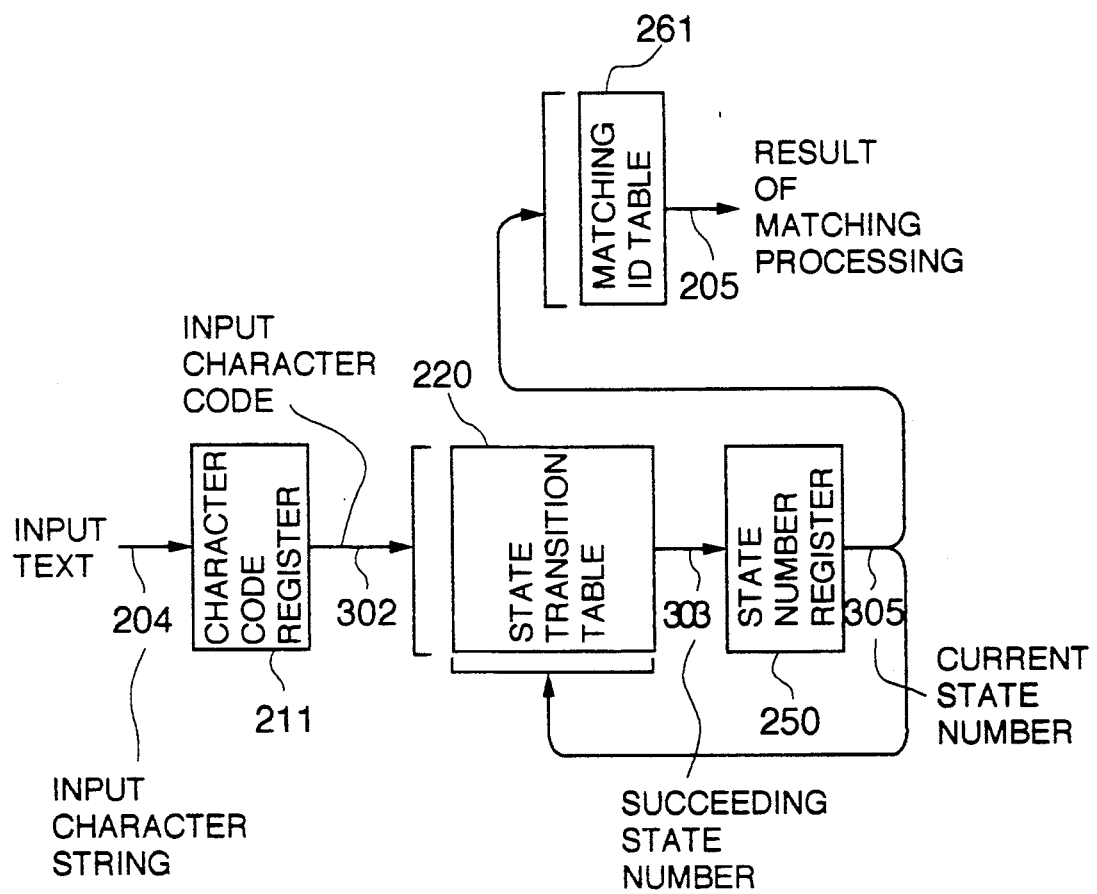
FIG. 10 shows in a schematic block diagram showing an arrangement of a character string matching circuit or system implemented according to an embodiment of the present invention.

FIG. 10 shows in a schematic block diagram a first embodiment of the character string matching (or collating) circuit incarnating the concept or principle of the present invention. With the instant embodiment, it is intended to realize a character string matching and retrieving system in a compact structure by implementing the matching ID table mentioned hereinbefore in conjunction with the prior art system such that the capacity of the memory therefor can be reduced to a possible minimum, for thereby realizing the character string matching/retrieving system in a reduced size.

The character string matching circuit or system according to the instant embodiment is composed of a character code register 211 to which an input text 204 to be subjected to the retrieval is inputted on a character-by-character basis, a state transition table 220 designed for storing an input character code 302 outputted from the character code register 211 together with a succeeding state number indicated at 303 corresponding to a current state number indicated at 305, a state number register 250 for holding the succeeding state number 303 outputted from the abovementioned state transition table 220 as the current state number 305, and a matching ID table 261 for storing an identifier of a search term (i.e. term designated or specified for search or retrieval) in correspondence to the current state number 305 outputted from the state number register 250 as the result of the matching processing.

Now, description will be made generally of operation of the character string matching circuit shown in FIG. 10.

In the first place, through initialization processing, the state number 0 (zero) is placed in the state number register 250, which number is regarded as the current state number 305, as mentioned above.

The matching operation begins, starting from the inputting of the input text 204 to the character code register 211 on a character-by-character basis. The state transition table 220 is accessed by using as the addresss the character code 302 outputted from the character code register 211 and the current state number information 305 outputted from the state number register 250, whereby the succeeding state number 303 is outputted from the state transition table 220 and is held in the state number register 250 as the renewed or updated current state number 305. The matching ID table 261 is accessed by using as the address the current state number 305 outputted from the state number register 250, whereby the identification number or identifier of the search term is outputted from the matching ID table 261 as the result of the matching processing, as indicated at 205.

Figure 11:
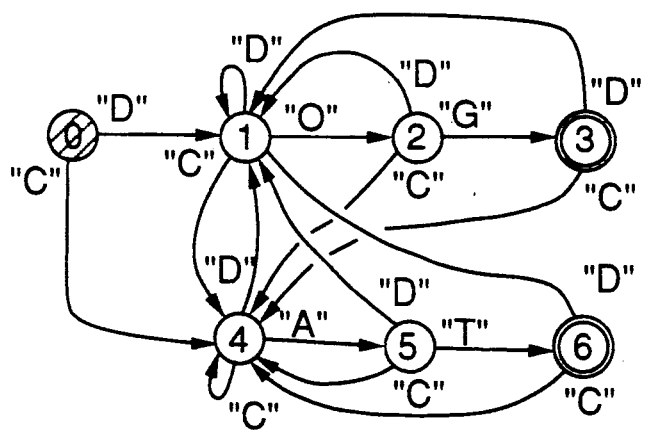
FIG. 11 is a view showing a state transition diagram of an automaton for realizing a character string matching operation according to a teaching of the invention.

FIG. 11 is a diagram showing in concrete a configuration of an automaton for realizing the character string matching operation. In this conjunction, it should be recalled that in the case of the prior art system described hereinbefore, the matching ID table is so structured as to be accessed with the entry including the current state number and the state number of the destination state to which state transition occurs upon appearance of the trailing character of the search term. In contrast, in the case of the automaton shown in FIG. 11, a transition destination state is newly created to which the state transition is made upon appearance of the trailing character constituting the last one of the search term or character string.

Figure 4:
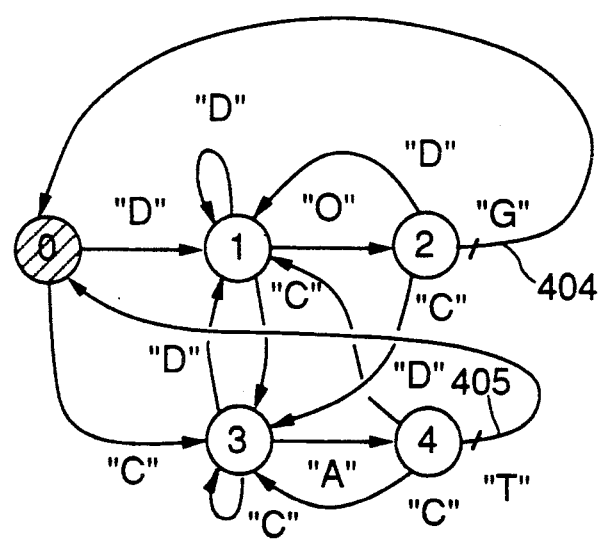
FIG. 4 shows a state transition diagram of an automaton employed in the prior art character string matching circuit.

More specifically, the automaton shown in FIG. 11 is designed to make matching, for example, of "DOG" and "CAT" as with the case of the automaton shown in FIG. 4, wherein the matched result of "DOG" is outputted to the state 3 corresponding to the transition destination state to which transition is to be made upon appearance of "G", the trailing character of "DOG", while the matched result of "CAT" is outputted to the state 6 representing the destination state to which transition is to be made upon occurrence of the trailing character "T" of the character string "CAT". The state indicated as enclosed by double circles such as the states 3 and 6 represents the state from which the matched result (i.e. the result of matching processing) is to be outputted. In other words, the matched term identifiers of the search terms are stored in the matching ID table in correspondence to the identification numbers of the states to which the matched results are outputted.

The automaton now under consideration begins the state transition, starting from the state 0 (zero). When the input character is "D" in the initial state, state transition occurs to the state 1 (one), while the input character of "C" causes the automaton to transit to the state 4. Similarly, appearance of the input character "O" in the state 1 brings about the state transition to the state 2, while the input character "D" brings about the state transition to the state 1 with the input character "C" making the automaton transit to the state 4. Finally, upon inputting of the character code "G" in the state 2, state transition occurs to the state 3 shown as enclosed by double circles, whereupon the matched term identifier of "DOG" is outputted from the matching ID table 261 as the result of matching processing.

The matching operation of the automaton according to the instant embodiment of the invention will be understood from the above. FIG. 12 shows a concrete example of the state transition table 220 used in the instant embodiment, and FIG. 13 shows an examplary structure of the matching ID table 261. There are stored in these tables 220 and 261 the automaton for retrieving "DOG" and "CAT" as shown in FIG. 11 as well as the matched term identifiers for the search terms to be outputted when matching for "DOG" and "CAT" have been performed.

The state transition table 220 shown in FIG. 12 is so configured as to be addressed with the input character code 302 and the current state number 305. Assuming, for example, that the current state number 305 is 1 (one) with the input character code 302 being "O" is outputted as the succeeding state number as indicated at 303.

On the other hand, the matching ID table 261 shown in FIG. 13 is so implemented as to be addressed with the current state number 305. By way of example, when the numerical value of the current state number 305 is 3 (indicating that "DOG" has been detected), the corresponding matched term identifier of the search term having a value of 1 is outputted as the result of the matching processing. In this conjunction, it should be noted that the matched term identifier having a value of 0 (zero) indicates that the matching could not been been found.

As will be understood from the above, by virtue of such arrangement that the destination state to which state transition takes place in response to the trailing character of the search term or character string is created, wherein the matching ID table 261 is accessed with the destination state number with the result of matching being outputted as the matched term identifier of the search term, there can be realized a character string matching circuit with a reduced amount of hardware including the matching ID table 261 of a smaller capacity.

In contrast to the fact that the matching ID table 261 of the prior art character matching system requires a number of slots corresponding to a product of "maximum state number" and "the number of different types of character codes", the matching ID table 261 of the character string matching circuit according to the instant embodiment requires no more than a number of slots corresponding to the maximum or greatest state number, which in turn means that a memory of a small capacity is sufficient for realizing the matching ID table 261 and that the character string matching circuit or system can be realized in a reduced size.

Figure 14:
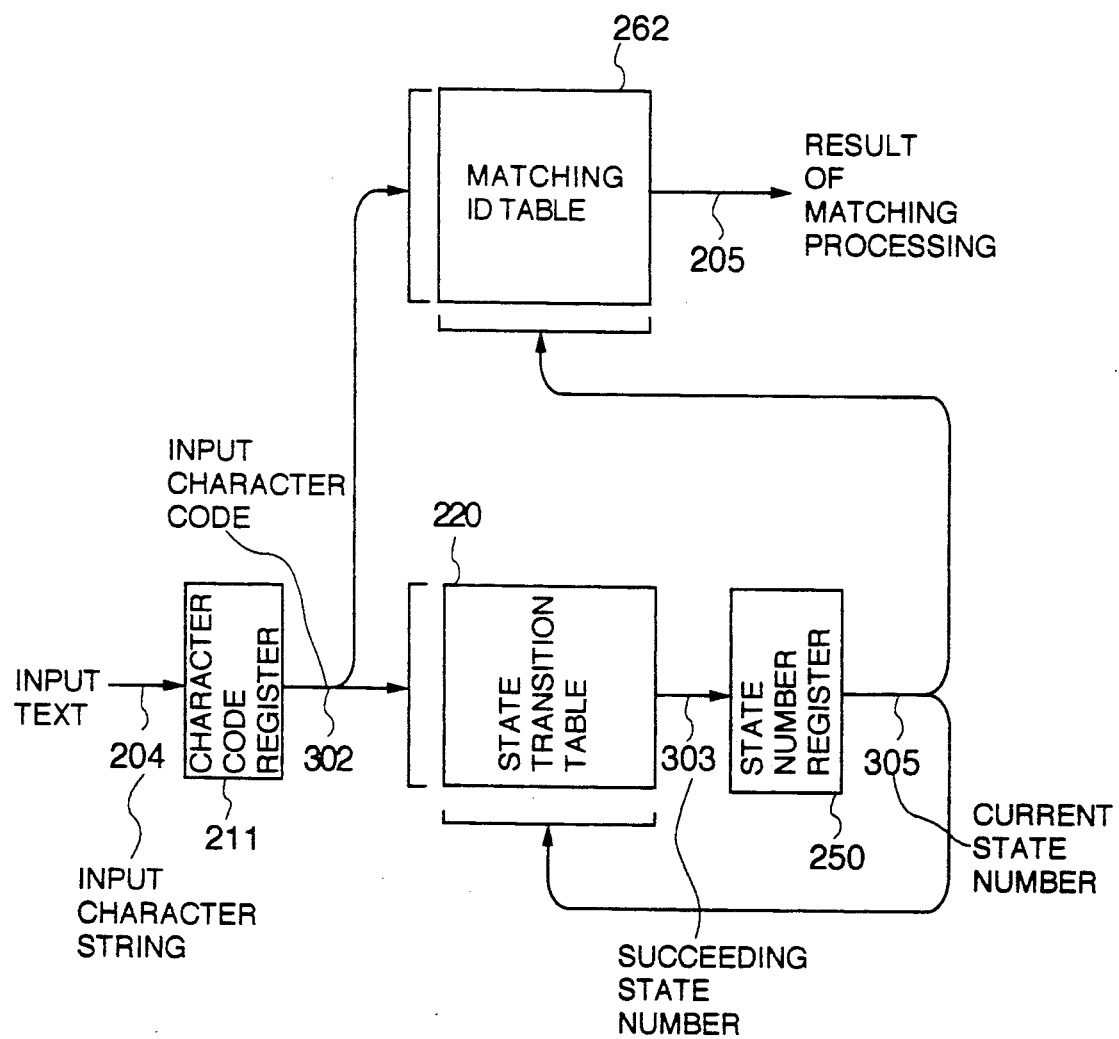
FIG. 14 is a functional block diagram showing an arrangement of the character string matching circuit according to another embodiment of the invention.

FIG. 14 is a functional block diagram showing a character string matching circuit according to a second embodiment of the invention. With the second embodiment of the character string matching circuit, it is intended to carry out the matching of search terms without omission even upon occurrence of the multiple matching discussed previously.

The character string matching circuit according to the instant (second) embodiment is composed of a character code register 211 to which an input text 204 to be subjected to the retrieval is inputted on a character-by-character basis, a state transition table 220 configured for storing the input character code 302 outputted from the character code register 211 and a succeeding state (ID) number 303 corresponding to a current state number 305, a state number register 250 for holding the succeeding state number 303 outputted from the above-mentioned state transition table 220 as the current state number 305, and a matching ID table 262 for storing identifiers of search terms in correspondence to the input character codes 302 outputted from the state number register 250 and the current state number 305 as the result of the matching processing.

At this juncture, it should be recalled that in the case of the prior art character string matching system, the matching ID table is destined to store the matched term identifiers of the search terms. In contrast, according to the teaching of the invention incarnated in the instant embodiment, arrangement is made such that the identifier of the search term to be subjected to the matching is represented by one bit information so that a plurality of the search term identifiers can be stored in one slot of the matching ID table. By way of example, by establishing a correspondence between the bit n of a matched term identifier storage area (slot) and a matching flag for n-th search term, it is possible to output simultaneously the results of matching for a plurality of search terms. In this manner, even upon occurrence of the multiple matching, the matched term identifiers for the relevant search terms can simultaneously be outputted as the bit information without any omission.

Now, description will be made in detail of the character spring matching operation of the system according to the instant embodiment of the invention.

Through the initialization processing, the state number 0 (zero) is set at the state number register 250 and is regarded as representing the current state number 305.

The matching operation begins, starting from the inputting of the input text 204 to the character code register 211 on a character-by-character basis. The state transition table 220 is accessed with the character code 302 outputted from the character code register 211 and the current state number 305 outputted from the state number register 250, whereby the succeeding state number 303 is outputted from the state transition table 220 to be subsequently held in the state number register 250 as the renewed current state number 305. The matching ID table 262 is accessed by using as the address the current state number 305 outputted from the state number register 250 and the character code 302, whereby the matched term identifier of the search term is outputted from the matching ID table 262 as the result of the matching processing, as indicated at 205.

By repeating the operations described above, the character string matching operation can be realized.

Figure 7:
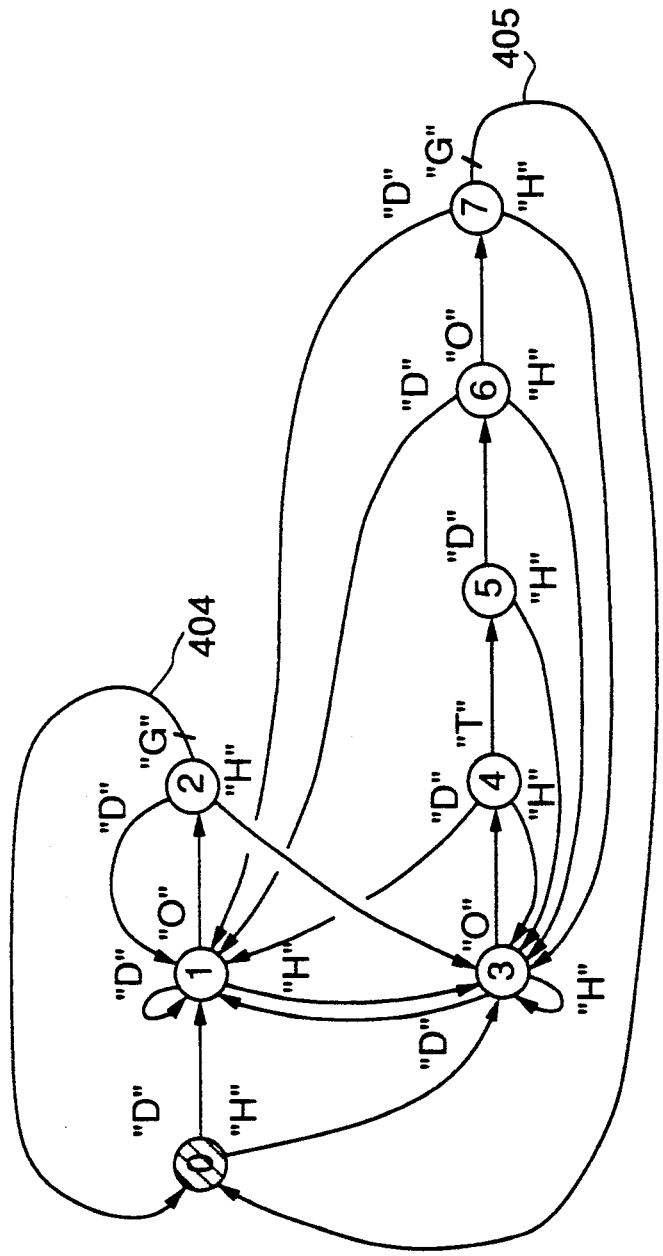
FIG. 7 is a state transition diagram of another prior art automaton.

The following description is directed to operation of the matching circuit according to the instant embodiment of the invention on the assumption that the automaton shown in FIG. 7 is used. Thus, the automaton used in the instant embodiment is of the utterly same structure as that used in the prior art system described hereinbefore. Accordingly, the state transition table 220 is also same as that used in the prior art system described hereinbefore. It is however to be noted that the matching ID table 262 is structured to store the search term identification information as one bit information and allow simultaneous matching for a plurality of search terms, as will be elucidated below, in contrast to the prior art system in which the matching ID table is arranged to store the matched term identifier of the search term. More specifically, FIG. 7 shows the automaton for performing matching processing for "DOG" and "HOTDOG". As an example for illustrating operation of the circuit according to the instant embodiment upon occurrence of the multiple matching, it is assumed in the following description that "HOTDOG" is inputted as an input character string or input text.

State transition in this automaton starts from the initial state 0 (zero).

Since the first input character is "H" on the above assumption, there takes place the state transition to the state 3. Next, since the input character is "O" in the state 3, automaton goes to the state 4. Similarly, the input character "T" in the state 4 causes the automaton to make transition to the state 5, being followed by the transition to the state 6 from the state 5 in response to the input character "D". The input of the character "O" in the state 6 causes the automaton to transit to the state 7. Since the input of the character "G" in the state 7 indicates the state transition for outputting the result of the matching processing, the matched term identifier for the search term corresponding to the matching result of "HOTDOG" is outputted from the matching ID table 262 as the bit information, whereupon state transition to the state 0 takes place simultaneously.

The matching operation in general of the system according to the instant embodiment will be understood from the above. Now, description will be directed to an exemplary structure of the matching ID table 262 by reference to FIG. 15. As mentioned previously, the matching ID table 262 is designed to store as the bit information the matched term identifiers of the search terms for performing matching processing for "DOG" and "HOTDOG", as described above by reference to FIG. 7.

Referring to FIG. 15, a numerical value of "3" stored in the slot 500 corresponding to the current state number of 7 and the input character G indicates the multiple matching processing. In other words, it is indicated that matching processing has been performed for both the first search term "DOG" and the second search term "HOTDOG".

FIG. 16 shows a structure of a multiple matching flag stored in the slot 500 of the matching ID table 262. Each of the matching flags corresponds to a search term in such a manner that a first search term is allocated with a 0-bit position, a second one is allocated with a first bit position and so forth.

In the case of the example illustrated in FIG. 16, "00000001" ($2^0$-bit) is assigned as the matching flag for "DOG" with "00000010" ($2^1$-bit) being assigned as the matching flag to the term "HOTDOG". Since "HOTDOG" is given as the input character string in the case of the example under consideration, it is necessary to output as the result of matching not only "HOTDOG" but also "DOG" which constitutes a trailing character substring of the character string "HOTDOG". Accordingly, the matching flag representing a logical product of "HOTDOG" and "DOG", i.e. "00000011" ($2^1$-bit OR $2^0$-bit) is set.

Thus, when the matching processing has been executed for the term "HOTDOG", there is outputted from the matching table the matching flag "00000011" as the result of matching. From this information, it can discriminatively be identified that "DOG" (00000001) and "HOTDOG" (00000010) have undergone the matching.

As will now be appreciated from the above, according to the teaching of the invention incarnated in the instant embodiment, it is possible to output simultaneously the results of the multiple matching for a plurality of search terms without omission by virtue of such arrangement that the identification information of the search term accessed with the state number and the character code is stored as the one bit information.

In the case of the instant embodiment, the bit width of the slot of the matching ID table 262 has to be set in accordance with the number of the search term.

Thus, the capacity of the matching ID table 262 will be in proportion to the number of the search terms. In the case of the instant embodiment, matching output can be obtained for eight search terms.

Figure 17:
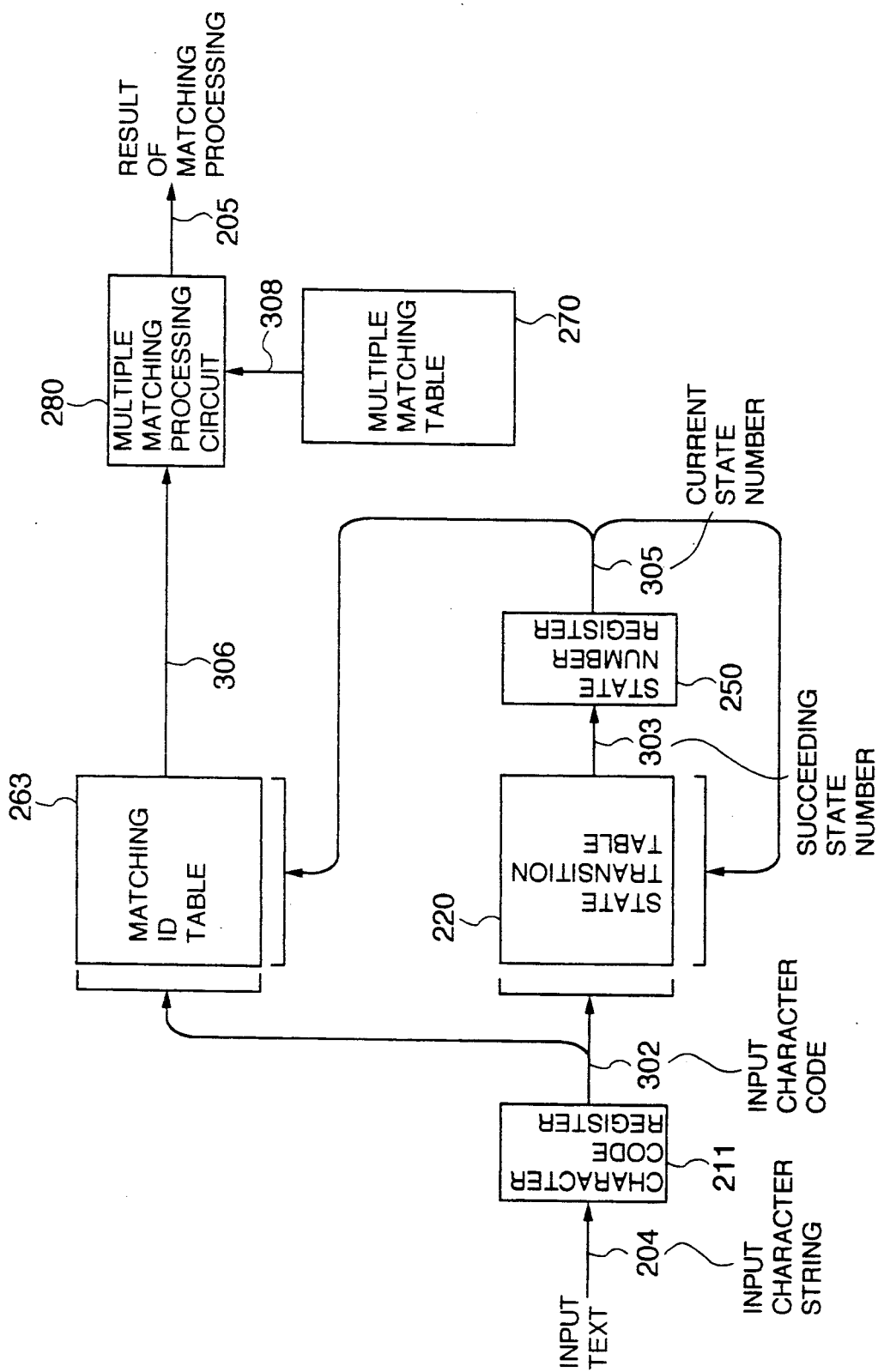
FIG. 17 is a functional block diagram showing an arrangement of the character string matching circuit according to still another embodiment of the invention.

FIG. 17 is a functional block diagram showing a third embodiment of the character string matching circuit according to the invention. With the arrangement described above in conjunction with the second embodiment, the problem of possible omission of matching in the case of the multiple matching can certainly be solved. However, there arises problem that the capacity of the matching ID table increases in proportion to the number of the search terms. In contrast, with the third embodiment of the invention, it is contemplated to make it possible to perform matching of the search terms without omission even upon occurrence of the multiple matching while solving the problem that the memory capacity for the matching ID table increases in proportion to the number of the search terms.

Referring to FIG. 17, the character string matching circuit according to the third embodiment of the invention includes a character code register 211 for inputting an input text 204 which is subjected to retrieval on a per character basis, a state transition table 220 for storing an input character code 302 outputted from the character code register 211 and a succeeding state number 303 corresponding to a current state number 305, a state number register 250 for holding as the current state number 305 the succeeding state number 303 outputted from the state transition table 220, a matching ID table 263 for storing as the matching result the matched term identifiers of the search terms in correspondence to the current state number 305 outputted from the state number register 250, a multiple matching processing circuit 280 for outputting as the matching processing result the matched term identifiers of the search terms having the multiple matching relation from the matching ID table 263, and a multiple matching table 270 for storing information for the multiple matching relations.

Now, description will be made generally of operation of the character string matching circuit shown in FIG. 17.

In the first place, at an initialization step, the state number 0 is placed in the state number register 250, which number is held as the current state number 305, as mentioned previously.

The matching operation begins, starting from the inputting of the input text 204 to the character code register 211 on a character-by-character basis. The state transition table 220 is accessed by using as the address the character code 302 outputted from the character code register 211 and the current state number 305 outputted from the state number register 250, whereby the succeeding state number 303 is outputted from the state transition table 220, which is then to be held in the state number register 250 as the updated current state number 305. The matching ID table 263 is accessed by using as the address the current state number 305 outputted from the state number register 250, whereby the matched term identifier is outputted to the multiple matching processing circuit 280. The multiple matching processing circuit 280 makes decision on the basis of the matched term identifier inputted thereto as to whether the multiple matching is to be performed by referring to the multiple matching table 270. When the answer of this decision is affirmative (Yes), the matched term identifiers of the search terms which are in multiple matching relation are outputted as the matching result 205. In this way, there are stored in the multiple matching table 270 the matched term identifiers of the search terms which are to undergo the multiple matching in correspondence to the identifiers of the search terms.

By repeating the operations described above, the matching processing for the input character strings can be carried out.

The following description will be made on the assumption that the automaton is of the utterly same configuration as that of the prior art system shown in FIG. 7, which in turn means that the state transition table 220 is also of the same structure as that of the prior art system. However, the matching ID table 263 according to the instant embodiment of the invention is designed to store the identifier information of the search terms to undergo the multiple matching for indicating simultaneously the matchings for a plurality of search terms, in contrast to the prior art system in which the matching ID table is designed to store the term identifier for the simple matching. Parenthetically, the automaton shown in FIG. 7 is for the matching of "DOG" and "HOTDOG". In the following description directed to the multiple matching, it is again assumed that the input character string "HOTDOG" is inputted.

State transition of this automaton starts from the initial state 0 (zero).

Since the first input character is "H" on the above assumption, there occurs state transition to the state 3. Next, the input character of "O" in the state 3 brings about state transition to the state 4. Similarly, the input character "T" in the state 4 causes the automaton to go to the state 5, being followed by the transition to the state 6 from the state 5 in response to the input of the character code "D". The input of the character code "O" in the state 6 causes the automaton to transit to the state 7. Since the input of the character "G" in the state 7 indicates the state transition for outputting the matching result, the matched term identifier for the search term corresponding to the matching result of "HOTDOG" is outputted from the matching ID table 263, and at the same time the automaton regains the state 0.

The matching operation in general of the character string matching circuit according to the instant embodiment will be understood from the above. Now, description will be directed to an exemplary structure of the matching ID table 263 by reference to FIG. 18. As mentioned previously, the matching ID table 263 is designed to store the identifier information of the search terms for performing multiple matching for "DOG" and "HOTDOG", as described above by reference to FIG. 7.

Referring to FIG. 18, an identifier "100" stored in the slot 500 corresponding to the current state number of 7 and the input character G indicates the multiple matching of "DOG" and "HOTDOG". In this manner, by allocating the identification code greater than "100" to the term identifier for the multiple matching while allocating the identification codes in a range of "1" to "100" to the term identifier for the simple matching such as the identification code of "1" corresponding to the state number of 2 and the input character "G", it is possible to discriminatively identify the multiple matching from the other matching such as the simple matching.

Next, description will be turned to the operation of the multiple matching-processing circuit 280 designed to output as the matched result the matched term identifiers of the search terms having the multiple matching relation on the basis of the matched term identifiers outputted from the matching ID table 263. The multiple matching processing circuit 280 is additionally equipped with the multiple matching table 270 for storing a group of matched term identifiers of the search terms having the multiple matching relation in the slot which can be accessed by the matched term identifier. The matching ID table 270 stores a group of codes in two fields for the matched term identifiers and next data addresses, which fields can be accessed by using as address the matched term identifier.

There are stored in the matched term identifier field the matched term identifiers of the search terms to undergo the multiple matching, which field is continued on the next data address field where the addresses to be next referred are stored.

Now, operation of the instant embodiment will be described.

Referring to FIG. 19 which shows an exemplary structure of the multiple matching table 270, operation of the multiple matching processing circuit 280 according to the instant embodiment will be described in detail. The multiple matching table 270 shown in this figure corresponds to the automaton shown in FIG. 7. In the matching ID table 263, a numerical value of "100" stored at the entry designated by the current state number of 7 and the input character "G" indicates that what is concerned is the multiple matching. When identifier value "100" which is the matched term identifier of the search term is outputted from the matching ID table 263, the multiple matching processing circuit 280 first outputs "1" which is the matched term identifier of "DOG" stored at the address "100" of the multiple matching table 270 corresponding to the matched term identifier "100". In this case, since the next data address is "200", the matched term identifier "2" for "HOTDOG" stored at the address "200" is also outputted. Then, the next data address becomes "−1". Accordingly, any succeeding matched term identifier is not outputted.

In this manner, matching can correctly be performed for both "DOG" and "HOTDOG" upon inputting of the character string "HOTDOG" for which the multiple matching is to be performed, whereby the multiple matching of the search terms can be carried out without any omission.

When the matched term identifier inputted to the multiple matching processing circuit 280 is a matched term identifier on the order of "100", it is then decided that the result of the multiple matching should be outputted, whereon the multiple matching table 270 is referred to. On the other hand, when the matched term identifier is represented by a numerical value smaller than "100", decision is made that the simple matching is to be performed. Accordingly, the matched term identifier is outputted straightforwardly as the result of matching without referring to the multiple matching table 270.

When decision is made that the multiple matching is to be performed, the corresponding matched term identifier is outputted from the multiple matching table 270. Subsequently, the next data address is referred to, whereon the matched term identifier bearing the multiple matching relation at that address is outputted as the result of matching. Similarly, a next data address succeeding to the abovementioned data address is referred to for outputting the next matched term identifier of the search term the multiple matching relation. When the next data address contains the termination code ($-1$), it is then decided that there exists no more the search term having the multiple matching relation. Accordingly, the result of matching is no more outputted. It should be noted that by using "$-1$" as the termination code, the matched term identifier of the search term can be discriminated from the termination code.

As will now be appreciated, according to the teachings of the invention incarnated in the instant embodiment, the multiple matching can be realized while solving successfully the problem that the memory capacity of the matching ID table 263 will otherwise increase in proportion to the number of the search terms.

Figure 20:
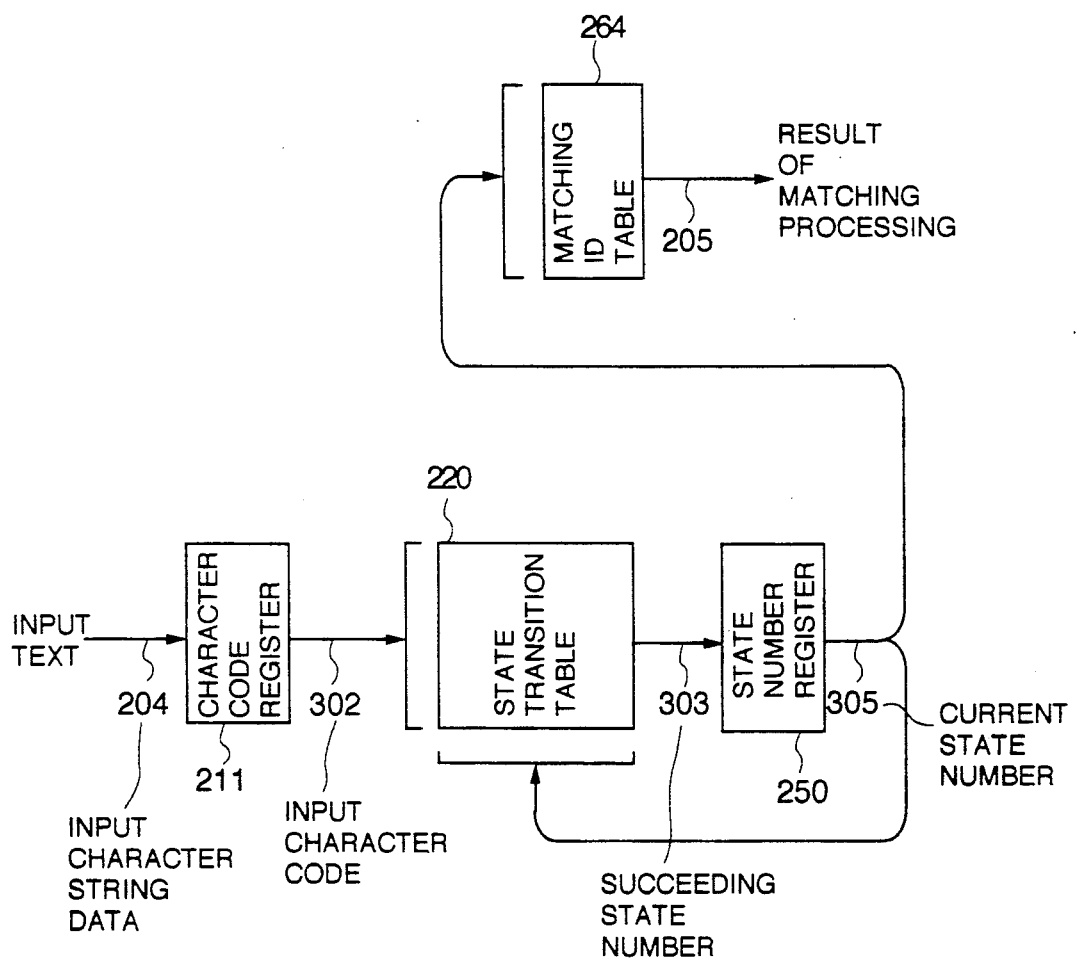
FIG. 20 is a functional block diagram showing an arrangement of the character string matching circuit according to a further embodiment of the invention.

FIG. 20 shows in a schematic block diagram a fourth embodiment of the character string matching system incarnating the principle of the present invention. The instant embodiment of the character string matching circuit is intended to solve the problem of the multiple matching which can not be realized with the first embodiment while implementing the matching ID table with a reduced memory capacity to thereby provide a compact structure of the character string retrieving system.

The character string matching circuit according to the instant embodiment is composed of a character code register 211 to which an input text 204 to be subjected to the retrieval or search is inputted on a character-by-character basis, a state transition table 220 adapted to store an input character code 302 outputted from the character code register 211 and a succeeding state number 303 corresponding to a current state number 305, a state number register 250 for holding the succeeding state number 303 outputted from the abovementioned state transition table 220 as the current state number 305, and a matching ID table 264 for storing matched term identifier in correspondence with the current state number 305 outputted from the state number register 250 as the result of matching processing.

In conjunction with the arrangement mentioned above, it should be recalled that in the case of the first embodiment of the invention, the matching ID table is destined to store the identification numbers of the search terms. In contrast, according to the teachings of the invention incarnated in the instant embodiment, arrangement is made such that the matching information of the search term is represented by the one bit information so that a plurality of the matched term identifiers can be stored in one slot of the matching ID table 264. By way of example, by establishing a correspondence between the bit n of a matching identifier storing slot and a matching flag for the n-th search term, it is possible to output simultaneously the matched results for a plurality of the search terms. In other words, even when the multiple matching takes place, the relevant matched term identifiers can simultaneously be outputted as the bit information without any omission.

Now, description will be made in general of operation of the character string matching circuit shown in FIG. 20.

By the initialization processing, the state number 0 (zero) is set at the state number register 250, which is held as the current state number 305.

The matching operation starts from the inputting of the input text 204 to the character code register 211 on a character-by-character basis. The state transition table 220 is accessed by using as the address the character code 302 outputted from the character code register 211 and the current state number 305 outputted from the state number register 250, whereby the succeeding state number 303 is outputted from the state transition table 220 to be held in the state number register 250 as the updated current state number 305. The matching ID table 264 is accessed by using as the address the current state number 305 outputted from the state number register 250, whereby the matched term identifier is outputted from the matching ID table 264 as the result of matching, as indicated at 205.

By repeating the operation described above, the character string matching operation can be realized.

Figure 21:
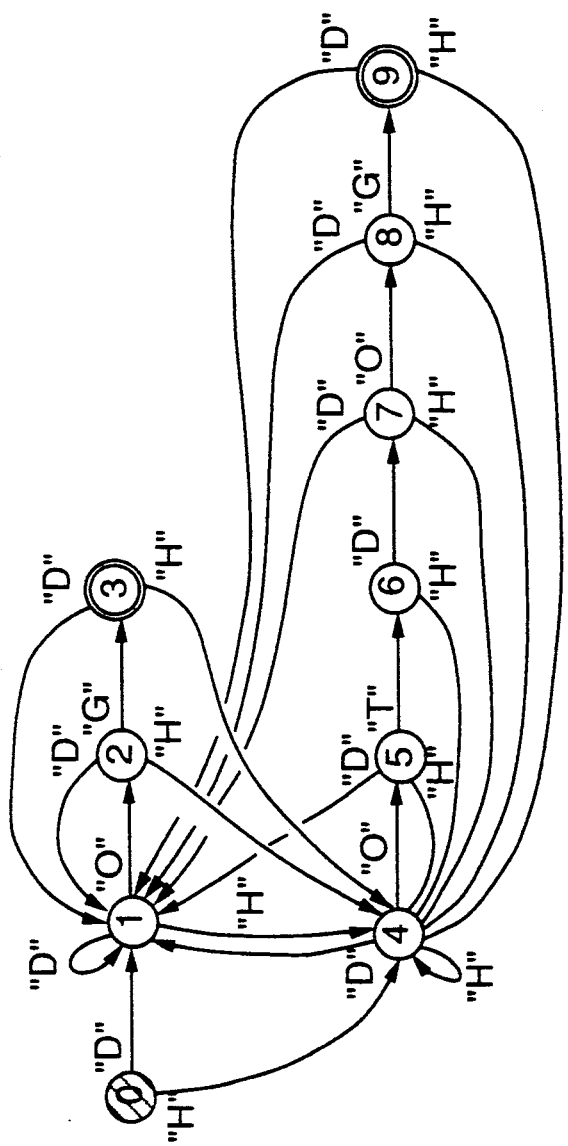
FIG. 21 is a state transition diagram of an automaton employed in the character string matching circuit shown in FIG. 20.

The following description is directed to operation of the character string matching circuit according to the instant embodiment on the assumption that an automaton shown in FIG. 21 is used which is of the utterly same structure as that used in the first embodiment of the invention described hereinbefore. Accordingly, the state transition table 220 is also of the same structure as that employed in the first embodiment. It is however to be noted that the matching ID table 264 is designed to store the matched term identifier as one bit information to thereby allow a plurality of search terms to be simultaneously matched, as will be described below, in contrast to the matching ID table of the first embodiment which is arranged to store the matched term identifier in the form of the code.

Now turning to FIG. 21, there is shown an automaton for performing the matching on the terms "DOG" and "HOTDOG". As an example for illustrating operation upon occurrence of the multiple matchings, it is assumed in the following description of the instant embodiment that "HOTDOG" is inputted as an input character string.

State transition in this automaton starts from the initial state 0 (zero).

Since the first input character is "H" on the above assumption, there occurs state transition to the state 4. Next, the input character of "O" in the state 4 brings about state transition to the state 5. Similarly, the input character "T" in the state 5 causes the automaton to make transition to the state 6, being followed by the transition to the state 7 from the state 6 in response to the input of the character "D". The input of the character "O" in the state 7 causes the automaton to transit to the state 8. The input of the character "G" in the state 8 brings about the state transition to the state 9 indicated as enclosed by double circles, whereon the matched term identifier corresponding to the matching result of the search term "HOTDOG" is outputted from the matching ID table 264 as the bit information.

The matching operation in general of the character string matching circuit according to the fourth embodiment of the invention will be understood from the above. Now, description will be directed to exemplary structures of the state transition table 220 shown in FIG. 22 and the matching ID table shown in FIG. 23, respectively. As previously mentioned, the tables used in the instant embodiment are adapted to store the automaton for performing the matching on the terms "DOG" and "HOTDOG" described above by reference to FIG. 21 and the matched term identifiers as the bit information, respectively.

The state transition table 220 shown in FIG. 22 is so configured as to be addressed with the input character code 302 and the current state number 305. Assuming, for example, that the current state number 305 is 1 (one) with the input character code 302 being "0", the state number of 2 which corresponds to the combination of 1 and "0" is outputted as the succeeding state number 303.

On the other hand, in the matching ID table 264 shown in FIG. 23, a numerical value of 3 stored in the slot 501 corresponding to the current state number of 9 indicates the multiple matching. In other words, it is indicated that matching has been performed for both the first search term "DOG" and the second search term "HOTDOG".

FIG. 24 shows a structure of multiple matching flags stored in the slot 501 of the matching ID table 264. Each of the matching flags corresponds to a search term to be matched in such a manner that a first search term is allocated with a 0-bit position, a second one is allocated with a first bit position and so forth.

In the case of the example now under consideration, "00000001" ($2^0$-bit) is assigned as the matching flag to the term "DOG" with "00000010" ($2^1$-bit) being assigned as the matching flag to the term "HOTDOG". Since the term "HOTDOG" is assumed to be the input character string in the case of the example now under consideration, it is necessary to output as the result of matching not only "HOTDOG" but also "DOG" which constitutes a trailing character substring of the character string "HOTDOG". Accordingly, the matching flag representing a logical product of "HOTDOG" and "DOG", i.e. "00000011" ($2^1$-bit OR $2^0$-bit) is set.

Thus, when the term "HOTDOG" has been matched, there is outputted from the matching table the matching flag "00000011" as the result of matching. From this information, it can be identified that matchings of "DOG" (00000001) and "HOTDOG" (00000010) have been accomplished.

As will now be appreciated, according to the teachings of the invention incarnated in the instant embodiment, it is possible to output simultaneously the results of the multiple matchings for a plurality of retrieval terms without omission by virtue of such arrangement that the identification information of the search terms which can be accessed with the state number and the character code is stored as the one bit information.

In the case of the instant embodiment, the bit width of the slot of the matching ID table 264 has to be so set as to conform with the number of the terms to be retrieved.

Thus, the capacity of the matching ID table 264 is in proportion to the number of the search terms. In the case of the instant embodiment, matching result can be outputted for eight terms specified or designated for the retrieval.

Next referring to FIG. 1, a fifth embodiment of the character string matching system according to the invention will be described. With the instant embodiment, it is contemplated to solve the problem that the memory capacity increases in proportion to the number of the serch terms to be retrieved, as described just above in conjunction with the fourth embodiment.

Figure 1:
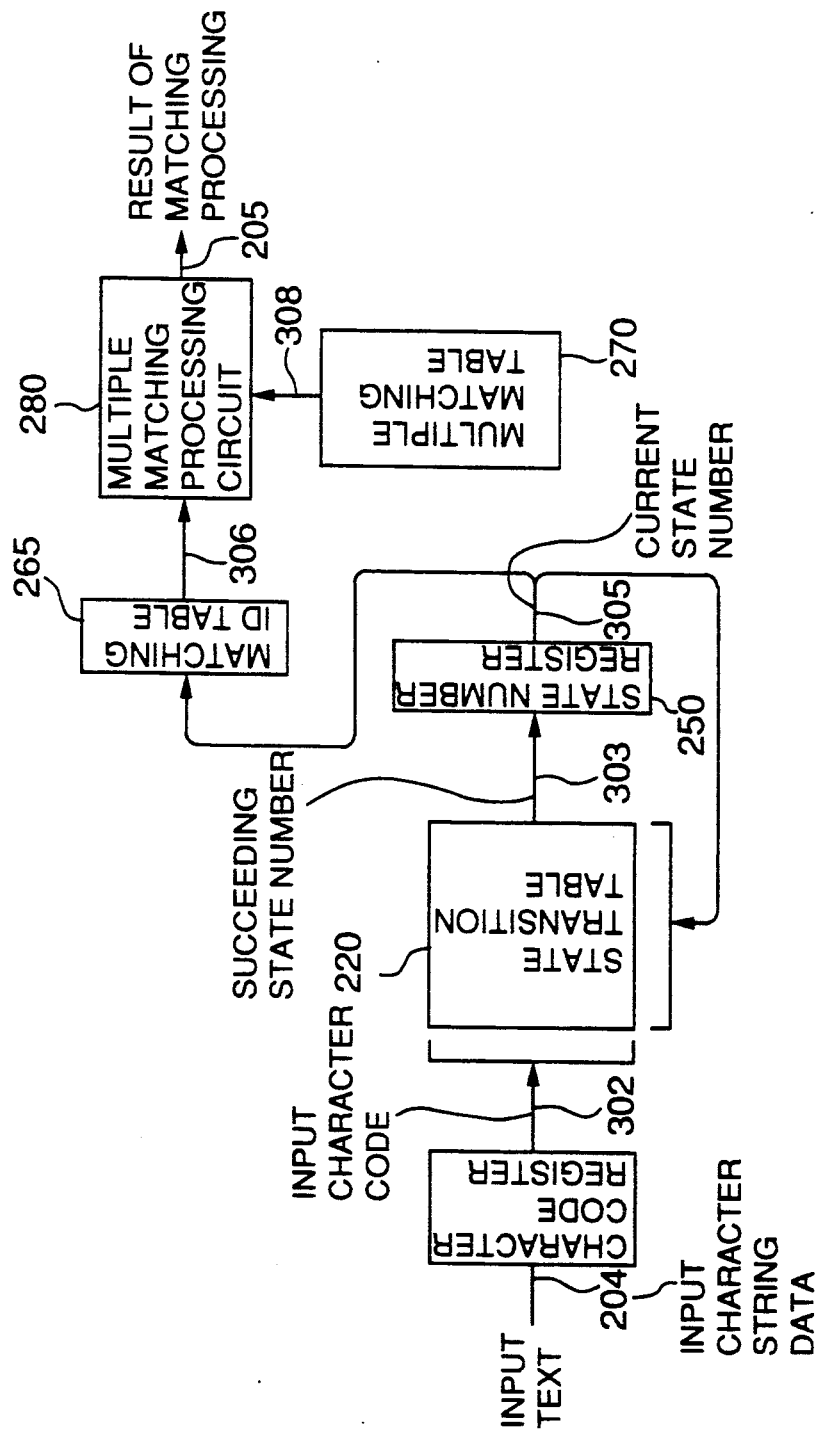
FIG. 1 is a schematic block diagram showing a general arrangement of a character string matching circuit according to an embodiment of the invention.
Figure 2:
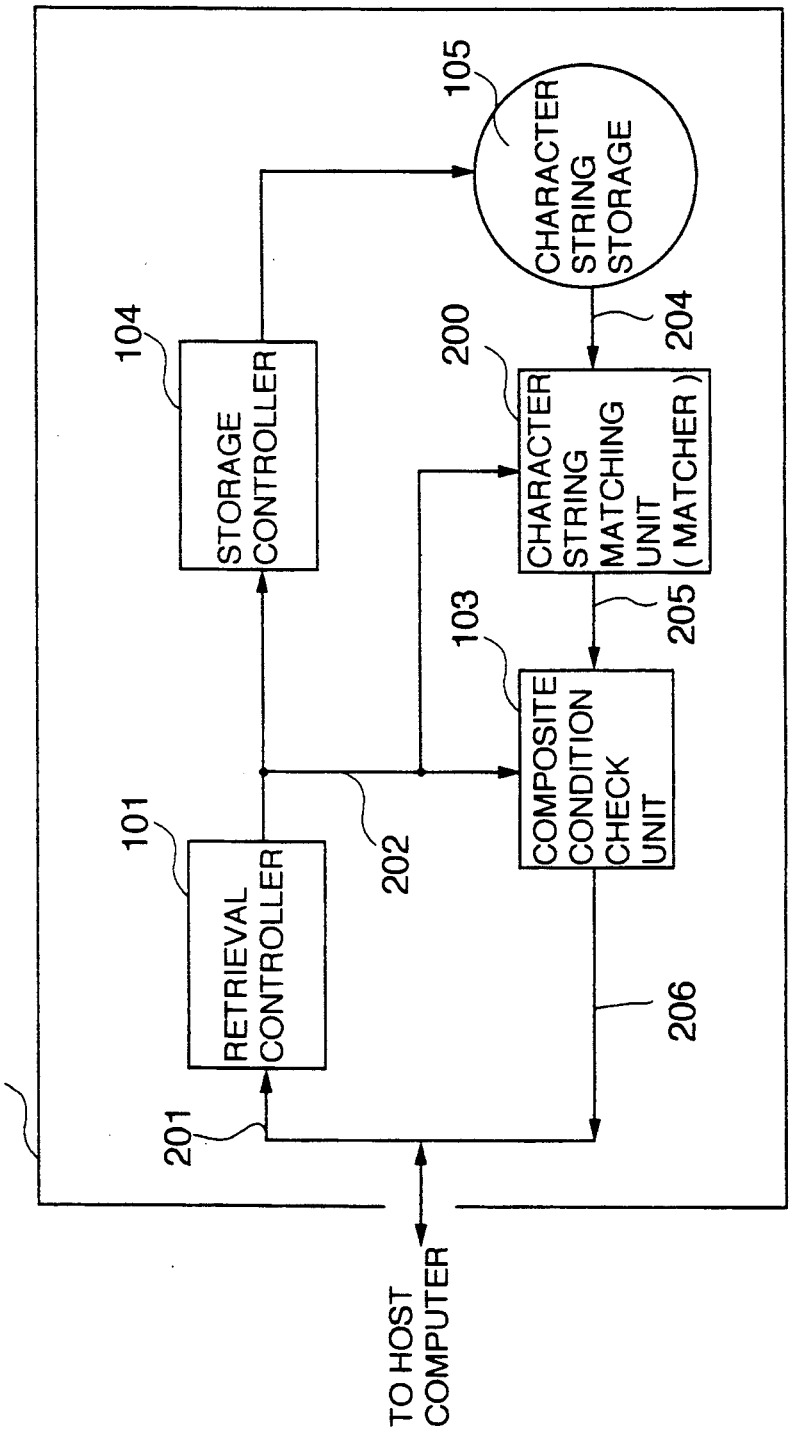
FIG. 2 is a schematic block diagram showing schematically a general arrangement of a typical character string retrieving system for illustrating operation thereof.
Figure 3:
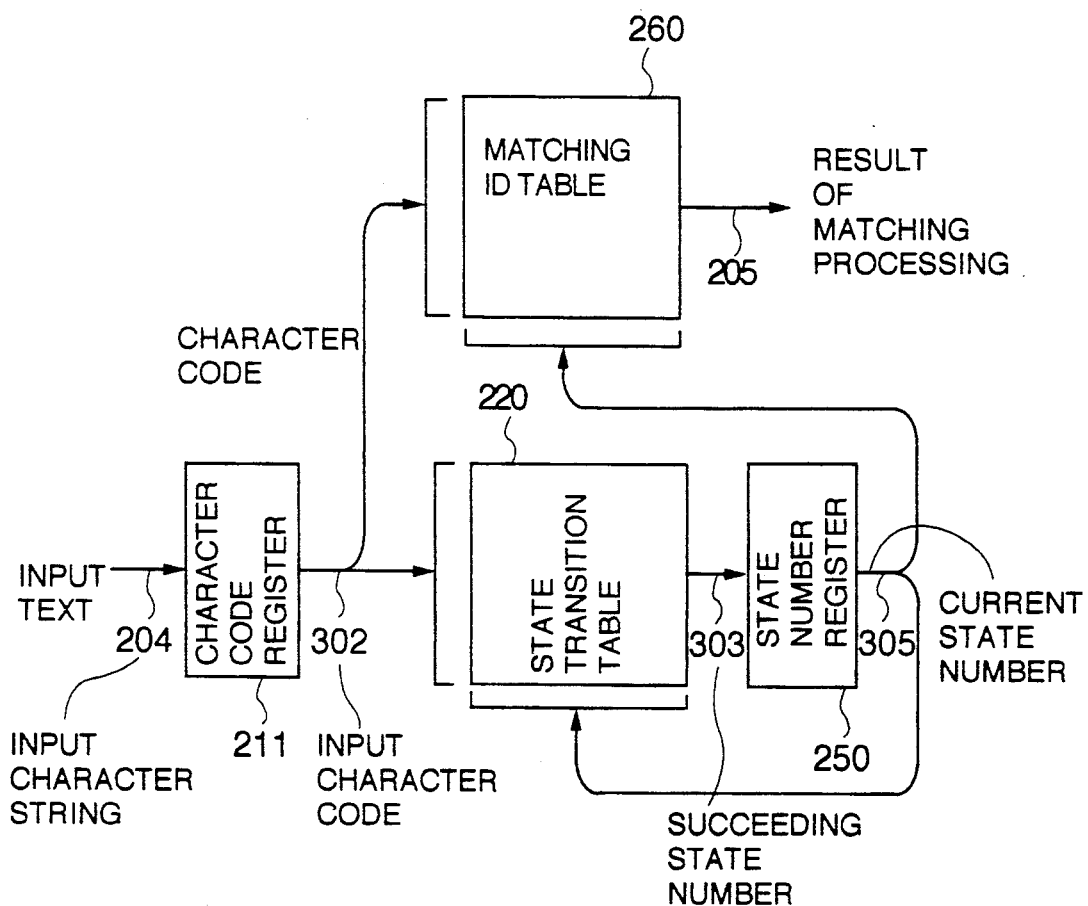
FIG. 3 is a schematic circuit diagram showing a structure of a prior art character string matching circuit.

Referring to FIG. 1, the character string matching circuit according to the fifth embodiment of the invention includes a character code register 211 for inputting an input text 204 to be subjected to retrieval on a character-by-character basis, a state transition table 220 for storing the input character code outputted from the character code register 211 and a succeeding state number 303 corresponding to a current state number 305, a state number register 250 for holding as the current state number 305 the succeeding state number 303 outputted from the state transition table 220, a matching ID table 265 for storing as the result of matching the matched term identifier in correspondence to the current state number 305 outputted from the state number register 250, a multiple matching processing circuit 280 for outputting as the result of the matching the matched term identifiers of the search terms which have the multiple matching relation from the identifiers stored in the matching ID table 265, and a multiple matching table 270 for storing information of the multiple matching relation of the search terms.

Now, description will be made in general of the operation of the character string matching circuit according to the fifth embodiment of the invention.

In the first place, as the initialization, the state number 0 is placed in the state number register 250, which number is held as the current state number 305.

The matching operation begins, starting from the inputting of an input text 204 to the character code register 211 on a character-by-character basis. The state transition table 220 is accessed by using as the address information the character code 302 outputted from the character code register 211 and the current state number 305 outputted from the state number register 250, whereby the succeeding state number 303 is outputted from the state transition table 220 to be subsequently held in the state number register 250 as the renewed current state number 305. The matching ID table 263 is accessed with the current state number 305 outputted from the state number register 250, whereby the corresponding identifier is outputted to the multiple matching processing circuit 280. The multiple matching processing circuit 280 makes decision on the basis of the matched term identifier inputted thereto as to whether the multiple matching is to be performed by referring to the multiple matching table 270. If it is the multiple matching indicating identifier, the identifiers of the terms which are in the multiple matching relation are outputted. In this way, there are stored in the multiple matching table 270 the identifiers of the search terms to undergo the multiple matching in correspondence to the matched term identifiers.

By repeating the operation described above, the character string matching can be carried out.

The following description will be made on the assumption that the automaton is of the same configuration as that of the fourth embodiment shown in FIG. 21, which in turn means that the state transition table 220 is also of the same structure as that of the fourth embodiment. However, the matching ID table 265 according to the instant embodiment of the invention is designed to store the identifier information of the search terms for the multiple matching and indicate the matching for a plurality of the search terms simultaneously, in contrast to the matching ID table of the first embodiment which is designed to store the identifier of the term to undergo the single matching. Parenthetically, the automaton shown in FIG. 21 is for the matching of "DOG" and "HOTDOG". In the following description directed to the multiple matching, it is again assumed that the input character string is the term "HOTDOG".

State transition of this automaton starts from the initial state 0.

Since the first input character is "H" on the above assumption, there occurs state transition to the state 4. Next, the input character of "O" in the state 3 brings about state transition to the state 5. Similarly, the input character "T" in the state 5 causes the automaton to make transition to the state 6, being followed by the transition to the state 7 from the state 6 in response to the input of the character "D". The input of the character "O" in the state 7 causes the automaton to transit to the state 8. Finally, the input of the character "G" in the state 8 results in the state transition to the state 9 in which the matched term identifier of the search term corresponding to the matching result of "HOTDOG" is outputted from the matching ID table 265.

The character string matching operation in general of the system according to the instant embodiment will be understood from the above. Now, description will be directed to a concrete structure of the matching ID table 265 by reference to FIG. 25. As mentioned previously, the matching ID table 265 is designed to store the search term identifier information for performing matching for the terms "DOG" ad "HOTDOG", as described hereinbefore by reference to FIG. 21.

Referring to FIG. 25, an identifier "100" stored in the slot corresponding to the current state number of 7 and the input character "G" indicates the multiple matching of the search terms "DOG" and "HOTDOG". In this conjunction, it will readily be understood that by allocating the identification codes of values greater than "100", inclusive, to the term identifiers indicating the multiple matchings while allocating the identification codes in a range of "1" to "99" to the other matchings as with the case of the term identifiers for the single matching such as the identification code "1" corresponding to the state number of 2 and the input character "G", the multiple matching can discriminatively be identified from the other type matching.

Next, description will be turned to the operation of the multiple matching processing circuit 280 designed to output as the result of the matching the matched term identifiers for the search terms bearing the multiple matching relation to one another on the basis of the matched term identifiers outputted from the matching ID table 265. The multiple matching processing circuit 280 is provided with a multiple matching table 270 which stores a group of matched term identifiers for the search terms having the multiple matching relation in a slot which can be accessed with the matched term identifier. The multiple matching table 263 stores code groups of the matched term identifiers and the next data addresses in two fields, respectively, which can be accessed by using as address the matched term identifier.

There are stored in the matched term identifier field the identifiers of the search terms to undergo the multiple matching, which field is continued on the next data address field storing the addresses to be referred to in succession.

The multiple matching table 270 employed in the instant embodiment may be of the same structure as that of the third embodiment described hereinbefore by reference to FIG. 19. By referring to this figure, operation of the multiple matching processing circuit 280 according to the instant embodiment will be described in detail. The multiple matching table 270 shown in FIG. 19 corresponds to the state transition diagram shown in FIG. 21. In the matching ID table 265, a numerical value of "100" stored at the entry designated by the current state number of 9 and the input character "G" indicates that the multiple matching is of concern. When the code value "100" representing the matched term identifiers of the search terms is outputted from the matching ID table 265, the multiple matching processing circuit 280 outputs "1" which is the matched term identifier of "DOG" stored at the address "100" of the multiple matching table 270 in correspondence to the matched term identifier "100". In this case, since the next data address is "200", the matched term identifier "2" for the term "HOTDOG" stored at the address "200" is also outputted. Then, the next data address becomes "−1". Accordingly, any succeeding matched term identifier can no more be outputted.

In this manner, multiple matching can correctly be performed for both "DOG" and "HOTDOG" upon inputting of the character string "HOTDOG" for which the multiple matching is to take place, whereby the multiple matching of these search terms can be carried out without any omission.

When the matched term identifier inputted to the multiple matching processing circuit 280 is the identifier on the order of "100", it is then decided that the result of the multiple matching should be outputted, whereon the multiple matching table 270 is referred to. In case the matched term identifier is smaller than "100", decision is made that the single matching is to be performed. Accordingly, the matched term identifier is outputted straightforwardly without referring to the multiple matching table 270.

When decision is made that the multiple matching is to be performed, the corresponding matched term identifiers are outputted from the multiple matching table 270. Subsequently, the next data address is referred to, and the matched term identifier for the multiple matching relation is outputted as the result of matching (or collation). Similarly, a next data address succeeding to the abovementioned next data address is referred to for outputting the next matched term identifier of a search term (i.e. term designated or specified for retrieval) having the multiple matching relation. When the next data address contains the termination code (−1), it is then decided that there exists no more the search term having the multiple matching relation. Accordingly, result of the matching is not outputted any more. It should be noted that by using "−1" as the termination code, the matched term identifier of any search term can be discriminated from the termination code.

As will now be appreciated, according to the teachings of the invention incarnated in the instant embodiment, the multiple matching can be realized while solving successfully the problem that the memory capacity of the matching ID table 265 will otherwise increase in proportion to the number of the terms to be matched and retrieved.

Figure 26:
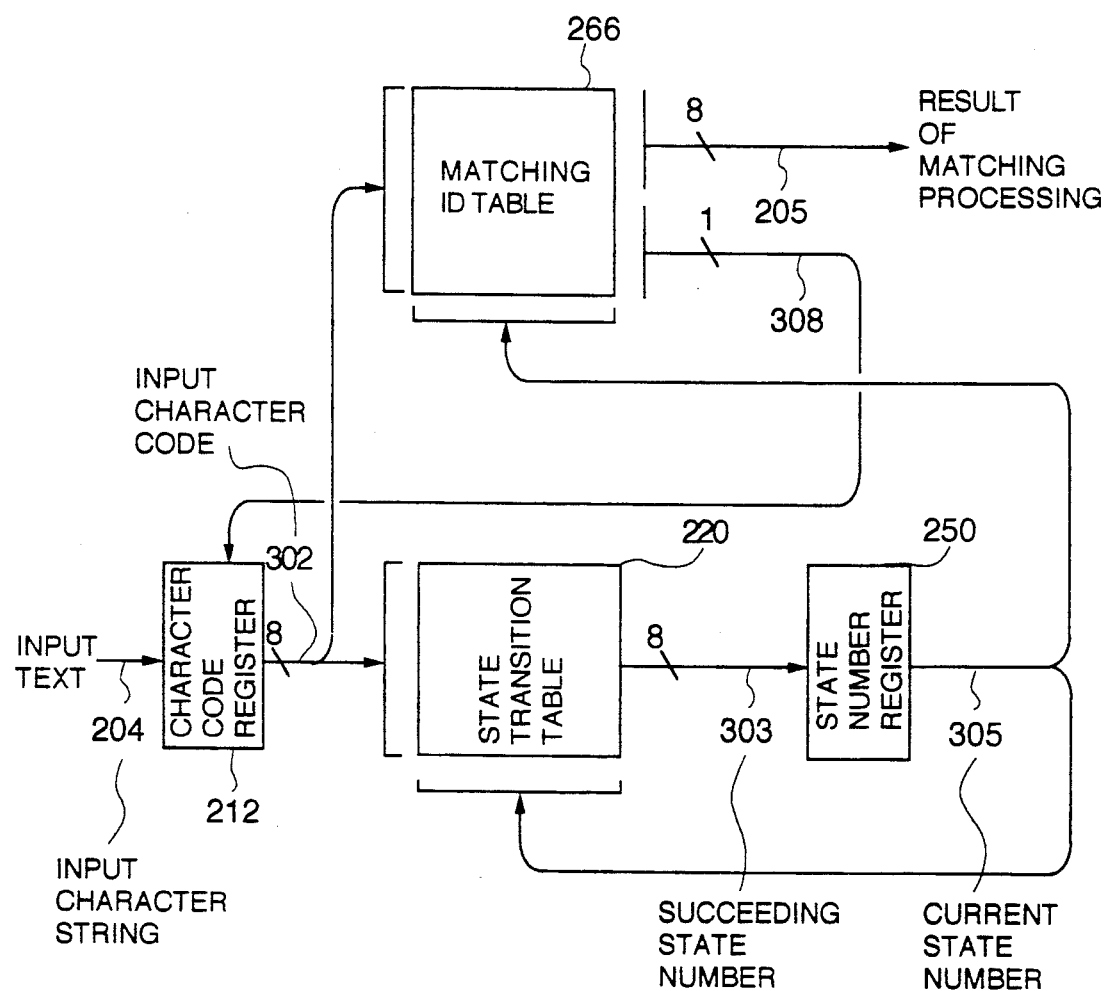
FIG. 26 is a functional block diagram showing a character string matching circuit according to a still further embodiment of the invention.

Next, description will be made of a sixth embodiment of the character string matching system according to the invention. This embodiment is also arranged such that the terms to be retrieved can be matched without any omission notwithstanding of occurrence of the multiple matching. FIG. 26 shows a circuit configuration of the character string matching system according to the sixth embodiment.

Referring to FIG. 26, the system includes a character code register 212, a state transition table 220, a matching ID table 266 and a state register 250.

In general, operation of the character string matching circuit shown in FIG. 26 is performed in a manner mentioned below. At first, as the initialization step, an automaton corresponding to search terms (i.e. terms to undergo matching and retrieval) are stored in the state transition table 220, while there is stored in the matching ID table a matching identifier corresponding to a state number and a character code together with a multiple matching flag which will be described hereinafter. Further, the state number 0 representing the initial state number of the automaton is placed in the state number register 250, which is held thereby as the current state number at that time point.

The matching operation begins, starting the inputting of an input text 204 to the character code register 212 on a character-by-character basis. The state transition table 220 is accessed with the character code 302 outputted from the character code register 212 and the current state number 305 outputted from the state number register 250, whereby a succeeding or next state number 303 representing the identification number of the state to which the next state transition is to take place is read out from the state transition table 220. The succeeding state number 303 is held in the state number register 250 as the renewed current state number 305. In parallel with the access to the state transition table 220, the matching ID table 266 is also accessed by using as the address the current state number 305 outputted from the state number register 250 and the input character code 302, as a result of which there are read out from the matching ID table 266 the matching identifier 205 of the retrieval term and the multiple matching flag 308. The matching identifier of the search term is assigned with a value other than "0" (zero). Accordingly, when the matching identifier as read out has other value than "0" (zero), the identifier is regarded as that of the result of matching. If otherwise, the identifier is not regarded as that of the matching result.

At this juncture, it should be mentioned that when the multiple matching flag is "0" (zero), a character code is newly inputted to the character code register 212, wherein the processing proceeds to the comparison operation with the next character code. In other words, unless the multiple matching takes place, the operation cycle mentioned above is repeated as in the case of the prior art system described hereinbefore.

On the other hand, when the multiple matching flag 308 is set to "1" (one), indicating that the multiple matching is to be performed, loading of the character code 302 in the character code register 212 from the input text 204 is suspended.

In this state, the state transition table 220 is accessed with the character code 302 and the current state number 305, whereby the succeeding state number 303 is outputted. This succeeding state number 303 is held in the state number register 250 as the renewed current state number 305.

In parallel with the access made to the state transition table 220, the matching ID table 266 is also accessed. When the multiple matching flag 308 outputted from the matching ID table 226 is "1", reading of a new character from the input text into the character code register 212 is suspended, and the matching ID table 266 is accessed by using as the address the renewed current state number 305 and the character code 302 which is currently held in the character code register 212, whereby there are read out from the matching ID table 266 the matching identifiers for the search term bearing the multiple matching relation, which identifiers are stored in the matching ID table 266 in correspondence to the succeeding state number 303. In that case, when the multiple matching flag 308 read out from the matching ID table simultaneously with the matching identifier is "1", the state transition is again effected with the character fetching from the input text being suspended, to thereby read out the matching identifier for the next search term for which the multiple matching is to be performed.

In case the multiple matching flag 308 is "0", this means that there exist no retrieval terms having the multiple matching relation. Accordingly, state transition occurs to the originally destined state read out from the state transition table by using as the address the character code 302 being held and the current state number 305.

In this manner, the character string matching operation is carried out by repeating the abovementioned operations in accordance with the contents of the multiple matching flag 308.

Figure 27:
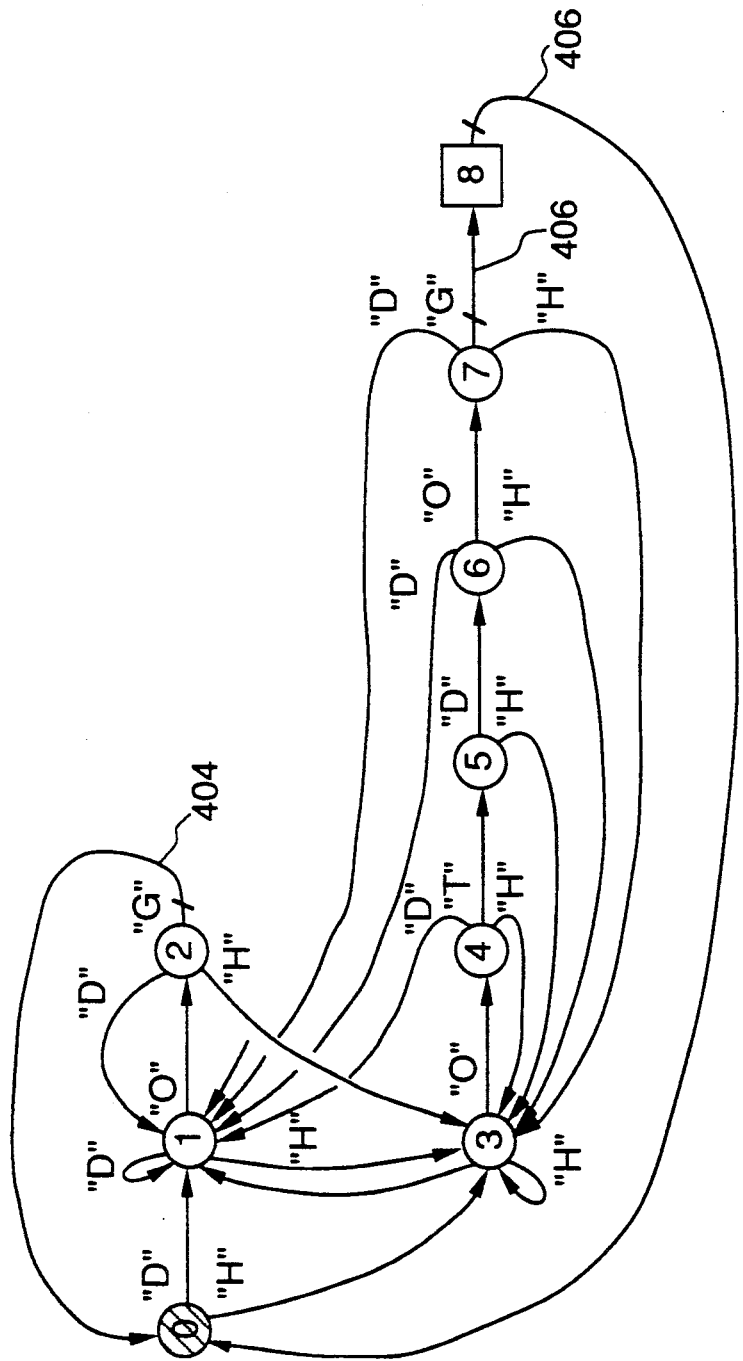
FIG. 27 is a state transition diagram of an automaton employed in the character string matching circuit shown in FIG. 26.

In the following, operation of the character string matching circuit according to the instant embodiment of the invention will be described in concrete on the assumption that the automaton is so structured as to perform the matching on the terms "DOG" and "HOTDOG" by reference to FIG. 27.

In this figure, the state 8 indicated as enclosed by a quadrangle represents the matching output dedicated state. Further, in this state 8, character code is no more fetched from the input text with the comparison operation being carried out with the character code fetched in the state 7. Transition indicating arrows 404 and 406 affixed with a slash "/" indicates that upon occurrence of transitions indicated by these arrows, the corresponding matching identifiers are outputted from the matching ID table 266. More specifically, upon occurrence of the transition indicated by the arrow 404, the matching identifier for "DOG" is outputted from the matching ID table 266, while upon occurrence of the transition indicated by the arrow 406, the matching identifier for "HOTDOG" is outputted from the matching ID table 266.

Now, referring to FIG. 27, the multiple matching operation of the character string matching circuit according to the instant embodiment will be described on the assumption that the input text reads "HOTDOG".

The automaton begins the state transition, starting from the initial state 0 (zero).

Since the first input character is "H" on the above assumption, there occurs state transition to the state 3. Next, the input character of "O" in the state 3 brings about state transition to the state 4. Similarly, the input character "T" in the state 4 causes the automaton to make transition to the state 5, being followed by the transition to the state 6 from the state 5 in response to the input of the character "D". The input of the character "0" in the state 6 causes the automaton to transit to the state 7. The input of the character "G" in the state 7 brings about the state transition to the state 8, and at the same time, the matching identifier for the matching result of "HOTDOG" is outputted from the matching ID table 266. In that case, since the state 8 is the matching output dedicated state, comparison processing is performed with "G" fetched last, whereupon transition takes place to the state 0 (zero) and at the same time the matching identifier for "DOG" is outputted from the matching ID table 266, meaning that matching has also been performed for "DOG".

In this manner, by providing the state where the comparison processing is executed with the last character code without fetching newly any character, the terms "HOTDOG" and "DOG" which are in the multiple matching relation can be matched without omission for the input text "HOTDOG".

Figure 29:
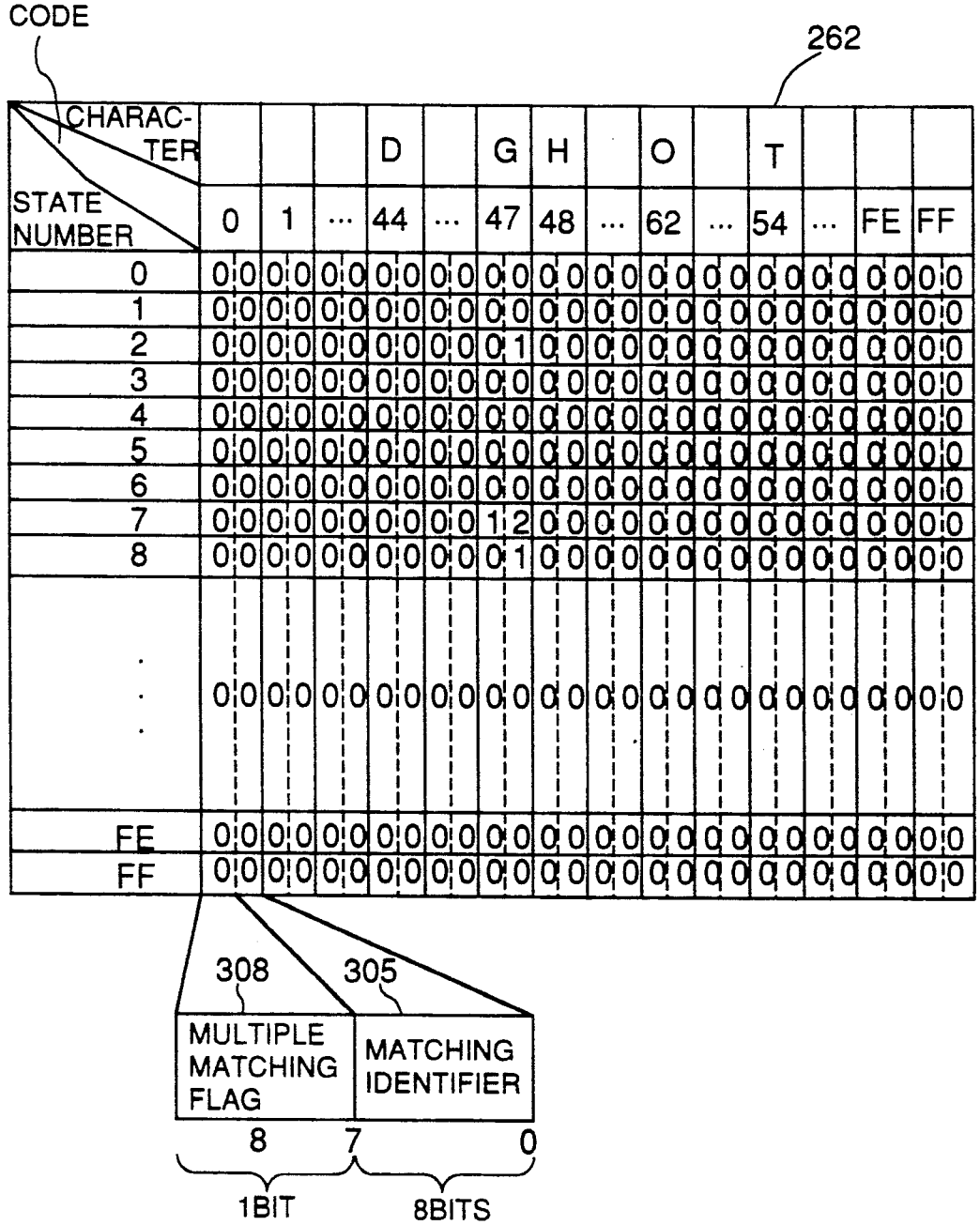
FIG. 29 is a view for illustrating a further exemplary structure of the matching ID table according to the invention.

FIGS. 28 and 29 show exemplary structures of the state transition table 220 and the matching ID table 266, respectively, which correspond to the automaton described above. It should be noted that JIS code is used as the character code.

The state transition table 220 shown in FIG. 28 is addressed with the input character code 302 and the current state number 305 of the automaton, whereby the succeeding state number is read out.

Stored in the matching ID table 266 shown in FIG. 29 are the matching identifier 205 for a retrieval term indicating that the retrieval term has been matched and the multiple matching flag 308 indicating whether or not the state indicated by the succeeding state number 303 is the matching output dedicated state. In the case of the illustrated example, the multiple matching flag is stored in a slot corresponding to the state 7 and the character code G. More specifically, the multiple matching flag of "1" and the matching identifier of "2" are placed in the slot corresponding to the state 7 and the character code "G". Thus, when the character code "G" is inputted in the state 7, the character code register 212 makes transition to the succeeding state 8 while holding the character code "G", and at the same time the matching ID table outputs "2" as the matching identifier for the retrieval term and "1" as the multiple flag. Since the multiple matching flag is set to "1", the comparison processing is again performed for the character code "G" in the succeeding state 8, whereupon "0" (zero) representing the next succeeding state is read out from the state transition table 220 while at the same time the matching identifier "1" is read out from the matching ID table 266.

In this case, the matching identifier of "1" for the multiple matching is outputted as the result of matching. Further, since the multiple matching flag 308 is "0" (zero), inputting of a character code is again started in the succeeding transition destination state 0 (zero), whereon the comparison processing is continued.

In this manner, the character string matching can be realized without any omission even upon occurrence of the multiple matching.

Figure 30:
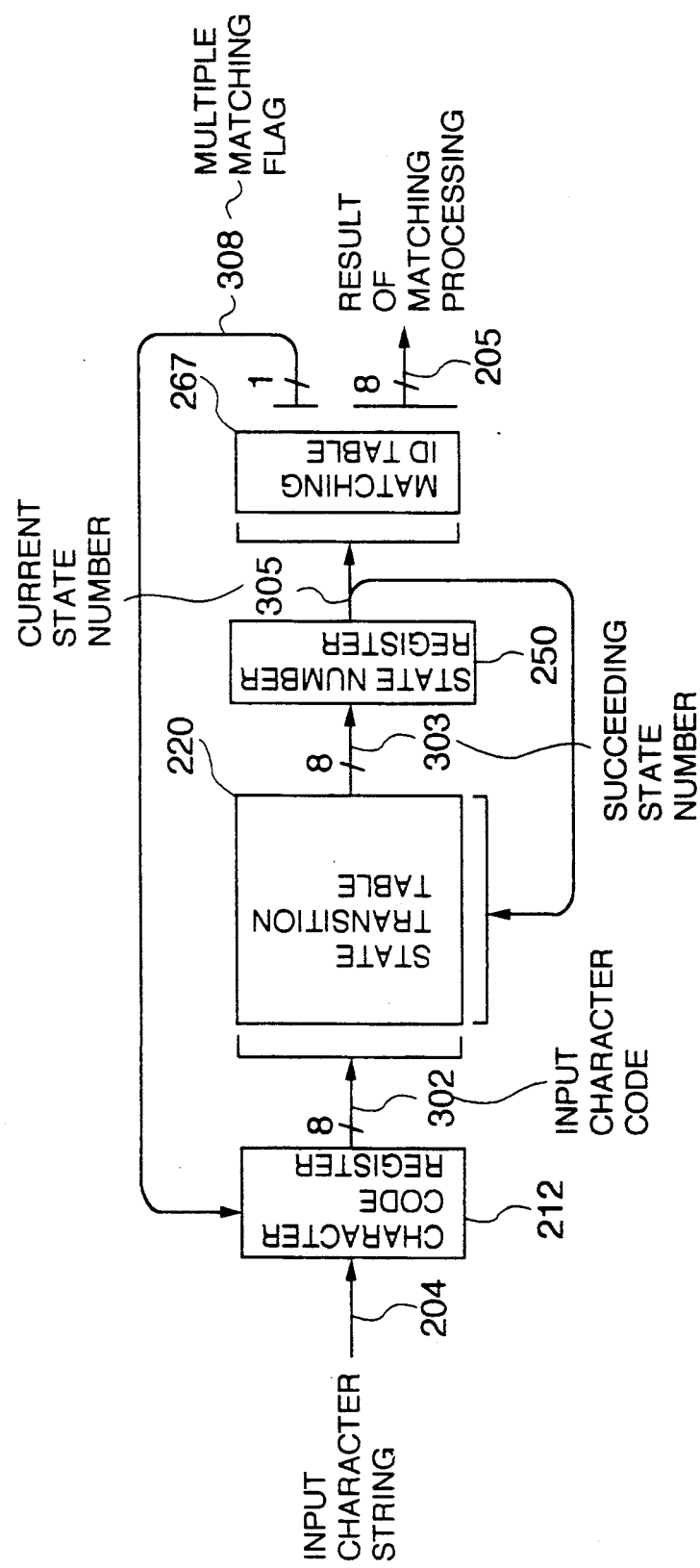
FIG. 30 is a functional block diagram showing an arrangement of a character string matching circuit according to a further embodiment of the invention.

Next, description will be made of a seventh embodiment of the character string retrieving circuit incarnating the concept of the invention. With this embodiment, it is intended to realize the matching ID table in a small size or capacity while assuring the matching of the search terms without omission notwithstanding of occurrence of the multiple matching. FIG. 30 is a schematic block diagram showing the character string matching circuit according to the seventh embodiment of the invention.

As will be seen in the figure, this character string matching circuit is composed of a character code register 212, a state transition table 220, a matching ID table 267 and a state number register 250.

At first, operation of the character string matching circuit shown in FIG. 30 will generally be described. Through initialization processing, there is placed in the state number register 250 the state number 0 (zero) representing the initial state of the automaton. This state number is held as the current state number 305.

In the first place, description will be directed to the normal comparison or matching operation in which no multiple matching occurs. When an input text 204 is loaded into the character code register 212 on a character-by-character basis, the state transition table 220 is accessed with the character code 302 outputted from the character code register 212 and the current state number 305, whereby the succeeding state number 303 to which the next state transition is to take place is outputted from the state transition table 220 to be held in the state number register 250 as the renewed current state number 305. Subsequently, the matching ID table 267 is accessed by using as the address the current state number 305 outputted from the state number register 250, whereby the matching identifier 205 of the search term and the multiple matching flag 308 are outputted from the matching ID table 267. When the matching identifier 205 as read out is "0" (zero), it is not regarded as identifying the matching result of the search term.

When the multiple matching flag 308 is "0" (zero), a new character code is loaded in the character code register 212, wherein the processing proceeds to the comparison of the next character code. So far as the multiple matching does not take place, the operation described above is repeated.

On the other hand, when the multiple matching flag 308 is "1", indicating that the multiple matching takes place, loading of the character code 302 in the character code register 212 from the input text 204 is suspended, whereon operation described below is carried out.

The state transition table 220 is accessed with the character code 302 and the current state number 305, whereby the succeeding state number 303 is read out, which is then held in the state number register 250 as the renewed current state number 305.

Subsequently, the matching ID table 266 is accessed with the current state number 305 stored in the state number register 250, as a result of which there are outputted the matching identifiers of the search terms and the multiple matching flag 308.

In that case, when the multiple matching flag 308 read out from the matching ID table 266 is "1" (one), the character code register 250 makes state transition while suspending again the inputting of the character code from the input text, to thereby read out the matching identifier of the next search term which has the multiple matching relation.

On the other hand, when the multiple matching flag is "0" (zero), this means that no search term having the multiple matching relation exists. Consequently, the normal comparing operation is resumed with the state transiting to the originally destined state.

By repeating the aforementioned operations in dependence on the contents of the multiple matching flag 308 in the manner described above, the character string matching operation including the multiple matching can be realized, whereby the multiple matching identifiers of the search terms can be outputted without any omission.

Figure 31:
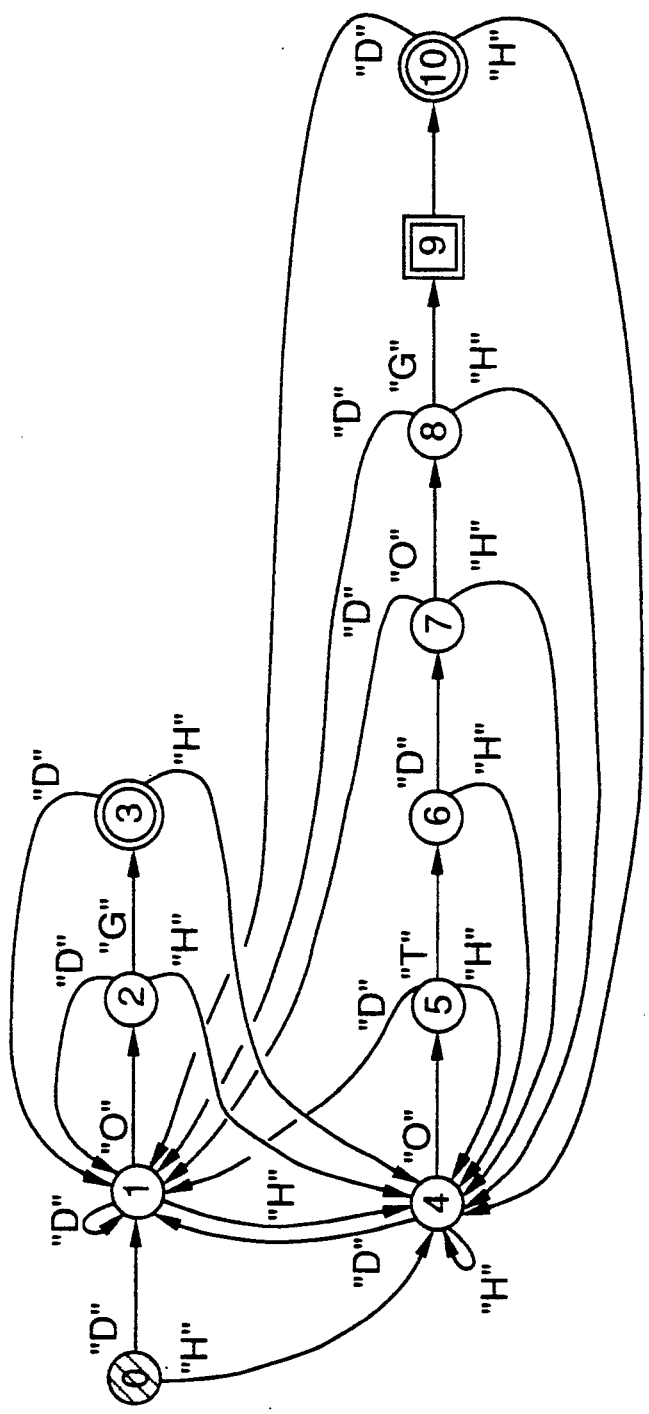
FIG. 31 is a state transition diagram of an automaton employed in the character string matching circuit shown in FIG. 30.

In the following, operation of the character string circuit circuit according to the instant embodiment will be described in detail on the assumption that the automaton is of a configuration for matching "DOG" and "HOTDOG", as illustrated in FIG. 31.

In the case of the prior art character string matching system described hereinbefore, the matching identifier of a search term is placed in a slot of the matching ID table which is addressed with the current state number and the trailing character of the search term. In other words, the matching identifier is outputted when transition takes place in response to the trailing or last character of the search term.

More specifically, upon occurrence of state transition from the state 2 in response to "G" which is the trailing character of "DOG", the prior art automaton shown in FIG. 4 outputs the matching identifier of "DOG".

In contrast, according to the teaching of the invention incarnated in the instant embodiment, such automaton is employed in which a new state is created as the transition destination state for the trailing character of the search term. More specifically, the automaton is implemented such that when the current state transits to the state 3 which is the succeeding state for the trailing character "G" of "DOG", as shown in FIG. 31, the matching identifier of "DOG" is outputted. The state indicated as enclosed by double circles such as the state 3 and the state 10 represents the state from which the matching identifier is to be outputted.

In this way, correspondence can be established between the current state and the matching identifier, which in turn makes it possible to implement the matching ID table with a number of slots equal to that of the states.

In FIG. 31, the state indicated as enclosed by double quadrangles represents the matching output dedicated state. Thus, in the state 9, no character code is inputted, and comparison is performed with the character code matched in the state 8. In the state 3 and 10, the result of matching of "DOG" is stored, while in the state 9 the result of matching of "HOTDOG" is stored.

In the following description of the matching operation, it is assumed, by way of example, that an input text is "HOTDOG".

In the first place, in response to the inputting of the first character "H", the state of concern makes transition from the initial state 0 (zero) to the state 4. Subsequently, the input character "O" in the state 4 brings about transition to the state 5. Similarly, the input character "T" in the state 5 causes state transition to the state 6 which then transits to the state 7 in response to the input character "D". The state 7 then transits to the state 8 in response to the input character "O". Inputting of "G" in the state 8 brings about state transition to the state 9 where the result of matching is to be stored. Thereafter, the matching identifier corresponding to the search term "HOTDOG" stored in the state 9 of the matching ID table 267 is read out. This state 9 is the matching output dedicated state and thus transits to the state 10 without fetching any further character code. In the state 10 indicated as enclosed by double circles, the matching identifier corresponding to the retrieval term "DOG" is outputted from the matching ID table. In this conjunction, it should be noted that since the state 10 is not the matching output dedicated state, a new character code is fetched, whereupon the multiple matching processing comes to an end, and the next state transition can take place.

Through the state transition, the search terms "HOTDOG" and "DOG" which bear the multiple matching relation to each other can be matched without omission for the input text "HOTDOG".

Figure 33:
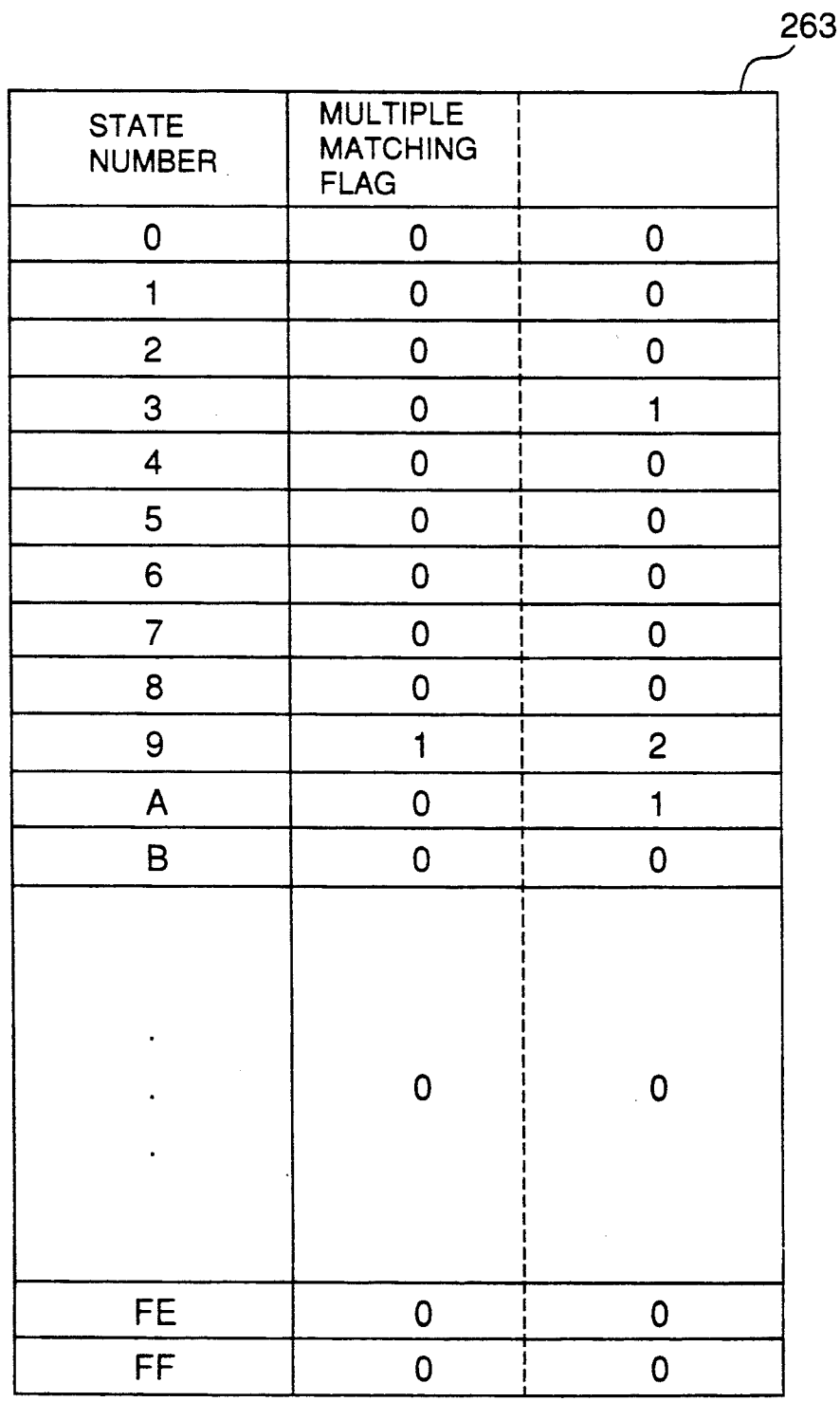
FIG. 33 is a view for illustrating a still further exemplary structure of the matching ID table according to the invention.

FIGS. 32 and 33 show, respectively, exemplary structures of the state transition table 220 for storing the automaton shown in FIG. 31 and the matching ID table 260.

The state transition table 220 is so structured that it can be addressed with the input character code 302 and the current automaton state number 305 of concern.

The matching ID table 267 stores therein the matching identifier indicating that the matching has been made for the search terms and the multiple matching flag 308 indicating whether or not the current state is the matching output dedicated state.

In the case of the illustrated example, the multiple matching flag of the slot corresponding to the multiple matching state 9 is set to "1" with the matching identifier being set to "2". By setting the multiple matching flag and the matching identifier as mentioned above, any additional character code is inhibited from being inputted to the character code register 212 since the multiple matching flag is "1" in the state 9. Accordingly, state transition to the succeeding state 10 is made with the character code "G" inputted immediately before being held in the character code register 212.

By virtue of the arrangement described above, the matching ID table can be realized in a small size or reduced capacity. Besides, the search terms can be matched without omission even upon occurrence of the multiple matching.

Now, an eighth embodiment of the invention will be described. With this embodiment, it is contemplated to solve such problem of the aforementioned seventh embodiment that the number of the state available for matching of other retrieval terms is reduced because of need for assignment of a new state number for the matching output dedicated state which is made use of upon occurrence of the multiple matching.

Figure 34:
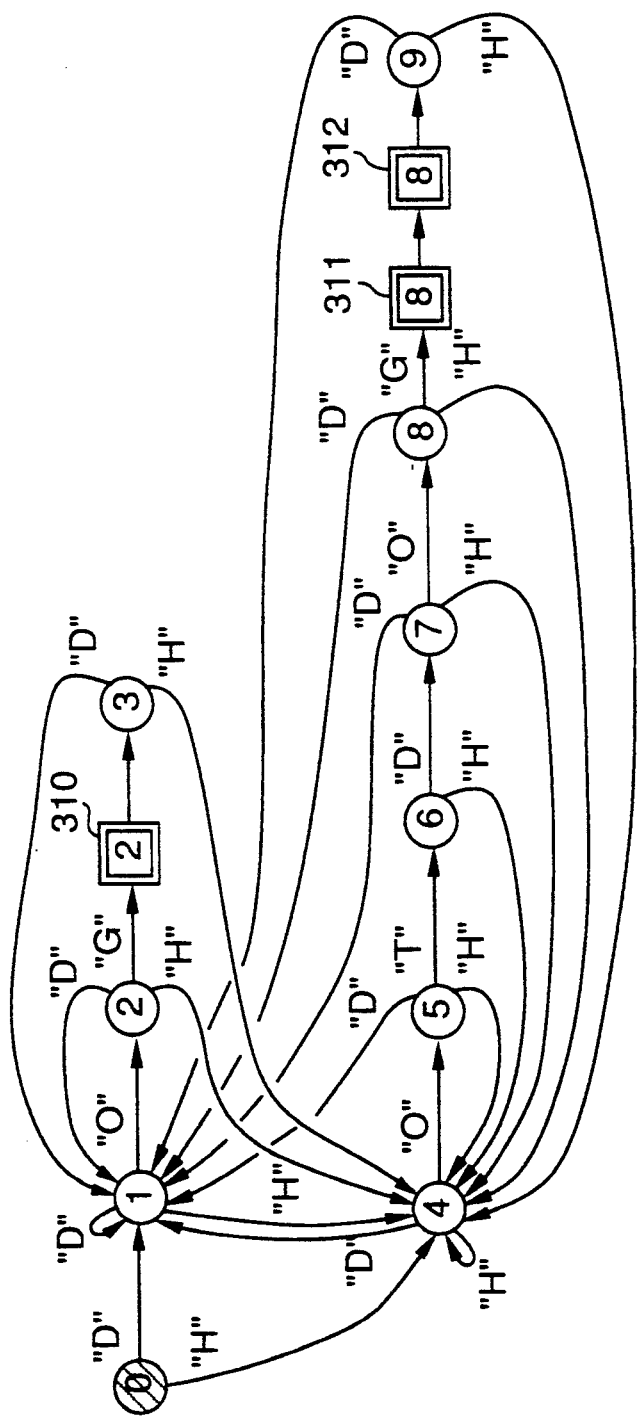
FIG. 34 is a state transition diagram of an automaton according to yet another teaching of the invention.

Operation of the character string matching circuit according to the eighth embodiment will be elucidated on the assumption that the automaton to this end is of such structure as shown in FIG. 34. More specifically, this automaton is configure to perform the matching on the character strings "DOG" and "HOTDOG" and is characterized in that the result of matching is outputted from the matching output dedicated state regardless of whether the multiple matching or the single matching takes place.

The state indicated as enclosed by double quadrangles represents the matching output dedicated state. In this state, any character can not be fetched from the input text but only the outputting of the matching result is performed. Referring to FIG. 34, there are illustrated representatively three matching output dedicated states 310, 311 and 312, where matched term identifiers for "DOG" and "HOTDOG" are stored, respectively. Accordingly, upon transition made to any one of these states, the corresponding matched term identifier is outputted, indicating that the matching has been done on the corresponding search term.

Now, comparing or collating operation of the automaton shown in FIG. 34 will be described in detail on the assumption that an input text reads "HOTDOG".

As a flag indicating transition to the matching output dedicated state, there is provided a matching output dedicated state flag which is adapted to be affixed to the transition information. In the case of the instant embodiment of the invention, the matching output dedicated state flags indicating the transition from the state 2 to the matching output dedicated state 310, transition from the state 2 to the matching output dedicated state 311 and the transition from the matching output dedicated state 311 to the matching output dedicated state 312, respectively, are each set to "1". The matching output dedicated state flags indicating other transitions than those mentioned above are each set to "0".

At first, upon inputting of the first character "H", state transition of concern takes place from the initial state 0 to the state 4. Next, inputting of the succeeding character "O" brings about state transition from the state 4 to the state 5. Similarly, in response to the successive inputs of "T", "D" and "O", the state transition occurs from the state 5 to the state 6, to the state 7 and then to the state 8. In the meantime, the matching output dedicated state flag assumes a value of 0 (zero) because of the normal state transitions.

Now, upon inputting of the character "G", the state transition occurs to the state 8 indicated as enclosed by double quadrangles and representing the matching output dedicated state 311 where the result of matching is to be stored. In the matching output dedicated state 311, the matched term identifier of "DOG" stored in this state is outputted, indicating that the matching has been performed for the term "DOG". Further, in the matching output dedicated state 311, no character code is fetched but the character "G" fetched immediately before is held.

Subsequently, state transition occurs to the matching output dedicated state 312 having the state number 8. At this time, the matching output dedicated state flag associated with this state transition is set to 1. In the matching output dedicated state 312, the matched term identifier of "HOTDOG" stored in this state is outputted, indicating that matching of "HOTDOG" has been made. Again in this matching output dedicated state 312, no character code is fetched but transition is made to the state 9 while holding the character "G". Since the state 9 is the normal state, the matching output dedicated state flag is set to "0" (zero). Accordingly, in this state 9, the succeeding character code is fetched from the input text to undergo the normal comparison operation.

By employing the automaton whose state transitions take place in the manner as described above, matching can be performed for the character strings "DOG" and "HOTDOG" having the multiple matching relation without omission in response to the input text "HOTDOG" subjected to the retrieval.

Figure 35:
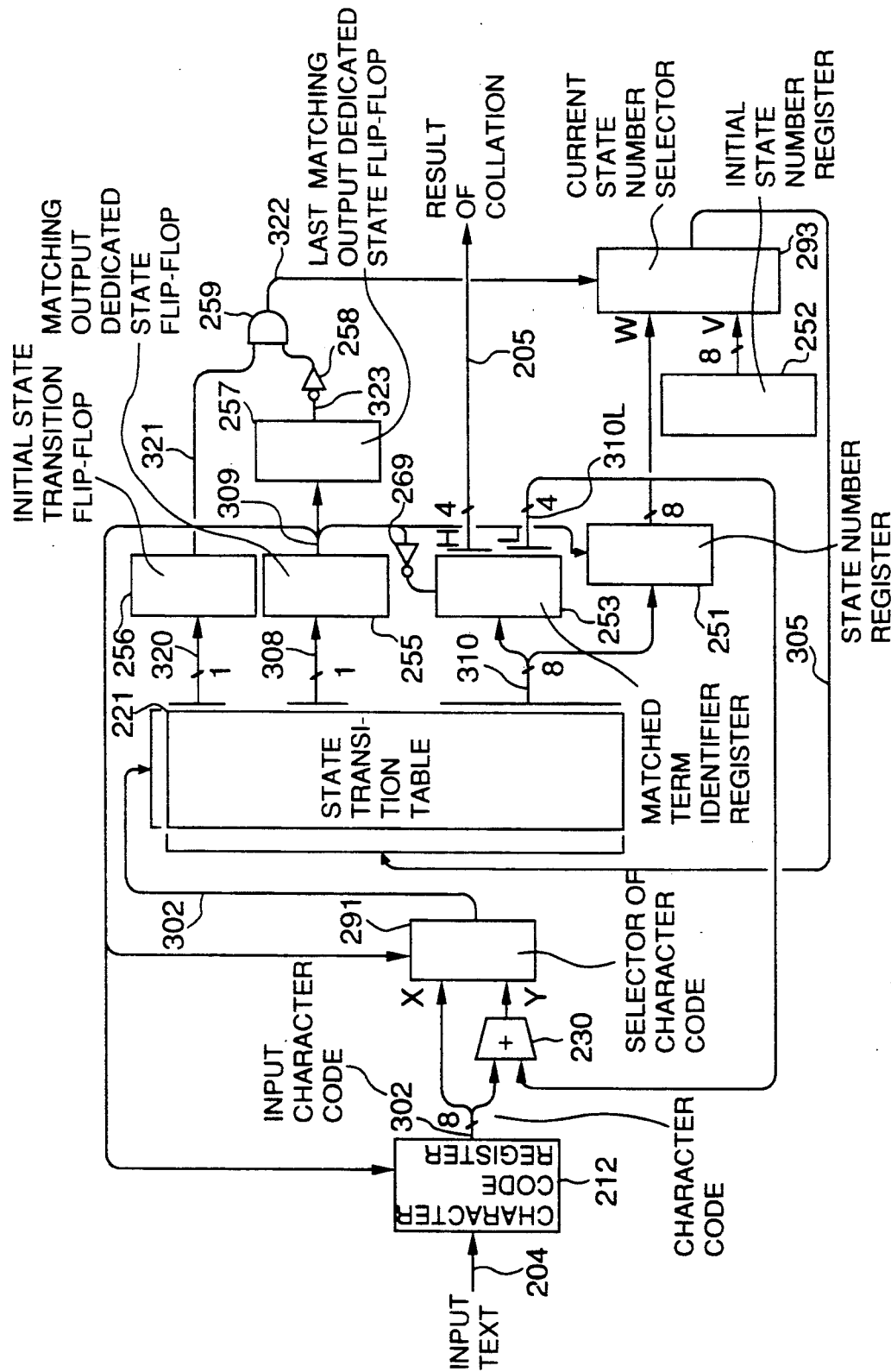
FIG. 35 is a functional block diagram showing a still another embodiment of the character string matching circuit according to the invention.

FIG. 35 is a block diagram showing a configuration of the character string matching circuit which can be used for implementing the instant (eighth) embodiment of the invention.

Referring to FIG. 35, the character string matching system includes a character code register 212, an adder 230, a state transition table 221, an initial state number register 252, selectors 291 and 293, a state number register 251, a matched term identifier register 253, a matching output dedicated state flip-flop 255, an initial state transition flip-flop 256, a last matching output dedicated state flip-flop 257, inverters 258 and 259 and an AND gate 259.

The character code register 212 is loaded with a character code corresponding to one character of the input text, when a matching output dedicated state signal 309 described hereinafter is "0" (zero), wherein the output of the character code register 312 is supplied to the character code selector 291 and the adder 230.

On the other hand, when the matching output dedicated state signal 309 is "1" (one), any succeeding character code is inhibited from being inputted while character code fetched immediately before is held as it is. Thus, the immediately preceding character code is outputted to the selector 291 and the adder 230.

When the matching output dedicated state signal 309 is "0", as described hereinafter, the selector 291 selects an X-port, whereby the character code placed in the character code register 212 is outputted, as it is, to the state transition table 221 as a column address thereof. On the other hand, when the matching output dedicated state signal 309 is "1" (one), the selector 291 selects a Y-port, whereby the output of the adder 230 (i.e. a value resulting from addition of the character code 302 and an offset 310L) is supplied to the state transition table 221 as a column address thereof.

The state transition table 221 is addressed with the character code serving as the column address and the current state number 305 serving as a row address, as a result of which there are outputted from an addressed slot of the state transition table 221 an initial state transition flag 320, a matching output dedicated state flag 308 and a succeeding state number 310 stored in that slot.

The initial state transition flag 320 serves for indicating whether state transition of concern is to the initial state or not. More specifically, when this flag is "1" (one), it indicates the state transition to the initial state. In the case of the illustrated example, this kind state transition takes place in response to the input of a character code other than "D", "O" and "H" in the state 1. In that case, the initial state transition flag 320 of the corresponding slot of the state transition table 221 is set to "1" (one). On the other hand, the initial state transition flag of "0" (zero) indicates the state transition to the other state than the initial state. In the illustrated case, this kind state transition takes place in response to the appearance of "D", "O" and "H" in the initial state 1. At this time, the initial state transition flag 320 of the corresponding slot of the state transition table 221 is set to "0" (zero).

The initial state transition flag 320 outputted from the state transition table 221 is loaded in the initial state transition flip-flop 256 to be subsequently outputted to the AND gate 259 as the initial state transition information 321.

The matching output dedicated state flag 309 serves to indicate whether or not the transition destined state is the matching output dedicated state indicated as enclosed by double quadrangles in FIG. 34. When the flag 308 is "1" (one), it is indicated that the state to which the succeeding transition is to take place is the matching output dedicated state. In the case of the illustrated example, the transitions to the matching output dedicated states include state transition from the state 2 to the matching output dedicated state 310, transition from the state 8 to the matching output dedicated state 311 and the transition from the matching output dedicated state 311 to the matching output dedicated state 312. For any of these state transitions, the matching output dedicated state flag is set to "1" (one). In contrast, the matching output dedicated state flag of "0" (zero) indicates that the transition destined state is the normal state. In the case of the illustrated example, these normal state transitions include the transition from the state 1 to the state 2, transition from the matching output dedicated state 310 to the state 3, and the transition from the matching output dedicated state 312 to the state 9. For each of these transitions, the corresponding matching output dedicated state flag is set to "0" (zero).

The matching output dedicated state flag 308 outputted from the state transition table 221 is then placed in the matching output dedicated state flip-flop 255 to be subsequently supplied as the aforementioned matching output dedicated state signal 309 to the character code register 212, the selector 291, the last matching output dedicated state flip-flop 257, the state number register 251 and the matching identifier register 253 via the inverter 269, respectively.

When the matching output dedicated state signal 309 is "1", i.e. when the transition destined state is the matching output dedicated state, the matching identifier register 253 fetches therein a succeeding state number 310 outputted from the state transition table 221, whereon the matched term identifier composed of four more significant bits of the succeeding state number 310 is outputted as the result of matching, while the offset 310L which is composed of the four less significant bits of the succeeding state number 310, as described hereinafter, is outputted to the adder 230 to be thereby added with the character code 302. The output of the adder 230 is applied to the Y-port of the selector 291. The offset 310L is utilized to determine an offset involved in the transition to the succeeding transition destined state or the matching output dedicated state as well as an address of the slot of the state transition table 221 in which the matched term identifier is stored. By way of example, the offset involved in the transition from the state 2 to the matching output dedicated state 310 can be determined by subtracting the slot address of the state transition table 221 at which the abovementioned transition is stored from the slot address of the state transition table 221 at which the transition from the matching output dedicated state 310 to the state 3 is stored.

On the other hand, when the matching output dedicated state signal 309 is "0" (zero), i.e. when the state transition destined state is the normal state, the matching identifier register 253 is inhibited from fetching the succeeding state number 310 outputted from the state transition table 221.

In contrast, the state number register 251 fetches therein the succeeding state number 310 outputted from the state transition table 221 when the matching output dedicated state signal 309 is "0" (zero), while the state number register 251 is inhibited from fetching the succeeding state number 310 when the matching output dedicated state signal 309 is "1" (one). In this case, the last succeeding state number already placed in the state number register 251 is held to be outputted to a W-port of the selector 293.

The last matching output dedicated state flip-flop 257 fetches therein the matching output dedicated state signal 309 used in the preceding state transition, which signal 309 is then supplied to the AND gate 259 via the inverter 258. At this juncture, it should be mentioned that the last matching output dedicated state signal 323 of "1" (one) indicates that the current state is the matching output dedicated state while the signal 323 of "0" (zero) indicates that the current state is the normal state.

When the AND gate 259 is applied with the last matching output dedicated state signal 323 of "0" (zero) via the inverter 258 together with the initial state transition signal 321 of "1", i.e. when the state transition takes place from the normal state to the initial state, the AND gate 259 outputs a signal of "1" which is then supplied to the selector 293 as a current state number select signal. At this time, a V-port of the selector 293 is selected, whereby the initial state number stored in the initial state number register 252 is outputted as the current state number 305, i.e. as the row address of the state transition table 221. On the other hand, when the last matching output dedicated state signal 323 of "1" is inputted to the AND gate 259 via the inverter 258 or when the initial state signal 323 of "0" is applied to the AND gate 259, this indicates that the current state is the matching output dedicated state or no transition to the initial state occurs. In this case, the output of "0" from the AND gate 259 is supplied to the selector 293 as the current state number select signal 322. At this time, however, the W-port of the selector 293 is selected, whereby the succeeding state number stored in the state number register 251 is outputted as the current state number signal 305.

Next, description will be made of operation in general of the character string matching circuit according to the instant embodiment by reference to FIG. 35.

Upon initialization, the initial state number register 252 is set to "0" (zero) since the initial state number is "0" (zero). Because no multiple matching can take place in the initial state, the matching output dedicated state flip-flop 255 and the last matching output dedicated state flip-flop 257 are each loaded with "0" as the respective initial value. Accordingly, the matching output dedicated state signal 309 and the last matching output dedicated state signal 323 assume "0" (zero). Further, the initial state transition flip-flop 256 is placed with "1" as the initial state signal 321 to indicate that the state transition is started from the initial state.

First, comparison operation in the normal states will be considered.

The comparing or collating operation is started by inputting an input text 204 to the character code register 212 on a character-by-character basis.

The character code 302 outputted from the character code register 212 is sent to the selector 291. In the selector 291, the X-port is selected because the matching output dedicated state signal 309 is "0", indicating that the current state is not the matching output dedicated state. Consequently, the character code 302 is sent out to the state transition table 221 as the column address.

At this time point, the current state number select signal 322 is "0" (zero) because the last matching output dedicated state signal 323 is "0" and because the initial state signal 321 is "1". To say in another way, transition from the normal state to the initial state is indicated. Accordingly, in the current state number selector 293, the V-port is selected, whereby the initial state number 0 (zero) is outputted as the current state number signal 305. Under the circumstances, the character code 302 and the initial state number 0 (zero) are supplied to the state transition table 221 as the column address and the row address, respectively. Through this addressing or accessing step, there are read out the matching output dedicated state flag 308, the initial state transition flag 320 and the succeeding state number signal 310. In this case, the matching output dedicated state signal 309 is placed in the last matching output dedicated state flip-flop 257 as the last matching output dedicated state signal 323. Subsequently, the matching output dedicated state flag 308 read out from the state transition table 221 is stored in the matching output dedicated state flip-flop 255 to be outputted therefrom as the matching output dedicated state signal 309. Further, the initial state transition flag 320 read out from the state transition table 21 is stored in the initial state transition flip-flop 256 to be outputted as the updated initial state signal 321.

When the matching output dedicated state signal 309 is "0", i.e. when the transition destined state is the normal state, the succeeding state number signal 310 is stored in the state number register 251 as an updated current state number.

When the initial state signal 321 is "0", the current state number select signal 322 assumes "0", resulting in that the W-port is selected in the selector 293, whereby the content of the state number register 251 is outputted as the current state number signal 305. Such matching operation may be performed upon state transition from the state 0 (zero) to the state 1. Since the last matching output dedicated state flip-flop 257 is loaded with "0" (zero), the last matching output dedicated state signal 323 is "0". Accordingly, when the initial state signal 321 is "1", the current state number select signal 322 assumes "1" and the V-port is selected in the selector 293, whereby "0" stored in the initial state number register 252 is outputted to the state transition table 221 as the current state number 305. This kind matching operation is performed upon state transition to the state 0 from the state 1 in response to the input of other character code than "D", "O" or "H".

Since the matching output dedicated state flag 308 is "0", character codes are successively inputted to the character code register 212 without suspension, whereby comparing or collating operation is performed on every newly inputted character code.

In the normal state transition, operation described above is repeated.

When the matching output dedicated state signal 309 is "1", i.e. when the transition destined state is the matching output dedicated state, the current state number 305 in the state number register 251 is not updated but the last (or outdated) succeeding state remains as being held. In the case of the illustrated example, this kind of matching operation takes place upon occurrence of transition from the state 2 to the matching output dedicated state 310, transition from the state 8 to the matching output dedicated state 311 or the transition from the matching output dedicated state 311 to the matching output dedicated state 312. On the other hand, there are stored in the matched term identifier register 253 the matched term identifier together with the offset 310L for reading out from the state transition table 221 the matched term identifier in the succeeding state or the matched term identifier in the matching output dedicated state and the offset stored in the corresponding slot. The matched term identifier as stored is outputted as the result of matching processing, as indicated at 205, while the offset 310L is supplied to the adder 230.

When the matching output dedicated state signal 309 is "1", indicating that the transition destined state is the matching result output dedicated state, the initial state signal 321 is "0". In the selector 293, the W-port for the state number register 251 is selected. Accordingly, the succeeding state number held continuously in the state number register 251 is outputted as the row address of the state transition table 221. In the last matching output dedicated state flip-flop 257, the matching output dedicated state signal 309 of "1" is newly stored as the last matching output dedicated state signal 323 to be subsequently outputted to the AND gate 259 via the inverter 258.

Since the matching output dedicated state signal 309 is "1", the character code register 212 is inhibited from fetching newly any character code, wherein the character code 302 already stored is outputted from the character code register 212 to the selector 291 and the adder 230. Since the matching output dedicated state signal 309 is "1", the Y-port is selected in the selector 291, whereon a sum of the offset 310L and the character code 302 is outputted from the adder 320 as the column address for the state transition table 221.

With the row address and the column address mentioned above, access is made to the state transition table 221 to read out the matching output dedicated state flag 308, the initial state transition flag 320 and the succeeding state number 310. The matching output dedicated state signal 309 is stored in the last matching output dedicated state flip-flop 257 as the last matching output dedicated state signal 323. The matching output dedicated state flag 308 and the initial state transition flag 320 as read out are stored in the matching output dedicated state flip-flop 255 and the initial state transition flip-flop 256, respectively, to be outputted as the updated matching output dedicated state signal 309 and the updated initial state signal 321, respectively.

When the matching output dedicated state signal 309 is "1", i.e. when the transition destined state continues to be the matching output dedicated state, the current state number value 305 in the state number register 251 is not updated but the last succeeding state number remains to be held. Through this matching processing, there is realized transition from the matching output dedicated state 311 to the matching output dedicated state 312 in the case of the illustrated example. On the other hand, the matched term identifier register 253 is loaded with new term identifier and the offset 310L. The matched term identifier as stored is outputted as the matching processing result 205, while the offset 310L is sent to the adder 230.

In this case, since the transition destined state is the matching result output dedicated state, the initial state signal 321 still continues to be "0". In the selector 293, the W-port is selected for allowing the output of the state number register 251 to be inputted. Consequently, the last succeeding state number stored in the state number register 251 continues to be outputted as the current state number signal 305 to be utilized as the row address in making access to the state transition table 221. Stored in the last matching output dedicated state flip-flop 257 is the matching output dedicated state signal 309 of "1" as the last matching output dedicated state signal 323, which is then supplied to the AND gate 259 via the inverter 258.

Since the matching output dedicated state signal 309 is "1", the character code register 212 is inhibited from fetching a new character code. Consequently, the character code 302 already placed in the character code register 212 continues to be outputted therefrom to the selector 291 and the adder 230. Because the matching output dedicated state signal 309 is "1", the Y-port is selected in the selector 291, resulting in that a sum value of the offset 310L and the character code 302 is outputted as the column address for making access to the state transition table 221. As will now be appreciated, in the case of transition to the matched output dedicated state, the matched term identifier and the offset stored in the state transition table 221 are read out with the same character code 302 and the current state number 305 being held in the character code register 212 and the state number register 251, respectively. By repeating the sequence of transitions up to the matching output dedicated state in this manner, a multiple matching processing is executed.

Parenthetically, in case the matching output dedicated state signal 309 is "0", i.e. when the transition destined state is the normal state, the succeeding state number 310 is stored in the state number register 251 as the updated or renewed current state number, while a new character code is fetched by the character code register 212, whereupon the state transition is made backwardly from the matching output dedicated state to the normal state. Thus, in the case of the illustrated example, this kind of matching operation is performed upon transition from the matching output dedicated state 310 to the state 3 and transition from the matching output dedicated state 312 to the state 9.

As will be understood from the above, by repeating the transitions to the normal states as well as transitions to the matching output dedicated states, the character string matching operation can be realized.

For example, the transition from the normal state 2 to the matching output dedicated state 310 where the result of matching of "DOG" is stored and hence to the normal state 3 in the case of the example assumed above can be realized by performing only once the transition from the normal state to the matching output dedicated state and the transition from the matching output dedicated state to the normal state, respectively. Further, the transition from the normal state 8 to the matching output dedicated state 312 where the matching result of "DOG" is stored and the matching output dedicated state 312 where the matching result of "HOTDOG" is stored and hence to the normal state 9 can be realized by performing only once the transition from the normal state to the matching output dedicated state, transition from the one matching output dedicated state to the other matching output dedicated state and the transition from the last mentioned matchingoutput dedicated state to the normal state, respectively.

FIG. 36 shows concretely an exemplary structure of the state transition table 221 for storing the automaton shown in FIG. 34.

Referring to FIG. 36, the state transition table 221 is so structure as to be addressed with the character code serving as the column address and the current state number 305 serving as the row address, wherein the slot as addressed stores therein the initial state transition flag 320, the multiple matching (or collation) flag 308 and the succeeding state number information 310. The initial state transition flag 320 set to "1" indicates that the transition destined state is the initial state, while the transition destined state is other state than the initial state when the flag 320 is set to "0". On the other hand, the multiple matching flag 308 is "1" indicates that the transition destined state is the matching output dedicated state while indicating the normal state as the transition destined state, when it is "0".

The succeeding state number information 310 indicates the number which identifies the state to which transition is to be made next, when the multiple matching flag 308 is "0". Thus, the slot is then of such a structure as indicated at 502 in FIG. 36. When the multiple matching flag is "1", the succeeding state number 310 is constituted by the matched term identifier of four more significant bits and the offset of four less significant bits. Thus, the slot structure is such as indicated at 503 in FIG. 36. This offset is made use of in determining the slot address of the state transition table 221 at which the matched term identifier and the offset in the succeeding state or the matching output dedicated state are to be stored.

Stored in the slot 503 indicated by the state 8 and the character code "G" are values "0", "1", "1" and "2", as shown in FIG. 36, wherein "0" is a value of the initial state flag, "1" of first occurrence is a value of the multiple matching flag, "1" of second occurrence is a value of the matched term identifier and "2" is a value of the offset for determining the slot address of the state transition table 221 where the succeeding state number or the matched term identifier and the offset to be next read out are stored.

In the following, description will be directed to the matching operation of the character string matching circuit by referring to the structure of the state transition table 221 shown in FIG. 36 on the assumption that a text "HOTDOG" is inputted.

As the initialization, the registers and the flip-flops are set to the respective states described below. The initial state number 0 (zero) is placed at the initial state number register 252. The initial state transition flip-flop is placed with "1" for starting the state transition, beginning with the initial state. Since the initial state can never become the matching output dedicated state, the multiple matching flip-flop 255 and the last multiple matching flip-flop 257 are each loaded with "0" (zero). As a result of this processing, the initial state number 0 is supplied to the state transition table 221 as the current state number 305.

Next, in response to the input of the first or leading character code "H" of the input text "HOTDOG", the state transition table 221 is accessed with the character code "H" and the current state number 0 (zero), whereby values of (0. 0, 4) are outputted, which indicate that the initial state transition flag 320 is "0", the multiple matching flag 308 is "0" and hence the slot is of the structure indicated at 502, and that the succeeding state number 310 is "4". Accordingly, the succeeding state number 310 is fetched by the state number register 251 to be outputted to the state transition table 221 as the current state number 305. Thus, transition to the normal state takes place. Similarly, upon inputting of "O", "T", "D" and "O", the normal transitions occur correspondingly and repetitively, whereby state transitions are made to the state 4, state 5, state 6, state 7 and to the state 8 in this sequence.

Assuming now that the character code "G" is inputted at this time point, the slot 503 of the state transition table 221 which is designed by the value 8 of the current state number 305 and the character code "G" is accessed, whereby a set of values ("0", "1", "1" and "2") is outputted. Since the content of this value set indicates the transition to the matching output dedicated state because the multiple matching signal 308 is "1", no character code is newly fetched by the character code register 212 but the character code "G" inputted previously (character code value=47) is held by the register 212, while the state number register 251 remains in the state in which the state number 8 is held. On the other hand, the succeeding state number 310 is fetched by the matched term identifier register 253, whereby the matched term identifier 205 of "1" represented by the four more significant bits as mentioned hereinbefore is outputted as the result of the matching processing. Thus, the matched term identifier of "1" corresponding to "DOG" is outputted as the matching result. Further, the value "2" of the succeeding state number 310 represented by the four less significant bits is sent to the adder 230 as the offset 310L. At this time point, the initial state transition flag 320 is "0". Thus, the selector 293 outputs the state number value 8 stored in the state number register 251 to the state transition table 221 as the current state number 305. Through the matching operation performed in this manner, the matching operation for the matching output dedicated state 311 can be realized.

Subsequently, the value "2" of the offset 310L and the value "47" of the character code 302 are added together by the adder 230, whereby a code value "49" is outputted to the state transition table 221 as the renewed character code. The state transition table 221 is then accessed with the value "49" of the character code (corresponding to a character code "I") and the state value of "8" of the current state number 305 ("0", "1", "2", "3") is outputted. This value set indicates that the initial state flag is "0", the matching result output dedicated state flag is "1", the matched term identifier is "2" and that the offset of the address for reading out the succeeding state of multiple matching relation is "3".

At this time point, transition to the matching output dedicated state is indicated by the value "1" of the multiple matching signal 309. Accordingly, the character code "G" continues to be held in the character code register 212 with the state number value 8 remaining as held in the state number register 251. Further, the value "2" of the matched term identifier represented by the four more significant bits is loaded into the matched term identifier register 253 to be outputted as the result of matching processing 205. This means that matching has been performed for "HOTDOG". Then, the value "3" of the offset 310L stored at the four less significant bits is sent to the adder 230. Since the initial state transition flag 320 is "0", there is outputted from the selector 293 the value "8" of the current state number 305 stored continuously in the state number register 251.

Subsequently, a value "3" of the offset 310L and the value "47" of the character code 302 are added together, whereby a new value "50" (corresponding to a character code "J") is outputted as the renewed character code to the state transition table 221, which is accessed with the value "50" of the character code and the value "8" of the current state number 305, whereby a set of values "1", "0" and "9" is outputted from the state transition table 221, which indicates that the initial state flag is "1", the multiple matching flag 3-8 is "0" and that the succeeding state number 310 is "9".

In this case, since the multiple matching flag 308 is "o", the multiple matching signal 309 assumes the value "0" as well. Consequently, a value "9" of the succeeding state number 310 is fetched by the state number register 251 as a renewed current state number value, whereon transition to the state 9 takes place. Besides, the succeeding character code is newly fetched by the character code register 210, whereon the normal matching operation is resumed.

Through the state transition table control procedure described above, matching can be performed on "DOG" and "HOTDOG" when "HOTDOG" is inputted as the text, which means that even when multiple matching takes place, the matching results can be outputted without any omission.

As an example of a single matching, it is supposed that text "DOG" is inputted. In this case, state transition from the initial state 0 to the state 1, i.e. state transition to the normal state takes place. Similarly, upon appearance of the succeeding character code "0", the normal state transition takes place from the state 1 to the state 2. Upon inputting of the last character code "G", a value set ("0", "1", "1", "2") is read out from the slot of the state transition table 221 designated by the current state number 305 of "2" and the character code "G". More specifically, since the initial state transition flag 320 is "0" with the multiple matching flag 308 being "1", the slot is of such a structure as indicated at 503. The matched term identifier of the value "1" is read out along with the offset of value "2". Consequently, the character code "G" (having a code value of 47) is held in the character code register 212, which in turn means that the state number value 2 remains as held in the state number register 251. On the other hand, the succeeding state number 310 is fetched by the matched term identifier register 253, whereon the matched term identifier 205 of "1" represented by the four more significant bits, i.e. the matched term identifier of "DOG", is outputted as the result of the matching processing. Subsequently, the value "2" of the offset 310L and value "47" of the character code 302 are added together by the adder 230, whereby a value "49" is outputted to the state transition table 221 as a new character code, whereupon a value set ("1", "0", "3") is outputted. Since the multiple matching flag 308 is "0", transition is made to the normal state 3, whereupon the normal matching operation is resumed.

In this way, the result of matching processing can be outputted even in the case where the matching output dedicated state is used for the single matching.

As will now be understood from the foregoing, the result of the matching processing can be obtained even for the single matching by adopting the matching output dedicated state.

As will be appreciated from the foregoing, there can be realized a character string matching system in which there arises no need for allocating newly the state numbers to the matching output destined states used upon occurrence of the multiple matching by making use of the other slot of the same state number of the state transition table as the matching output dedicated state, whereby the number of the states capable of being used for matching of other search terms can be protected against decreasing.

According to the present invention, there has thus been provided the character string retrieving system which is capable of outputting the matching results for all the search terms (i.e. terms designated or specified for retrieval) without any omission even upon occurrence of the multiple matching.

Figure 37:
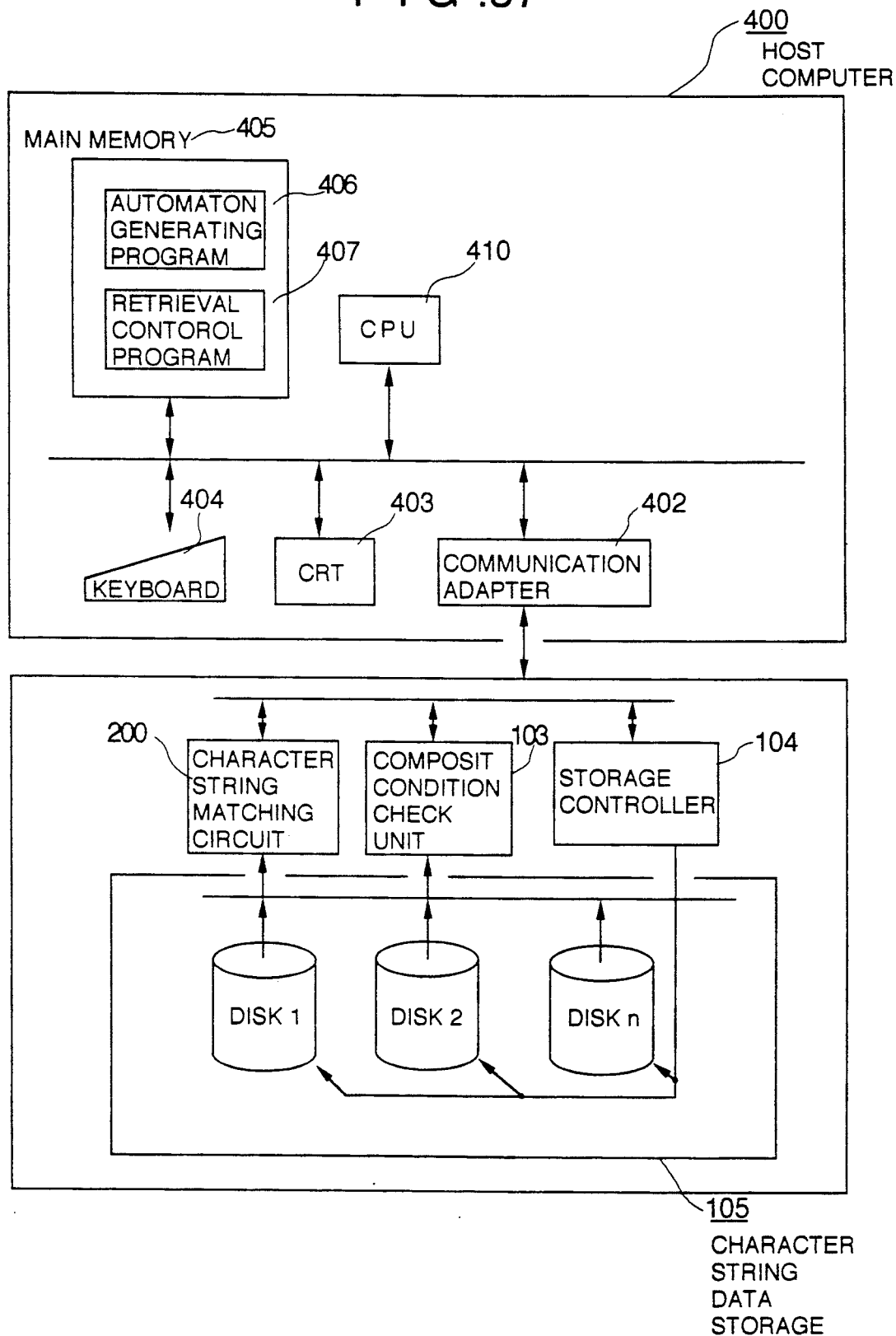
FIG. 37 is a block diagram showing a general arrangement of a data processing system incorporating a character string matching/retrieving system to which the present invention can be applied.

FIG. 37 shows, by way of example, a general arrangement of the character string retrieving system according to the present invention. Referring to the figure, a host computer 400 is composed of a CPU (central processing unit) 410, a main memory 405, a CRT display 403, a keyboard 404 and a communication adapter 402. A searcher may input a keyboard for retrieval with the aid of the keyboard 404. The main memory 405 stores therein an automaton generating program 406 and a retrieval control program 407. The automaton generating program 406 is executed by the CPU 410 to create the automaton in accordance with a retrieval keyword as inputted.

Subsequently, the retrieval control program 407 is executed by the CPU 410, whereby the automaton state transition information is transferred to a character string matching circuit (matcher) 200 and a composite condition decision circuit 103 via a communication adapter 402. Then, a storage controller 104 of the character string retrieving system 1 is activated. The storage controller 104 selects a designated disk from a plurality of disks constituting a character string storage 104 to thereby read out character strings from the selected disk to the character string matching circuit 200 and the composite condition decision circuit 103 for retrieving the character string, which is then messaged to the CPU 410. A document for which the retrieval has been performed is displayed on the CRT display 403 by the CPU 410. Although the host computer 400 may be implemented by using a large scale general-purpose computer, it is preferred to use a small scale machine such as a personal computer (PC), workstation (WS) or the like. Of course, the character string retrieving system may equally be implemented by a machine dedicated to this end instead of resorting to the use of the host computer.

We claim:

1. A character string retrieving system in which a finite automaton is employed for making decision en bloc as to whether or not a plurality of specified pattern character strings are present in a text character string which is subjected to retrieval and which is composed of characters each expressed in a character code, comprising:

transition table storage means for storing a state transition table for performing matching between text characters and specified pattern characters in terms of source state numbers and destination state numbers for the specified pattern characters codes, wherein for establishing correspondence between result of matching and the state number, a state is newly created as a destination state for a state transition brought about by appearance of a trailing character of the specified pattern character string instead of using the initial state as said destination state, said newly created state being stored in said transition table storage means as the destination state;

state number read-out means for holding temporarily an output of said transition table storage means indicating the source state number for thereby reading out said destination state number from said state transition table storage means on the basis of said outputted source state number and the specified pattern character code; and character string identifying means for outputting an identification number of said specified pattern character string when the state number outputted from said state number read-out means represents the destination state number for the trailing character code constituting a part of said specified pattern character string.

2. A character string retrieving system according to claim 1, wherein when the state number outputted from said state number read-out means represents the destination state number for the trailing character code constituting a part of said specified pattern character string, said character string identification means assigns one bit information to the result of matching performed on said specified pattern character string, wherein a matching identifying flag for identifying said specified pattern character string is outputted in dependence on the bit position of said one bit information.

3. A character string retrieving system according to claim 1, further comprising:

multiple matching table storage means responsive to occurrence of a multiple matching in which a first specified pattern character string is matched with a trailing character substring of a second specified pattern character string, for thereby storing an identification number of a character string corresponding to that of said second specified pattern character string to thereby represent a multiple matching relation; and multiple matching processing means responsive to the output of said character string identifying means indicating the multiple matching between plural specified pattern character strings for thereby outputting sequentially the individual specified pattern character strings undergone the multiple matching in accordance with the content of said multiple matching table storage means on the basis of the identification numbers outputted from said character string identifying means.

4. A character string retrieving system according to claim 3, wherein said multiple matching table storage means is so arranged that when the identification numbers of specified pattern character strings each having a multiple matching relation to the identification number of said second specified pattern character string are stored for the multiple matching, corresponding multiple matching identifiers for the multiple matching to be performed are stored separately and distinctively from single matching identifiers each indicating a single matching, and wherein said multiple matching processing means is so arranged that upon said single matching, the identifier thereof is outputted straightforwardly, while in said multiple matching, the identification numbers of the individual specified pattern character strings undergone the respective multiple matchings are sequentially outputted on the basis of the multiple matching identifiers.

5. A character string retrieving system in which a finite automaton is employed for making decision en bloc as to whether or not a plurality of specified pattern character strings are present in a text string which is subjected to retrieval and which is composed of characters each expressed in a character code, comprising:

transition table storage means for storing a state transition table for performing matching between text characters and specified pattern character strings in terms of source state numbers and destination state numbers for the specified pattern characters codes, wherein an initial state is allocated as a destination state for a state transition brought about by a trailing character code of the specified pattern character string, said initial state being stored in said transition table storage means as a destination state;

state number read-out means for holding temporarily an output of said transition table storage means to be outputted as the source state number and reading out said destination state number from said state transition table storage means on the basis of said outputted source state number and the specified pattern character code; and character string identifying means responsive to occurrence of state transition brought about by the trailing character code of said specified pattern character string as indicated by the state number outputted from said state number read-out means to thereby assign one bit information indicating the matching result of the specified pattern character string as an identifier thereof to a slot indicated by the source state number of the state in which said state transition occurs and said trailing character code, for thereby outputting matching identification flag for identifying said specified pattern character string in dependence on the bit positions thereof.

6. A character string retrieving system according to claim 5, further comprising:

multiple matching table storage means responsive to occurrence of a multiple matching in which a first specified pattern character string is matched with a trailing character substring of a second specified pattern character string for thereby storing identification number of a character string having a multiple matching relation in correspondence to the identification number of said second specified pattern character string to thereby indicate the multiple matching relation; and multiple matching processing means responsive to the multiple matching information indicating matchings between plural specified pattern character strings as outputted from said character string identifying means for thereby outputting sequentially the individual specified pattern character strings undergone the multiple matching in accordance with the content of said multiple matching table storage means on the basis of the identification numbers outputted from said character string identifying means.

7. A character string retrieving system according to claim 6, wherein said multiple matching table storage means is so arranged that when the identification numbers of the specified pattern character strings bearing a multiple matching relation to the identification number of said second specified pattern character string are stored for the multiple matching, corresponding multiple matching identifiers for the multiple matching to be performed are stored separately and distinctively from single matching identifiers each indicating a single matching; and wherein said multiple matching processing means is so arranged that upon said single matching, the identifier thereof is outputted straightforwardly as the result of the single matching, while in the multiple matching, the identification numbers of the individual specified pattern character strings undergone the multiple matching are sequentially outputted on the basis of the multiple matching identifiers.

8. A character string retrieving system in which a finite automaton is employed for making decision en bloc as to whether or not a plurality of specified pattern character strings are present in a text character string which is subjected to retrieval and which is composed of characters each expressed in a character code, comprising:

transition table storage means for generating an automaton including a normal state in which upon matching of a specified pattern character code by fetching said text character string on a character-by-character basis, a matched term identifier of the specified pattern character string is outputted when the character code as fetched is a trailing character of said specified pattern character string while otherwise outputting no matched term identifier, and a matching output processing state in which no specified pattern character code is newly fetched from said specified pattern character string but matching is performed on the specified pattern character code fetched immediately before to thereby output the corresponding matched term identifier, wherein upon occurrence of multiple matching in which n matched term identifiers have to be outputted for matching of one specified pattern character string, a normal state for outputting first one matching term identifier is created, which is followed by a succession of said (n−1) matching output processing states, to thereby make state transitions occur successively through the above-mentioned states for thereby outputting n matching term identifiers, whereupon the matching processing of the succeeding specified pattern character code is performed;

transition state table storage means for storing a state transition table containing the source state numbers and the destination state numbers corresponding to said specified pattern character codes by using said automaton;

matched term identifier storage means for storing a matching output processing flag which is set to "1" when the source state corresponding to the source state number stored in said transition table storage means and the destination state corresponding to said specified pattern character code represent the matching output processing state number and a matched term identifier which is set to the identifier of said specified pattern character string when the source state number and the specified pattern character code correspond to a trailing character code constituting said specified pattern character string while otherwise set to "0";

specified pattern character code storage means for fetching and holding the specified pattern character code from the text string on a character-by-character basis when said matching output processing state flag is "1" to thereby output the specified pattern character code to said transition table storage means and said matched term identifier storage means; and state number storage means for holding temporarily the destination state number outputted from said transition table storage means to thereby output said destination state number as a source state number to said transition table storage means and said matched term identifier storage means.

9. A character string retrieving system in which a finite automaton is employed for making decision en bloc as to whether or not a plurality of specified pattern character strings are present in a text character string which is subjected to retrieval and which is composed of characters each expressed in a character code, comprising:

transition table storage means for generating an automaton which include a normal state in which upon matching of a specified pattern character code by fetching the specified pattern character codes from said text string on a character-by-character basis, a matched term identifier of said specified pattern character string is outputted when transition is brought about by a trailing character of the immediately preceding specified pattern character string while otherwise outputting no matched term identifier, and a matching output processing state in which no retriespecified pattern character code is newly fetched from said text string but matching is performed on the specified pattern character code fetched immediately before to thereby output the corresponding matched term identifier, wherein upon occurrence of multiple matching in which n matched term identifiers have to be outputted for matching one character, a succession of (n−1) said matching output processing states are provided to thereby make state transitions occur successively through the abovementioned n matching output processing state, whereupon the matching processing of the succeeding specified pattern character code is completed by performing (n−1) matching output processings successively for thereby outputting n matched term identifiers, whereon the matching processing for said input specified pattern character code is regained;

state transition table storage means for storing a state transition table containing the source state numbers and the destination state numbers corresponding to said specified pattern character codes by using said automaton;

matched term identifier storage means for storing a matching output processing flag which is set to "1" when the source state corresponding to the source state number stored in said transition table storage means and the destination state corresponding to said specified pattern character code represent the matching output processing state number and a matched term identifier which is set to the identifier of said specified pattern character string when the source state number and the specified pattern character code correspond to a trailing character code constituting said specified pattern character string while otherwise set to "0";

specified pattern character code storage means for fetching and holding the specified pattern character code from the text string on a character-by-character basis when said matching output processing state flag is "1" to thereby output the specified pattern character code to said state transition table storage means and said matched term identifier storage means; and state number storage means for holding temporarily the destination state number outputted from said transition table storage means to thereby output said destination state number as a source state number to said transition table storage means and said matched term identifier storage means.

10. A character string retrieving system in which a finite automaton is employed for making decision en bloc as to whether or not a plurality of specified pattern character strings are present in a text string which is subjected to retrieval and which is composed of characters each expressed in a character code, comprising:

transition table storage means for generating an automaton which include a matching output processing state in which upon matching of a specified pattern character code by fetching the specified pattern character codes from said text string on a character-by-character basis, a matched term identifier of said specified pattern character string is outputted when transition is brought about by a trailing character of the immediately preceding specified pattern character string while otherwise outputting no matched term identifier, wherein upon occurrence of multiple matching in which n matched term identifiers have to be outputted for matching of one character, n matching output processing states are provided to thereby make state transitions occur successively through said n matching output processing states, for thereby outputting n matched term identifiers, whereupon said automaton proceeds to the matching processing of a succeeding specified pattern character code;

automaton generating means for generating an automaton including a matching output processing state in which upon matching of a character code fetched from an input text string on a character-by-character basis, no character code is newly fetched from the input text string when transition is brought about immediately before by a trailing character of said specified pattern character string but matching is performed with said specified pattern character code fetched immediately before to thereby output a corresponding matched term identifier;

while upon occurrence of a multiple matching in which n matched term identifiers have to be outputted from the matching for one character, n matching output processing states are provided to allow state transitions to occur successively through said n matching output processing states for thereby outputting n matched term identifiers, which is then followed by transition to a normal state to thereby allow matching processing to be performed for a succeeding input character code;

said automaton being used to establish a slot corresponding to a source state number and said specified pattern character code;

said slot containing an initial state transition flag set to "1" when a destination state is an initial state while otherwise set to "0" and a matching output processing state flag set to "1" when the state destination state is the matching output processing state while otherwise set to "0";

said state transition table being composed of a destination state number corresponding to said specified pattern character code and said source state number generated by said automaton when said matching output processing state flag is "1", a matched term identifier which is set to said identifier of said specified pattern character string in case said source state number and said input character code correspond to the trailing character code constituting the specified pattern character string provided that said matching output processing flag is "0" while otherwise said matched term identifier is set to "0", and an offset of a slot address in which a state to which transition is next to occur is placed;

initial state number storage means for storing the initial state number of said automaton;

initial state flag storage means for storing the initial state flag outputted from said transition table storage means;

matching output processing state flag storage means for storing temporarily the matching output processing state flag outputted from said transition table storage means;

state number storage means for fetching the destination state number outputted from said state transition table storage means when said matching output processing state flag outputted from said matching state processing state flag storage means is "0", said fetched destination state being set as an updated source state number, wherein when said matching output processing state flag is "1", said destination state number is not fetched but the source state number already fetched is held;

last matching output processing state flag storage means for holding the matching output processing state flag already outputted from said matching output processing state flag storage means upon fetching of the updated matching output processing state flag by said matching output processing state flag storage means;

source state number selecting means for selecting the source state number stored in said state number storage means when said initial state transition flag outputted from said initial state transition flag storage means is "0" or when said matching output processing state flag outputted from said last matching output processing state flag storage means is "1", while selecting the initial state number stored in said initial state number storage means as a renewed source state when said initial state transition flag is "1" and when said matching output processing state is "0", the selected state being outputted to said state transition table storage means;

matched term identifier storage means for fetching therein the matched term identifier and the offset outputted from said state transition table storage means when said matching output processing state flag outputted from said matching state processing state flag storage means is "1", said matched term identifier being then outputted as the result of matching while said matched term identifier storage means fetches neither said matched term identifier nor the offset thereof when said matching output processing state flag is "0";

specified pattern character code storage means for fetching a specified pattern character code on a character-by-character basis from an input text string when the matching output processing state flag outputted from said state transition table storage means is "0", while holding the specified pattern character code without fetching newly any specified pattern character code when said matching output processing state flag is "1";

specified pattern character code adding means for adding together the offset outputted from said matched term identifier storage means and the specified pattern character code outputted form said specified pattern character code storage means; and specified pattern character code selecting means for selecting the specified pattern character code outputted from said specified pattern character code storage means when said matching output processing state flag outputted from said matching output processing state flag storage means is "0", while selecting a specified pattern character code outputted from said specified pattern character code adding means when said matching output processing state flag is "1", said selected specified pattern character code being outputted to said state transition table storage means.

11. A character string retrieving method in which a finite automaton is employed for making decision en bloc as to whether or not a plurality of specified pattern character strings are present in a text character string which is subjected to retrieval and which includes characters each expressed in a character code, comprising:

a step of storing a state transition table for performing matching between an input text character and a specified pattern character in terms of a source state number and a transition destination state number for the specified pattern character code and creating newly a state for the state transition brought about by a trailing character constituting said specified pattern character string instead of using an initial state for establishing correspondence between the result of matching and a state number, said newly created state being stored as the destination state;

a step of outputting the source state number from said state transition table and reading said destination state number from said state transition table on the basis of said source state number and said specified pattern character code; and a step of outputting the identification number of said specified pattern character string when said read-out state number is the destination state number brought about by a trailing character code constituting said specified pattern character string.

12. A character string retrieving method in which a finite automaton is employed for making decision en bloc as to whether or not a plurality of specified pattern character strings are present in a text string which is subjected to retrieval and which includes characters each expressed in a character code, comprising:

a step of storing a state transition table for performing matching between an input text character and a specified pattern character in terms of a source state number and a transition destination state number for the specified pattern character code and creating an initial state for the state transition brought about by a trailing character constituting said specified pattern string, said initial state being stored as the destination state;

a step of outputting the source state number from said state transition table and reading said destination state number from said state transition table on the basis of said source state number and said specified pattern character code; and a step at which when said read-out state number is the destination state number brought about by the trailing character of said specified pattern character string, one bit information representing the matching result of the specified pattern character string is assigned as an identifier for said specified pattern character string to a slot indicated by the source state number at which the transition occurred and said trailing character code, wherein a matching identification code identifying said specified pattern string is outputted in dependence on the bit position.

* * * * *